(12) United States Patent
Shoji et al.

(10) Patent No.: US 11,091,839 B2
(45) Date of Patent: Aug. 17, 2021

(54) SURFACE-TREATED STEEL SHEET AND METHOD FOR PRODUCING SURFACE-TREATED STEEL SHEET

(71) Applicant: NIPPON STEEL & SUMITOMO METAL CORPORATION, Tokyo (JP)

(72) Inventors: Hiromasa Shoji, Tokyo (JP); Kunihiko Toshin, Tokyo (JP); Kohei Ueda, Tokyo (JP); Atsushi Morishita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 161 days.

(21) Appl. No.: 16/066,863

(22) PCT Filed: Mar. 9, 2017

(86) PCT No.: PCT/JP2017/009451
§ 371 (c)(1),
(2) Date: Jun. 28, 2018

(87) PCT Pub. No.: WO2017/155028
PCT Pub. Date: Sep. 14, 2017

(65) Prior Publication Data
US 2019/0010613 A1    Jan. 10, 2019

(30) Foreign Application Priority Data

Mar. 9, 2016  (JP) .............................. JP2016-045664
Mar. 9, 2016  (JP) .............................. JP2016-045665

(51) Int. Cl.
*B05D 7/24*  (2006.01)
*B05D 7/14*  (2006.01)
(Continued)

(52) U.S. Cl.
CPC ................ *C23C 28/00* (2013.01); *B05D 1/28* (2013.01); *B05D 3/0254* (2013.01); *B05D 7/14* (2013.01);
(Continued)

(58) Field of Classification Search
None
See application file for complete search history.

(56) References Cited

U.S. PATENT DOCUMENTS 6,500,886 B1 * 12/2002 Yamamuro .............. C25D 3/22
                                                        205/244
2011/0008644 A1    1/2011 Naritomi et al.
(Continued)

FOREIGN PATENT DOCUMENTS

CN    101128501 A    2/2008
CN    101960049 A    1/2011
(Continued)

OTHER PUBLICATIONS

Chinese Office Action and Search Report for corresponding Chinese Application No. 201780005431.9, dated Aug. 26, 2019.
(Continued)

*Primary Examiner* — Xiaobei Wang
(74) *Attorney, Agent, or Firm* — Birch, Stewart, Kolasch & Birch, LLP

(57) ABSTRACT

The object of the invention is to provide a surface-treated steel sheet having a coating having fine adhesiveness to an adhesive on the surface and having excellent corrosion resistance, and a production method thereof. Provided is a surface-treated steel sheet including: a steel sheet; a plated layer containing zinc on the steel sheet; and a coating on the plated layer, wherein the coating contains an acrylic resin, zirconium, vanadium, phosphorus and cobalt, and the acrylic resin has an area ratio of 80 to 100 area % in an area
(Continued)

from a surface to a thickness of one-fifth of a film thickness of the coating, and an area ratio of 5 to 50 area % in an area including areas from the film thickness center of the coating to a thickness of one-tenth of the film thickness toward the surface side and toward the plated layer side.

12 Claims, 9 Drawing Sheets

(51) Int. Cl.
  *B05D 3/02* (2006.01)
  *B05D 1/28* (2006.01)
  *C09D 5/08* (2006.01)
  *C09D 133/06* (2006.01)
  *B32B 15/04* (2006.01)
  *B32B 15/18* (2006.01)
  *C23C 28/00* (2006.01)
  *C23C 2/26* (2006.01)
  *C09D 5/10* (2006.01)
  *C23C 22/60* (2006.01)
  *C23C 2/06* (2006.01)
  *C23C 2/40* (2006.01)
  *C23C 22/05* (2006.01)

(52) U.S. Cl.
  CPC .............. *B05D 7/24* (2013.01); *B32B 15/043* (2013.01); *B32B 15/18* (2013.01); *C09D 5/08* (2013.01); *C09D 5/10* (2013.01); *C09D 133/062* (2013.01); *C23C 2/06* (2013.01); *C23C 2/26* (2013.01); *C23C 2/40* (2013.01); *C23C 22/60* (2013.01); *C23C 22/05* (2013.01); *Y10T 428/12569* (2015.01)

(56) References Cited

U.S. PATENT DOCUMENTS

| | | | |
|---|---|---|---|
| 2013/0115444 A1* | 5/2013 | Sashi | C09D 7/70 428/331 |
| 2017/0211188 A1 | 7/2017 | Miura et al. | |

FOREIGN PATENT DOCUMENTS

| | | |
|---|---|---|
| JP | 2003-55777 A | 2/2003 |
| JP | 2004-183015 A | 7/2004 |
| JP | 2005-97733 A | 4/2005 |
| JP | 2011-252184 A | 12/2011 |
| JP | 2012-62565 A | 3/2012 |
| TW | 201348514 A | 12/2013 |
| TW | 201500557 A | 1/2015 |
| TW | 201529893 A | 8/2015 |
| WO | WO 2009/116484 A1 | 9/2009 |
| WO | WO 2012/029988 A1 | 3/2012 |
| WO | WO2013073401 * | 5/2013 |
| WO | WO 2015/080268 A1 | 6/2015 |
| WO | WO2016/093286 * | 6/2016 |

OTHER PUBLICATIONS

Korean Office Action, dated Feb. 17, 2020, for corresponding Korean Application No. 10-2018-7018123, with a partial English translation.
Taiwanese Notification for corresponding Taiwanese Application No. 106107777, dated Mar. 22, 2019, with English translation.
Tawainese Office Action and Search Report for corresponding Taiwanese Application No. 106107777, dated Mar. 13, 2019, with partial English translation.
Written Opinion of the International Searching Authority for PCT/JP2017/009451 (PCT/ISA/237) dated Apr. 18, 2017.
International Search Report for PCT/JP2017/009451 dated Apr. 18, 2017.
Office Action for TW 106107777 dated Nov. 17, 2017.

* cited by examiner

SURFACE-TREATED STEEL SHEET AND METHOD FOR PRODUCING SURFACE-TREATED STEEL SHEET

TECHNICAL FIELD

The present invention relates to a surface-treated steel sheet having a coating on the surface and a method for producing a surface-treated steel sheet.

BACKGROUND ART

Plated steel sheets containing zinc have been conventionally used in wide variety of fields such as home electronics products, architectural materials and automobiles. Furthermore, as a method for improving the corrosion resistance and the like of a plated steel sheet containing zinc, a technique for forming a coating on the surface of a steel sheet containing zinc plating has been widely used (for example, see Patent Literatures 1 to 3).

CITATION LIST

Patent Literature

| | |
|---|---|
| Patent Literature 1: | JP 2003-055777A |
| Patent Literature 2: | JP 2005-097733A |
| Patent Literature 3: | WO 2009/116484 |

SUMMARY OF INVENTION

Technical Problem

However, conventional coatings formed on the surface of a plated steel sheet containing zinc have a problem that, even if the corrosion resistance can be improved, the adhesiveness with an adhesive is insufficient.

An object of the present invention is to provide a surface-treated steel sheet having a coating having fine adhesiveness to an adhesive on the surface and having excellent corrosion resistance, and a method for producing the surface-treated steel sheet.

Solution to Problem

The present inventors did intensive studies so as to solve the above-mentioned problem.

Consequently, it has been found that a coating having fine adhesiveness to an adhesive and having excellent corrosion resistance can be obtained by forming a coating on a plated steel sheet containing zinc, the coating containing an acrylic resin, zirconium, vanadium, phosphorus and cobalt, the acrylic resin having an area ratio of 80 to 100 area % in an area from the surface to a thickness of one-fifth of the film thickness of the coating in a cross-section, and the acrylic resin having an area ratio of 5 to 50 area % in an area including an area from the film thickness center to a thickness of one-tenth of the film thickness of the coating toward the surface side and an area from the film thickness center to a thickness of one-tenth of the film thickness of the coating toward the plated layer side.

Furthermore, it has been found that a plurality of island projections is present on the surface of the above-mentioned coating on the steel sheet in a planar view, and when three or more virtual straight lines each having a length of equal to or more than 10 μm and extending in any direction are drawn on any positions on the surface of the coating in a planar view, the length of each projection is 0.1 to 5.0 μm where an average value of lengths of a plurality of line segments that are portions of the virtual straight lines passing through the projections is defined as a length of each projection.

Furthermore, surprisingly, it has been found that the excellent adhesiveness to an adhesive and the excellent corrosion resistance of the present invention are exerted by the integration of the cross-section structure of the coating and the form and structure of the surface.

Furthermore, the present inventors considered the conditions for forming the coating of the present invention on a plated steel sheet, and succeeded in establishing a production method for forming the coating of the present invention on a plated steel sheet by using an aqueous surface treating agent containing an acrylic resin.

The gist of the present invention is as follows.

[1]

A surface-treated steel sheet including:
a steel sheet;
a plated layer that contains zinc and is formed on the steel sheet; and
a coating formed on the plated layer,
in which the coating contains an acrylic resin, zirconium, vanadium, phosphorus and cobalt,
the acrylic resin has an area ratio of 80 to 100 area % in an area from a surface of the coating to a thickness of one-fifth of a film thickness of the coating on a cross-section, and
the acrylic resin has an area ratio of 5 to 50 area % in an area including an area from the film thickness center of the coating to a thickness of one-tenth of the film thickness toward the surface side and an area from the film thickness center to a thickness of one-tenth of the film thickness toward the plated layer side.

[2]

The surface-treated steel sheet according to [1], in which
a plurality of island projections is present on the surface of the coating in a planar view, and
when three or more virtual straight lines each having a length of equal to or more than 10 μm and extending in any direction are drawn on any positions on the surface of the coating in a planar view, a length of each projection is 0.1 to 5.0 where an average value of lengths of a plurality of line segments that are portions of the virtual straight lines passing through the projections is defined as the length of each projection.

[3]

The surface-treated steel sheet according to [2], in which the surface of the coating in a rectangular area of 1 μm on one side has an arithmetic mean roughness (Ra) of 5 to 50 nm, a maximum cross-sectional height (Rt) of a roughness curve of 50 to 500 nm, and a root mean square roughness (Rq) of 10 to 100 nm.

[4]

The surface-treated steel sheet according to [2] or [3], in which a concentration of the zirconium in an area between adjacent projections in the coating is less than a concentration of the zirconium in an area on which the projections are formed.

[5]

The surface-treated steel sheet according to any one of [2] to [4], in which a concentration of the acrylic resin in an area between adjacent projections in the coating is more than a concentration of the acrylic resin in an area on which the projections are formed.

[6]

The surface-treated steel sheet according to any one of [1] to [5], in which the coating has a mass ratio of a mass of the vanadium to a mass of the zirconium (V/Zr) of 0.07 to 0.69, a mass ratio of a mass of the phosphorus to the mass of the zirconium (P/Zr) of 0.04 to 0.58, and a mass ratio of a mass of the cobalt to the mass of the zirconium (Co/Zr) of 0.005 to 0.08.

[7]

The surface-treated steel sheet according to any one of [1] to [6], in which the zirconium is contained in the coating by 4 to 400 mg/m$^2$ in terms of metal.

[8]

The surface-treated steel sheet according to any one of [1] to [7], in which the acrylic resin has an area ratio of 20 to 60 area % on a cross-section of the coating.

[9]

The surface-treated steel sheet according to any one of [1] to [8], in which the plated layer consists of, in mass %, one or more of Al: less than or equal to 60%, Mg: less than or equal to 10%, and Si: less than or equal to 2%; zinc; and impurities.

[10]

The surface-treated steel sheet according to any one of [1] to [9], in which the acrylic resin is a copolymer of, in mass %, styrene: 15 to 25%, (meth)acrylic acid: 1 to 10%, (meth)acrylic acid alkyl ester: 40 to 58% and acrylonitrile: 20 to 38%, and the acrylic resin has a glass transition temperature of −12 to 24° C.

[11]

The surface-treated steel sheet according to any one of [1] to [10], in which the coating contains less than or equal to 5% by mass of a fluoride ion.

[12]

A method for producing the surface-treated steel sheet according to any one of [1] to [11], including:

a step of forming a plated layer containing zinc on a steel sheet;

a step of forming a coating by applying an aqueous surface treating agent containing an acrylic resin, zirconium, vanadium, phosphorus and cobalt on the plated layer by using a roll coater;

a step of retaining the coating for equal to or more than 0.5 seconds from the formation of the coating to initiation of drying of the coating; and a step of drying the coating.

[13]

The method for producing the surface-treated steel sheet according to [12], in which, in the step of applying the aqueous surface treating agent, a temperature of the steel sheet when the steel sheet enters into the roll coater is equal to or more than 5° C. and equal to or less than 80° C.

Advantageous Effects of Invention

The surface-treated steel sheet of the present invention has a coating having fine adhesiveness to an adhesive and having excellent corrosion resistance on the surface.

DESCRIPTION OF EMBODIMENTS

Figure 1:
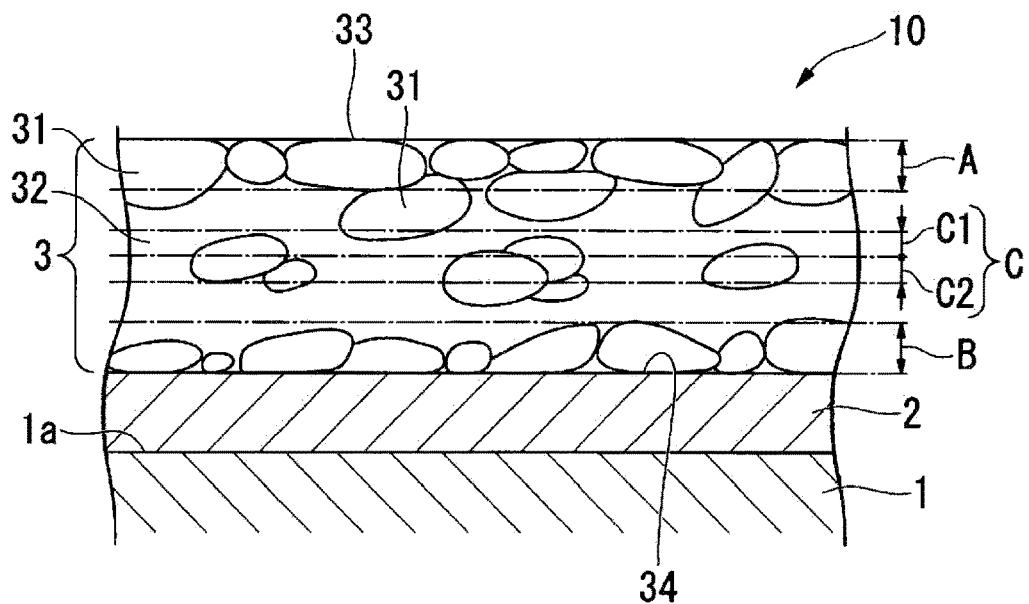
FIG. 1 is a schematic view showing the cross-section structure of a surface-treated steel sheet of a first embodiment.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

1. Surface-Treated Steel Sheet 1.1 First Embodiment

FIG. 1 is a schematic view showing the cross-section structure of a surface-treated steel sheet of a first embodiment.

A surface-treated steel sheet 10 shown in FIG. 1 has a steel sheet 1, a plated layer 2 containing zinc formed on a surface 1a (an upper surface in FIG. 1) of the steel sheet 1 and a coating 3 formed on the plated layer 2.

The surface-treated steel sheet 10 shown in FIG. 1 will be explained as an example where the plated layer 2 and the coating 3 are formed only on the side of the surface 1a that is one surface of the steel sheet 1. However, the plated layer and coating may be formed on the both surfaces of the steel sheet in the surface-treated steel sheet of the present invention. Furthermore, in a case where the plated layers 2 are formed on the both surfaces of the steel sheet 1, the coating 3 may be formed on one surface, or may be formed on both surfaces.

(Steel Sheet)

In this embodiment, the steel sheet 1 having the surface 1a on which the plated layer 2 is formed is not specifically limited. For example, as the steel sheet 1, a steel sheet of any of an ultra low C type (a ferrite-based structure), an Al-k type (structure having pearlite in ferrite), a two phase structure type (for example, a structure containing martensite in ferrite, a structure containing bainite in ferrite), a processing-induced transformation type (a structure containing residual austenite in ferrite), and a fine crystal type (ferrite-based structure) may be used.

(Plated Layer)

The plated layer 2 is formed on one surface or both surfaces of the steel sheet 1. The plated layer 2 may be any plated layer as long as it contains zinc, and is preferably a plated layer consisting of, in mass %, one or more of Al: less than or equal to 60%, Mg: less than or equal to 10%, and Si: less than or equal to 2%; zinc; and impurities. The impurities mean impurities that are incorporated during the production step and the like, and examples include Pb, Cd, Sb, Cu, Fe, Ti, Ni, B, Zr, Hf, Sc, Sn, Be, Co, Cr, Mn, Mo, P, Nb, V and Bi, and further Group III elements such as La, Ce and Y. It is preferable that the total of these impurity elements be equal to or less than about 0.5% by mass.

In a case where the plated layer 2 consists of, in mass %, one or more of Al: less than or equal to 60%, Mg: less than or equal to 10%, and Si: less than or equal to 2%; zinc; and impurities, a surface-treated steel sheet 10 having further excellent corrosion resistance is formed.

The plating adhesion amount of the plated layer 2 is not specifically limited, and can be accepted as long as it is within a conventionally-known range.

(Coating)

The coating 3 is formed on the plated layer 2.

The coating 3 shown in FIG. 1 includes a particulate acrylic resin 31 and an inhibitor phase 32. The inhibitor phase 32 contains zirconium, vanadium, phosphorus and cobalt.

The "acrylic resin" in this embodiment is preferably a resin containing a polymer of (meth)acrylic acid alkyl ester, and may be a polymer obtained by polymerizing only (meth)acrylic acid alkyl ester, or may be a copolymer obtained by polymerizing (meth)acrylic acid alkyl ester and other monomer. Furthermore, in this specification, "(meth)acrylic" means "acrylic" or "methacrylic".

The acrylic resin contributes to the improvement of the tightness of adhesion between the coating 3 and an overcoating layer and the improvement of the adhesiveness to an adhesive, and also contributes to the improvement of the corrosion resistance of the surface-treated steel sheet 10.

As the acrylic resin, a copolymer of (meth)acrylic acid alkyl ester and other monomer is preferably used. As the copolymer, a copolymer of styrene (b1), (meth)acrylic acid (b2), (meth)acrylic acid alkyl ester (b3) and acrylonitrile (b4) is preferably used.

Specifically, as the acrylic resin, a copolymer of, in mass %, styrene (b1): 15 to 25%, (meth)acrylic acid (b2): 1 to 10%, (meth)acrylic acid alkyl ester (b3): 40 to 58% and acrylonitrile (b4): 20 to 38% is preferably used. By using such copolymer as the acrylic resin, the coating 3 having finer tightness of adhesion with an overcoating layer and fine adhesiveness with an adhesive, and having excellent corrosion resistance can be obtained.

The component ratio of the styrene (b1), the (meth)acrylic acid (b2), the (meth)acrylic acid alkyl ester (b3) and the acrylonitrile (b4) in the acrylic resin can be calculated by analyzing the coating by using an analysis method such as infrared absorption (IR) analysis, Raman analysis or mass analysis.

The styrene (b1) improves the tightness of adhesion of the coating 3 with the plated layer 2 and the overcoating layer to increase the corrosion resistance of the surface-treated steel sheet 10. When the styrene (b1) is contained by equal to or more than 15% by mass with respect to the total mass of the monomer components, the effect obtained by the styrene (b1) is further improved. The content of the styrene (b1) is more preferably equal to or more than 17% by mass. When the content of the styrene (b1) is less than or equal to 25% by mass, the coating 3 is prevented from being hardened due to a too much content of the styrene (b1). Consequently, the tightness of adhesion between the coating 3 and the plated layer 2 and the overcoating layer is further improved, and thus the corrosion resistance of the surface-treated steel sheet 10 is further improved. The content of the styrene (b1) is more preferably less than or equal to 23% by mass.

The (meth)acrylic acid (b2) improves the tightness of adhesion of the coating 3 with the plated layer 2 and with the overcoating layer, and thus improves the corrosion resistance of the surface-treated steel sheet 10. When the (meth)acrylic acid (b2) is contained by equal to or more than 1% by mass with respect to the total mass of the monomer component, the effect obtained by the (meth)acrylic acid (b2) is further improved. It is more preferable that the content of the (meth)acrylic acid (b2) be equal to or more than 2% by mass. When the content of the (meth)acrylic acid (b2) is less than or equal to 10% by mass, the water resistance of the coating 3 becomes fine, and thus further excellent corrosion resistance can be obtained. The content of the (meth)acrylic acid (b2) is more preferably less than or equal to 6% by mass.

The (meth)acrylic acid alkyl ester (b3) enhances the corrosion resistance of the surface-treated steel sheet 10. When the (meth)acrylic acid alkyl ester (b3) is contained by equal to or more than 40% by mass with respect to the total mass of the monomer component, more excellent corrosion resistance can be obtained. When the content of the (meth)acrylic acid alkyl ester (b3) is less than or equal to 58% by mass, more excellent corrosion resistance can be obtained. The content of the (meth)acrylic acid alkyl ester (b3) is more preferably less than or equal to 55% by mass.

As the (meth)acrylic acid alkyl ester (b3), for example, one or more selected from methyl(meth)acrylate, ethyl (meth)acrylate, butyl(meth)acrylate, 2-methylhexyl acrylate, and isomers thereof and the like can be used. Among these, it is specifically preferable to use ethyl acrylate and/or butyl acrylate since corrosion resistance is excellent.

The acrylonitrile (b4) improves the adhesiveness between the coating 3 and an adhesive. When the acrylonitrile (b4) is contained by equal to or more than 20% by mass with respect to the total mass of the monomer components, the adhesiveness between the coating 3 and the adhesive is further improved. When the content of the acrylonitrile (b4) is less than or equal to 38% by mass, the water resistance of the coating 3 is fine, and more excellent corrosion resistance can be obtained. The content of the acrylonitrile (b4) is more preferably less than or equal to 35% by mass.

In a case where the acrylic resin is a copolymer, the copolymer may be a copolymer of the styrene (b1), the (meth)acrylic acid (b2), the (meth)acrylic acid alkyl ester (b3), the acrylonitrile (b4) and other vinyl group-containing monomer.

The other vinyl group-containing monomer is not specifically limited, and examples include 2-hydroxyethyl (meth)acrylate, 2-hydroxypropyl(meth)acrylate, 3-hydroxypropyl(meth)acrylate, 2-hydroxybutyl(meth)acrylate, 4-hydroxybutyl(meth)acrylate, ethoxy-diethylene glycol (meth)acrylate, 2-hydroxyethyl(meth)allyl ether, 3-hydroxypropyl(meth)allyl ether, 4-hydroxybutyl(meth)allyl ether, 2-dimethylaminoethyl acrylate, acrylamide, allyl alcohol, maleic acid, maleic anhydride, fumaric acid, crotonic acid, itaconic acid, citraconic acid, cinnamic acid, vinyltrimethoxysilane, vinyltriethoxysilane, allyl glycidyl ether, glycidyl (meth)acrylate, 2-(1-aziridinyl)ethyl acrylate, iminol methacrylate, acryloyl morpholin, vinyl formate, vinyl acetate, vinyl lactate, vinyl acrylate, vinyltoluene, cinnamic acid nitrile, (meth)acryloxyethyl phosphate and bis-(meth)acryloxyethyl phosphate and the like, and one or more of these can be used. Among these, 2-hydroxyethylacrylate, 4-hydroxybutylacrylate, ethoxy-diethylene glycol acrylate and acrylamide are preferable since they are excellent in stability of an emulsion.

In this specification, "(meth)acrylate" means "acrylate" or "methacrylate". "(Meth)allyl ether" means "allyl ether" or "methallyl ether". "(Meth)acrylo" means "acrylo" or "methacrylo".

The acrylic resin has a glass transition temperature of preferably −12 to 24° C., more preferably −10 to 20° C. When the glass transition temperature is equal to or more than −12° C., the coating 3 having further excellent corrosion resistance can be obtained. When the glass transition temperature is equal to or less than 24° C., the tightness of adhesion with an overcoating layer and the adhesiveness with an adhesive become finer.

The glass transition temperature of the acrylic resin is calculated by the following Expression (1).

$$1/Tg(K) = W_1/Tg_1 + W_2/Tg_2 + \ldots + W_n/Tg_n \quad (1)$$

(where in Expression (1), Tg is a glass transition temperature (K) of the acrylic resin (A), $W_1, W_2, \ldots, W_n$ are each weight fractions of homopolymers of the monomers that constitute the acrylic resin, and $Tg_1, Tg_2, \ldots, Tg_n$ are glass transition temperatures of the homopolymers of the respective monomers.)

The concentration of the acrylic resin in the entirety of the coating 3 is preferably 20 to 60% by mass. When the concentration of the acrylic resin is equal to or more than 20% by mass, an effect obtained by incorporating the acrylic resin can be sufficient. When the concentration of the acrylic resin is less than or equal to 60% by mass, the sufficient zirconium content can be ensured, and further excellent corrosion resistance can be obtained by a synergistic effect obtained by incorporating zirconium and an acrylic resin. It is more preferable that the concentration of the acrylic resin be less than or equal to 40% by mass. Furthermore, when the concentration of the acrylic resin in the entirety of the coating 3 is within the above-mentioned range, the ranges of the area ratios of the acrylic resin in "upper area A" and "central area C" mentioned below can be achieved more surely.

All of the zirconium, vanadium, phosphorus and cobalt in the coating 3 function as a corrosion suppressing agent (inhibitor) of the surface-treated steel sheet 10 to thereby improve the corrosion resistance of the surface-treated steel sheet 10. The corrosion environments in which zirconium, vanadium, phosphorus and cobalt effectively function as corrosion suppressing agents are different. Therefore, corrosion under various corrosion environments can be suppressed by incorporating the four kinds: zirconium, vanadium, phosphorus and cobalt as corrosion suppressing agents, and thus more excellent corrosion resistance can be obtained.

The zirconium in the coating 3 forms a crosslinking structure with the acrylic resin. Therefore, the coating 3 has excellent barrier property. Furthermore, it is presumed that the zirconium in the coating 3 has formed a Zr—O-M bond (M: a metal element in the plated layer) with the surface of the plated layer 2. Due to this, the coating 3 has excellent tightness of adhesion with the plated layer 2.

It is preferable that the zirconium content of the coating 3 be 4 to 400 mg/m$^2$ in terms of metal. When the zirconium adhesion amount is equal to or more than 4 mg/m$^2$, the effect to improve the tightness of adhesion by the bonding of the zirconium and the surface of the plated layer 2, and the effect of improving the barrier property due to the crosslinking structure of the zirconium and the acrylic resin are further improved. Consequently, further excellent corrosion resistance can be obtained. The amount of adhesion of the zirconium is more preferably equal to or more than 50 mg/m$^2$. When the amount of adhesion of the zirconium is equal to or less than 400 mg/m$^2$, generation of cracks due to incorporation of the zirconium in the coating 3 can be prevented, and thus more excellent corrosion resistance can be obtained. The amount of adhesion of the zirconium is more preferably equal to or less than 350 mg/m$^2$.

The vanadium in the coating 3 is eluted preferentially into the plated layer 2 under a corrosion environment, and suppresses the increase in pH due to the dissolution of the plated layer 2 to thereby improve the corrosion resistance of the surface-treated steel sheet 10.

The phosphorus in the coating 3 forms a passivation coating formed of an insoluble metal salt such as zinc phosphate on the surface of the plated layer 2, whereby the corrosion resistance of the surface-treated steel sheet 10 is improved.

The insoluble metal salt is generated by a reaction between a metal ion formed by dissolving a part of the plated layer 2 and phosphorus. The insoluble metal salt is formed by the dissolution of a part of the plated layer 2 by applying an aqueous treatment agent containing phosphorus for use in the formation of the coating 3 onto the plated layer 2, and/or by that the plated layer 2 is put into a corrosion environment after the formation of the coating 3.

The cobalt in the coating 3 improves the blacking resistance and corrosion resistance of the surface-treated steel sheet 10.

In this embodiment, in a case where the plated layer 2 is formed of a zinc-aluminum-magnesium alloy, the aluminum and magnesium in the plated layer 2 exert a sacrificial protection effect under a corrosion environment. Therefore, there is a case where a blacking phenomenon in which the zinc in the plated layer 2 is oxidized under an oxygen-lacking state occurs. The blacking phenomenon easily occurs in a part where the plated layer 2 is easily dissolved. It is presumed that the cobalt in the coating 3 decreases the oxidation (corrosion) speed of the zinc in the plated layer 2 to thereby prevent the blacking phenomenon.

It is preferable that the coating 3 have a mass ratio of the mass of the vanadium to the mass of the zirconium (V/Zr) of 0.07 to 0.69. When the above-mentioned mass ratio (V/Zr) is equal to or more than 0.07, an effect to improve the corrosion resistance by the vanadium is sufficiently obtained, and thus further excellent corrosion resistance can be obtained. Furthermore, the above-mentioned mass ratio (V/Zr) is preferably equal to or less than 0.69 since a zirconium content can be ensured. The above-mentioned mass ratio (V/Zr) is more preferably 0.14 to 0.56.

It is preferable that the coating 3 have a mass ratio of the mass of the phosphorus to the mass of the zirconium (P/Zr) of 0.04 to 0.58. When (P/Zr) is equal to or more than 0.04, an effect to improve corrosion resistance by the phosphorus is sufficiently obtained, and thus further excellent corrosion resistance can be obtained. The above-mentioned mass ratio (P/Zr) is preferably equal to or less than 0.58 since a zirconium content can be ensured. It is more preferable that the above-mentioned mass ratio (P/Zr) be 0.07 to 0.29.

It is preferable that the coating 3 have a mass ratio of the mass of the cobalt to the mass of the zirconium (Co/Zr) of 0.005 to 0.08. When the above-mentioned mass ratio (Co/Zr) is equal to or more than 0.005, an effect to improve blacking resistance and corrosion resistance by the cobalt can be sufficiently obtained, and thus further excellent corrosion resistance can be obtained, and a blacking phenomenon can be suppressed. The above-mentioned mass ratio (Co/Zr) is preferably equal to or less than 0.08 since a zirconium content can be ensured. The above-mentioned mass ratio (Co/Zr) is more preferably 0.009 to 0.03.

The contents of the V, P, Co and Zr in the coating 3 can be calculated by subjecting the coating 3 to a fluorescence X-ray analysis with assumption that V, P, Co and Zr in the coating are present as oxides. As a result of the consideration by the present inventors, it was able to confirm that the respective components V, P (in terms of phosphoric acid), Co and Zr in the coating calculated by the above-mentioned method correspond to the mass ratios (V, phosphoric acid, Co, Zr) with respect to the total solid content in the aqueous surface treating agent. Accordingly, it can be assumed that the contents (% by mass) of V, P (in terms of phosphoric acid), Co and Zr in the coating are mass ratios with respect to the total solid content of the aqueous surface treating agent represented by percentages.

The coating 3 may contain less than or equal to 5% by mass of a fluoride ion. The fluoride ion in the coating 3 is derived from a component containing a fluoride ion, which is incorporated as necessary in an aqueous surface treating agent for use in the formation of the coating 3. The component containing a fluoride ion is used for improving the tightness of adhesion and adhesiveness of the coating 3. When the content of the fluoride ion in the coating 3 is less than or equal to 5% by mass, occurrence of whitening by dew formation due to the incorporation of a fluoride ion can be prevented. In more detail, when the content of the fluoride ion is less than or equal to 5% by mass, the amount of the fluoride ion eluted in water formed by dew formation is small. Therefore, even if the fluoride ion is concentrated and precipitated on the coating 3 during the drying process of the water formed by dew formation, the amount of the fluoride ion is such a minute amount that the fluoride ion does not appear as whitening by dew formation. Therefore, deterioration of appearance due to the whitening by dew formation (occurrence of white rust) can be prevented. It is preferable that the content of the fluoride ion in the coating 3 be less than or equal to 3% by mass.

In the coating 3 shown in FIG. 1, in a cross-section of the coating 3, in an area A from a surface 33 to a thickness of one-fifth of the film thickness (hereinafter may be referred to as "upper area") and in an area B from an interface 34 with the plated layer 2 to a thickness of one-fifth of the film thickness (hereinafter may be referred to as "lower area"), the area ratio of the acrylic resin is 80 to 100 area %.

Furthermore, in an area including an area C1 from the film thickness center of the coating 3 in a cross-section of the coating 3 to a thickness of one-tenth of the film thickness toward the side of the surface 33 (hereinafter may be referred to as "upper central area") and an area C2 from the film thickness center to a thickness of one-tenth of the film thickness toward the side of the plated layer 2 (hereinafter may be referred to as "lower central area") (hereinafter the area C including the area C1 and the area C2 may be referred to as "central area"), the area ratio of the acrylic resin is 5 to 50 area %.

Therefore, in the coating 3 shown in FIG. 1, the concentrations of the acrylic resin 31 in the upper area A and the lower area B are more than the concentration of the acrylic resin 31 in the central area C.

In the coating 3 shown in FIG. 1, since the area ratio of the acrylic resin 31 in the upper area A in the cross-section of the coating 3 is equal to or more than 80 area %, elution of the corrosion suppressing agents (zirconium, vanadium, phosphorus and cobalt) from the inside of the coating 3 under a wet environment is suppressed by the acrylic resin 31 at a high concentration present on the surface 33. Therefore, the barrier property by the coating 3 is exerted for a long period, and thus excellent corrosion resistance can be obtained. Furthermore, since the area ratio of the acrylic resin 31 in the upper area A is equal to or more than 80 area %, fine adhesiveness between the coating 3 and an adhesive can be obtained by the acrylic resin 31 at a high concentration present on the surface 33. The area ratio of the acrylic resin 31 of the upper area A on the cross-section of the coating 3 is preferably equal to or more than 90 area %, and may be 100 area %. Furthermore, it is preferable that the area ratio of the acrylic resin 31 in the upper area A on the cross-section of the coating 3 gradually increase toward the surface 33 from the film thickness center. In this case, the effect of the presence of the acrylic resin 31 in the upper area A is further significant.

Furthermore, in this embodiment, since the area ratio of the acrylic resin 31 of the lower area B on the cross-section of the coating 3 is equal to or more than 80 area %, the acrylic resin 31 is present at a high concentration on the interface 34 with the plated layer 2 of the coating 3. Therefore, fine tightness of adhesion can be obtained at the interface 34 between the coating 3 and the plated layer 2. Consequently, in the surface-treated steel sheet 10 of this embodiment, excellent corrosion resistance can be obtained, for example, as compared to a case where a coating in which the amount of the acrylic resin in the coating is the same and the acrylic resin concentration in the entirety of the coating is homogeneous is formed instead of the coating 3. In order to improve the tightness of adhesion in the interface 34, the area ratio of the acrylic resin 31 in the lower area B on the cross-section of the coating 3 is preferably equal to or more than 90 area %, and may be 100 area %.

Since the area ratio of the acrylic resin 31 in the central area C of the cross-section of the coating 3 is equal to or more than 5 area %, an effect to improve the barrier property by the crosslinking structure of the zirconium and the acrylic resin can be obtained. It is preferable that the area ratio of the acrylic resin 31 in the central area C be equal to or more than 10 area %.

Since the area ratio of the acrylic resin 31 in the central area C on the cross-section of the coating 3 is equal to or less than 50 area %, the coating 3 sufficiently contains the inhibitor phase 32 (zirconium, vanadium, phosphorus, cobalt), and thus excellent corrosion resistance and blacking resistance can be obtained. It is preferable that the area ratio of the acrylic resin 31 in the central area C be equal to or less than 40 area %.

It is preferable that the area ratio of the acrylic resin 31 to the entirety of the cross-section of the coating 3 be 20 to 60 area %. When the area ratio of the acrylic resin 31 on the cross-section of the coating 3 is equal to or more than 20 area %, an effect by incorporating the acrylic resin 31 can be sufficiently obtained. It is more preferable that the area ratio of the acrylic resin 31 be equal to or more than 30 area %. When the area ratio of the acrylic resin 31 to the entire cross-section of the coating 3 is equal to or less than 60 area %, the area ratio of the inhibitor phase 32 (zirconium, vanadium, phosphorus, cobalt) can be sufficiently ensured, and further excellent corrosion resistance can be obtained by a synergistic effect by incorporating the inhibitor phase 32 and the acrylic resin 31. It is more preferable that the area ratio of the acrylic resin 31 be equal to or less than 50 area %.

Figure 2:
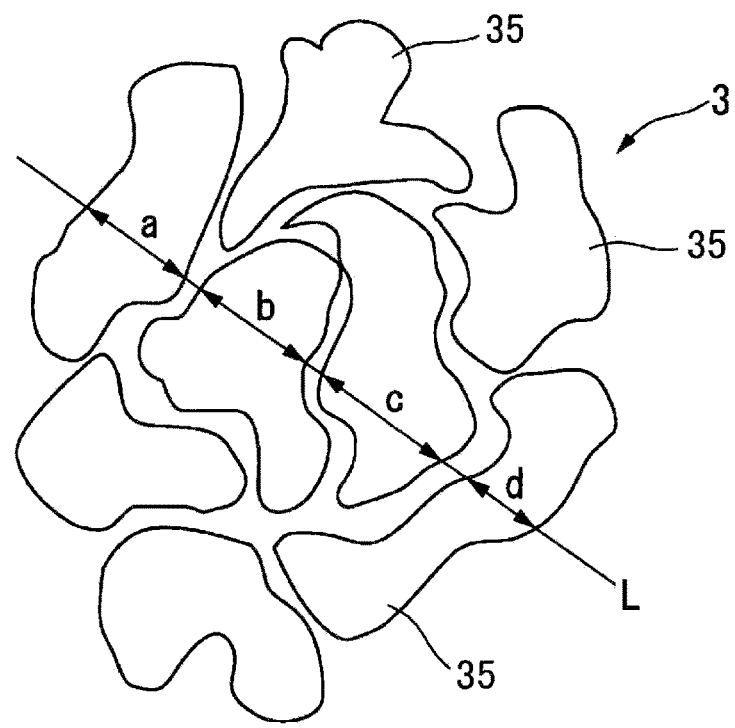
FIG. 2 is a schematic view showing the surface of a coating possessed by the surface-treated steel sheet of the first embodiment.

Furthermore, the coating 3 of the surface-treated steel sheet 10 in this embodiment has a surface structure as shown in FIG. 2. FIG. 2 is a schematic view showing the surface of the coating possessed by the surface-treated steel sheet of this embodiment. A plurality of projections 35 is present densely on the surface of the coating 3 shown in FIG. 2. The projections 35 are projection-like parts (island parts) that are confirmed by observing the surface of the surface-treated steel sheet by using an atomic force microscope (AFM). The respective projections 35 have amorphous and uneven island shapes in a planar view. It is preferable that the projections 35 each have a length of 0.1 to 5.0 μm. Furthermore, the area between the adjacent projections 35 and 35 is a depressed valley part, and the entire periphery of each projection 35 is surrounded by the valley parts. The shapes of the respective projections 35 are not limited to those illustrated and may be approximately the same, or may have predetermined shapes such as tetragonal, hexagonal, approximately circular and approximately oval shapes.

The length of the projection 35 in this embodiment is a numerical value calculated by the method described below. Firstly, as shown in FIG. 2, three or more virtual straight lines L each having a length of equal to or more than 10 μm and extending in any direction are drawn on any positions on the surface of the coating 3 (although only one virtual straight line is illustrated in FIG. 2, the same applies to the other virtual straight lines). Secondly, for all of the projections 35 and 35 through which three or more virtual straight lines L pass, the lengths of a plurality of line segments that are the parts of the three or more virtual straight lines L passing through the projections 35 and 35 (for example, the lengths a, b, c and d in FIG. 2) are measured. Furthermore, an average value of the lengths of the a plurality of line segments that are the parts of the virtual straight line L passing through the projections 35 and 35 (for example, an average value of a, b, c, d, . . . ) is calculated, and the average value is set as the length of the projection 35.

In addition, in order to measure the length of the projection 35, an image obtained by observing the surface of the coating 3 using a scanning electron microscope (SEM) can be used. In a case where the length of the projection 35 is measured by using an image of SEM, the profiles of the respective projections 35 can be identified according to the intensity of a contrast (contrast).

Specifically in a case where the length of the projection 35 is equal to or less than 5.0 occurrence of cracks in the coating 3 due to that the coating 3 contains zirconium can be prevented, and thus further excellent corrosion resistance can be obtained. The length of the projection 35 is more preferably equal to or less than 2.0 μm so as to prevent the cracks in the coating 3 more effectively. On the other hand, if the length of the projection 35 is excessively short, it is possible that the wettability of a coating material for use in the formation of an overcoating layer on the coating 3 worsens, and thus the anchor effect of the projections 35 against the overcoating layer worsens. Specifically, when the length of the projection 35 is equal to or more than 0.1 μm, the anchor effect of the projections 35 against the overcoating layer and the adhesive formed on the coating 3 can be sufficiently obtained. Consequently, the adhesiveness between the coating 3 and the adhesive is further improved and the tightness of adhesion with an overcoating layer becomes fine, and thus a surface-treated steel sheet having excellent corrosion resistance is formed. The length of the projection 35 is more preferably equal to or more than 0.2 μm so as to improve the anchor effect by the projections 35.

The minimum value among the lengths of all of the projections 35 measured for calculating the length of the projection 35 (the minimum value among the lengths of the virtual straight lines passing through the projections in all of the projections through which the above-mentioned three or more virtual straight lines pass) is preferably equal to or more than 0.1 μm, more preferably equal to or more than 0.2 μm. When the minimum value among the lengths of the projections 35 is equal to or more than 0.1 μm, the anchor effect of the projections 35 against the overcoating layer and the adhesive formed on the coating 3 becomes significant.

Furthermore, the maximum value among the lengths of the projections 35 measured for calculating the length of the projection 35 (the maximum value among the lengths of the virtual straight lines passing through the projections in all of the projections through which the above-mentioned three or more virtual straight lines pass) is preferably equal to or less than 5.0 μm, more preferably equal to or less than 2.0 μm. When the maximum value of the length of the projection 35 is equal to or less than 5.0 μm, the crack of the coating 3 can be prevented more effectively.

It is preferable that the surface of the coating 3 in a rectangular area of 1 μm on one side has an arithmetic mean roughness (Ra) of 5 to 50 nm, a maximum cross-sectional height (Rt) of a roughness curve of 50 to 500 nm, and a root mean square roughness (Rq) of 10 to 100 nm. Where Ra, Rt and Rq on the surface of the coating 3 are within the above-mentioned ranges, Ra, Rt and Rq are sufficiently large, and thus the tightness of adhesion of the coating 3 with an overcoating layer and the adhesiveness of the coating 3 with an adhesive become finer by the anchor effect due to the suitable roughness of the surface of the coating 3 (the surfaces of the projections 35). In order to further improve the above-mentioned anchor effect, it is more preferable that the arithmetic mean roughness (Ra) is equal to or more than 10 nm, the maximum cross-sectional height (Rt) of the roughness curve is equal to or more than 100 nm, and the root mean square roughness (Rq) is equal to or more than 20 nm.

Where Ra, Rt and Rq on the surface of the coating 3 are within the above-mentioned ranges, Ra, Rt and Rq are sufficiently small, and thus cracks due to that the coating 3 contains zirconium can be prevented more effectively, and more excellent corrosion resistance can be obtained. In order to further improve the above-mentioned crack-prevention effect, it is more preferable that the arithmetic mean roughness (Ra) be equal to or less than 40 nm, the maximum cross-sectional height (Rt) of the roughness curve be equal to or less than 400 nm, and the root mean square roughness (Rq) be equal to or less than 80 nm.

It is preferable that the concentration of the zirconium in the area between the adjacent projections 35 and 35 (the valley part) in the coating 3 be less than the concentration of the zirconium in the areas (island parts) where the projections 35 have been formed. In this case, further excellent corrosion resistance can be obtained by the barrier property by that the coating 3 contains zirconium.

The concentrations of the zirconium in "the area between the adjacent projections 35" and "the areas on which the projections 35 have been formed" in the coating 3 can be confirmed by the method for analyzing the coating 3 from the surface by using an electron beam micro analyzer (EPMA) or a scanning electron microscope/an energy dispersive X-ray spectrometry (SEM/EDX).

Furthermore, it is preferable that the concentration of the acrylic resin in the area between the adjacent projections 35 and 35 (the valley part) in the coating 3 be more than the concentration of the acrylic resin in the area (island part) on which the projection 35 is formed. In this case, finer tightness of adhesion between the coating 3 and the overcoating layer can be obtained, and finer adhesiveness between the coating 3 and the adhesive can be obtained by the acrylic resin aggregated between the adjacent projections 35.

That the acrylic resin is aggregated between the adjacent projections 35 and 35 can be confirmed by the method shown below. That is, the surface of the coating 3 is analyzed by using an electron probe micro analyzer (EPMA) or a scanning electron microscope/an energy dispersive X-ray spectrometry (SEM/EDX).

In the coating of this embodiment, the carbon component detected by the above-mentioned analysis method is derived from an acrylic resin. Therefore, the distribution of the carbon component detected by the above-mentioned analysis method is assumed as the distribution of the acrylic resin and evaluated.

That the carbon component in the coating is derived from the acrylic resin can be confirmed by the method shown below. That is, the coating that has been peeled from the surface-treated steel sheet by an acid treatment is subjected to an infrared ray spectroscopy and a thermal decomposition gas chromatograph-mass analyzer (GC-MS) analysis. From the result of the analysis from the attribution of the observed absorptions derived from the resin component in the infrared absorption spectrum of the coating obtained by infrared ray spectroscopy and the analysis result of the thermal decomposition GC-MS, it can be confirmed that the carbon component in the coating is derived from the acrylic resin.

Since the surface-treated steel sheet 10 in this embodiment has the coating 3 on which a plurality of island projections 35 and 35 each having a specific size are present on the surface in a planar view, the adhesiveness with an adhesive is finer, and the tightness of adhesion with an overcoating layer is fine.

Furthermore, in the surface-treated steel sheet 10 of this embodiment, the zirconium and the acrylic resin 31 contained in the coating 3 have formed a crosslinking structure. Furthermore, the zirconium in the coating 3 has formed a Zr—O—M bond (M: a metal element in the plated layer) with the surface of the plated layer 2. Because of these matters, the coating 3 possessed by the surface-treated steel sheet 10 has excellent tightness of adhesion with the plated layer 2 and excellent barrier property. Accordingly, the surface-treated steel sheet 10 has excellent corrosion resistance.

Figure 4:
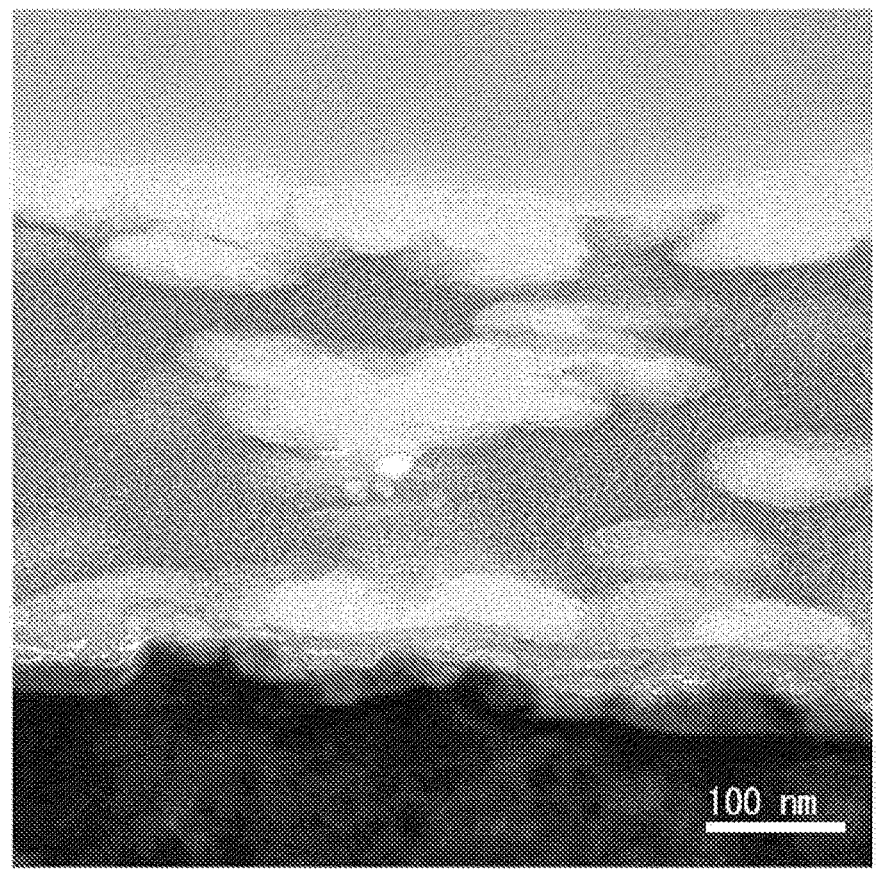
FIG. 4 is a TEM image of the cross-section of a surface-treated steel sheet of Example 42.
Figure 13:
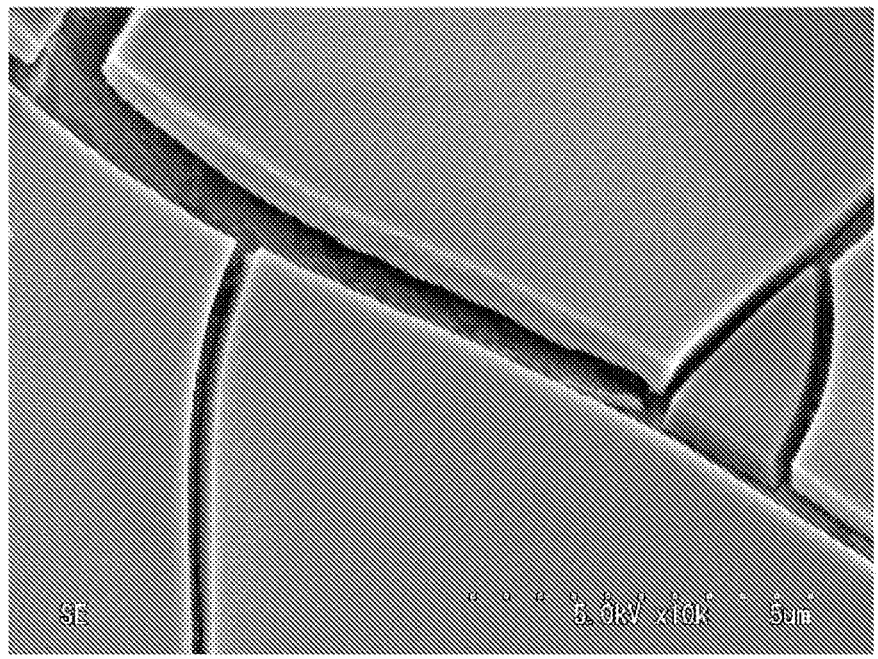
FIG. 13 is an SEM image of the surface of a surface-treated steel sheet of Comparative Example 9.
Figure 17:
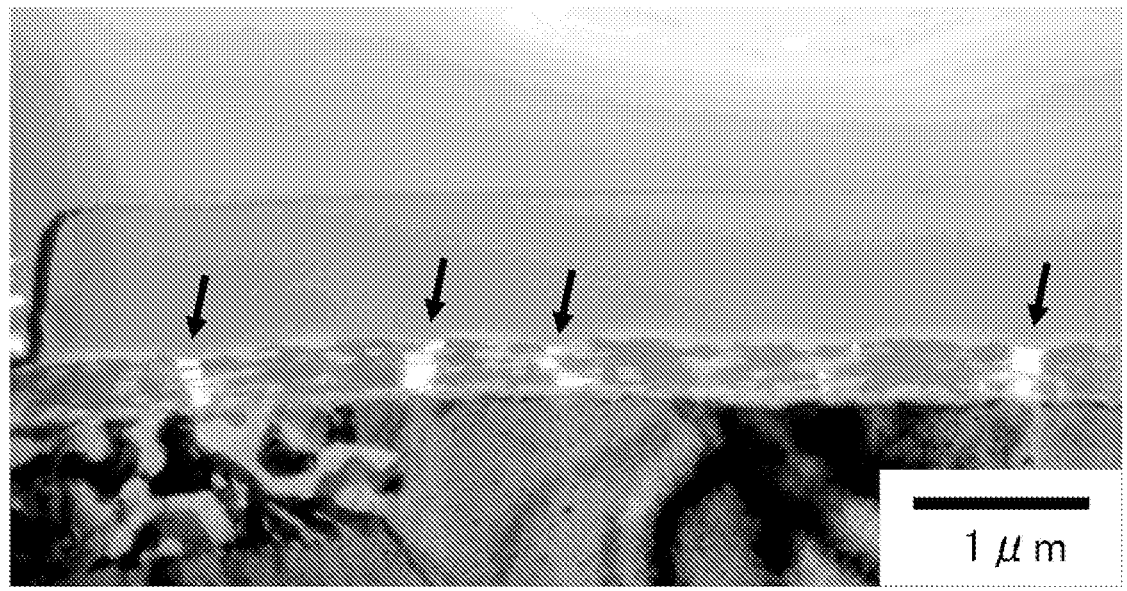
FIG. 17 is a TEM image of the cross-section of a surface-treated steel sheet as a specific example of the surface-treated steel sheet of the first embodiment.
Figure 18:
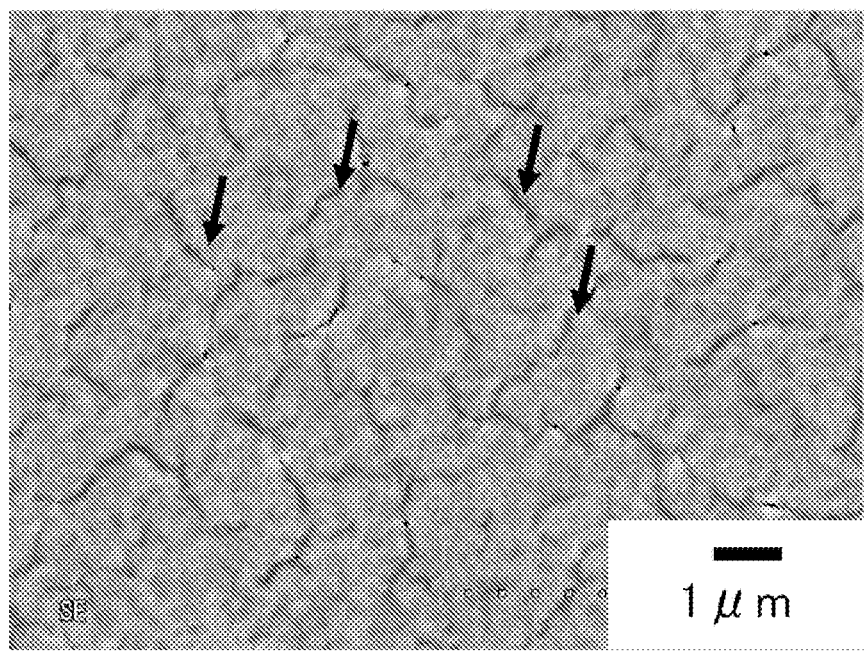
FIG. 18 is an SEM image of the surface of the surface-treated steel sheet shown in FIG. 17.

Secondly, with reference to FIGS. 4, 17 and 18, the correlation of the cross-section structure and the surface structure of the surface-treated steel sheet 10 in this embodiment will be explained. FIG. 17 is a TEM image of a cross-section of a steel sheet as a specific example (Example 42 mentioned below) of the surface-treated steel sheet 10 of this embodiment, and FIG. 18 is an SEM image of the surface of the surface-treated steel sheet of FIG. 17. As shown in FIGS. 4 and 17, portions in which the acrylic resin links in the thickness direction in the range from the upper area A to the lower area B, which includes the central area C of the coating 3, are present on the cross-section of the surface-treated steel sheet 10 of this embodiment. As shown in FIG. 18, each of the portions is a portion where the acrylic resin has aggregated between the adjacent projections 35 and 35 in the observation of the surface, and corresponds to the valley part between the projection 35 and the projection 35 (see the portions represented by the plurality of arrows in FIG. 18). That is, the aggregated portions of the acrylic resin are formed by the linking of the acrylic resin in columnar shapes in the thickness direction on the cross-section of the coating 3. In a case where only the inhibitor phase (zirconium, vanadium, phosphorus, cobalt) is present and the acrylic resin is absent in the coating, cracks occur as shown in FIG. 13 mentioned below (Comparative Example 9 in Examples), whereas in this embodiment, the columnar bridge parts formed of the acrylic resin are formed at intervals in the order of microns and act as a buffer material, and thus the cracks of the coating 3 are suppressed.

That is, the coating 3 of the surface-treated steel sheet 10 of this embodiment has a surprising structure that exerts (1) a barrier effect to prevent elution of the corrosion suppressing agent by the aggregation of the acrylic resin on the surface of the coating 3 (long-term corrosion resistance), and (2) a bridge effect in which the acrylic resin aggregates like columns in the coating 3 to thereby support the valley parts between the projections 35 and 35 on the surface (suppression of generation of cracks, adhesiveness with the adhesive, and tightness of adhesion with an overcoating layer).

It is presumed that the mechanism for forming the structures of the cross-section and the surface of the coating 3 in the surface-treated steel sheet 10 of this embodiment relates to the steel sheet entering temperature, the time from the application to the drying, and the like in the step for applying the aqueous surface treating agent containing the acrylic resin. This is because a special structure is presumed to be formed by the surface adsorption and interface adsorption of the acrylic resin by the difference in surface free energies of the acrylic resin and other components in the coating on a surface 1a of the steel sheet 1 during the contacting of the steel sheet 1 with the aqueous surface treating agent containing the acrylic resin. Furthermore, the important factors for determining the transfer speed and transfer time of the acrylic resin in the coating include the steel sheet entering temperature, the time from the application to the drying, and the like.

1.2 Second Embodiment

Figure 3:
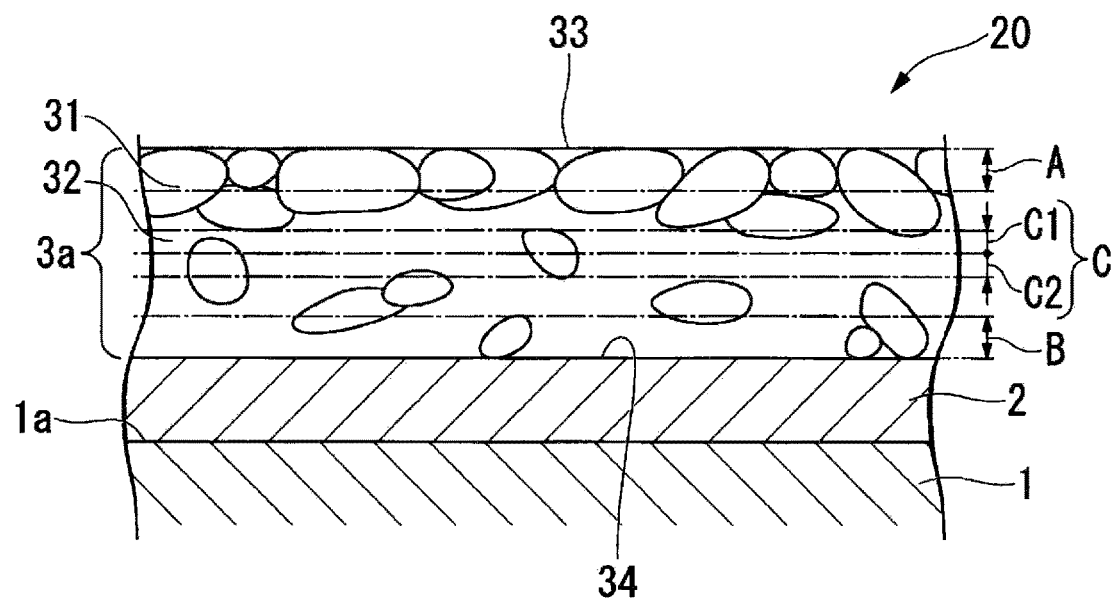
FIG. 3 is a schematic view showing the cross-section structure of a surface-treated steel sheet of a second embodiment.

FIG. 3 is a schematic view for explaining the cross-section structure of a surface-treated steel sheet of a second embodiment.

Similarly to the surface-treated steel sheet 10 shown in FIG. 1, a surface-treated steel sheet 20 shown in FIG. 3 has a steel sheet 1, a plated layer 2 containing zinc formed on a surface 1a of the steel sheet 1 (upper surface in FIG. 3), and a coating 3a formed on the plated layer 2.

In the surface-treated steel sheet 20 shown in FIG. 3, the concentration distribution of the acrylic resin 31 in the coating is different from that in the surface-treated steel sheet 10 shown in FIG. 1. Specifically, in the surface-treated steel sheet 20 shown in FIG. 3, the area ratio of the acrylic resin in an area B (lower area) from an interface 34 with the plated layer 2 of a coating 3a on a cross-section to a thickness of one-fifth of the film thickness is less than 80 area %. Therefore, since the area ratio of an inhibitor phase 32 (zirconium, vanadium, phosphorus, cobalt) in the area B is sufficiently ensured in the surface-treated steel sheet 20, the corrosion resistance improving effect by the inhibitor phase 32 can be effectively obtained.

Since the area ratio of the acrylic resin 31 in the upper area A on the cross-section of the coating 3a is equal to or more than 80 area % in the surface-treated steel sheet 20 of this embodiment as in the surface-treated steel sheet 10 shown in FIG. 1, the elution of the corrosion suppressing agent (zirconium, vanadium, phosphorus, cobalt) from the inside of the coating 3a under a wet environment is suppressed by the acrylic resin 31 present at a high concentration on the surface 33. Therefore, the barrier property by the coating 3a is exerted for a long term, and excellent corrosion resistance can be obtained. Furthermore, since the area ratio of the acrylic resin 31 in the upper area A is equal to or more than 80 area %, fine adhesiveness between the coating 3a and the adhesive can be obtained by the acrylic resin 31 present at a high concentration on the surface 33.

Furthermore, since the area ratio of the acrylic resin 31 at the central area C of the cross-section in the coating 3a is equal to or more than 5 area % in the surface-treated steel sheet 20 of this embodiment, a barrier property improving effect by the crosslinking structure between the zirconium and the acrylic resin can be obtained. Furthermore, since the area ratio of the acrylic resin 31 at the central area C of the cross-section of the coating 3a is equal to or less than 50 area %, the coating 3a sufficiently contains the inhibitor phase 32 (zirconium, vanadium, phosphorus, cobalt), and thus excellent corrosion resistance and blacking resistance can be obtained.

Furthermore, the surface-treated steel sheet 20 also has the surface structure as shown in FIG. 2 as in the surface-treated steel sheet 10. Accordingly, the surface-treated steel sheet 20 has fine adhesiveness with an adhesive, and has fine tightness of adhesion with an overcoating layer.

Furthermore, similarly to the surface-treated steel sheet 10 shown in FIG. 1, the zirconium and the acrylic resin 31 contained in the coating 3a have formed a crosslinking structure also in the surface-treated steel sheet 20. Furthermore, the zirconium in the coating 3a has formed a Zr—O-M bond (M: a metal element in the plated layer) with the surface of the plated layer 2. Because of these matters, the coating 3a possessed by the surface-treated steel sheet 20 has excellent tightness of adhesion with the plated layer 2 and has excellent barrier property. Accordingly, the surface-treated steel sheet 20 has more excellent corrosion resistance.

Secondly, the correlation of the cross-section structure and the surface structure of the surface-treated steel sheet 20 of the second embodiment will be explained with reference to FIG. 5. In the second embodiment, similarly to the first embodiment, portions in which the acrylic resin links in the thickness direction in the range from the upper area A to the lower area B, which includes the central area C of the coating 3a, are present on the cross-section of the coating 3a of the surface-treated steel sheet 20. Each of the portions is a portion where the acrylic resin has aggregated in a valley part between adjacent projections 35 and 35 in the above-mentioned observation of the surface. That is, the aggre-gated portions of the acrylic resin are formed by the linking of the acrylic resin in the thickness direction on the cross-section of the coating 3a. By this way, as explained in the above-mentioned first embodiment, cracks on the surface layer of the coating 3a are suppressed, and adhesiveness with an adhesive and tightness of adhesion with an overcoating layer are improved (a bridge effect). The second embodiment has a similar structure to that of the first embodiment.

2. Method for Producing Surface-Treated Steel Sheet

The methods for producing the surface-treated steel sheets 10 and 20 of the above-mentioned first embodiment and the second embodiment will now be explained with reference to examples.

Firstly, a steel sheet 1 is prepared, and a plated layer(s) 2 containing zinc is/are formed on one surface or both surfaces of the steel sheet 1 by a conventionally known method.

Subsequently, aqueous surface treating agents containing the respective components contained in the coatings 3 and 3a in the first embodiment and the second embodiment at predetermined ratios are each applied onto the plated layer 2 and dried, whereby the coating 3 or 3a is formed on the plated layer 2.

(Aqueous Surface Treating Agent)

The aqueous surface treating agent contains an acrylic resin, zirconium, vanadium, phosphorus and cobalt. In this embodiment, for example, an aqueous surface treating agent that contains a zirconium carbonate compound (A), an acrylic resin (B), a vanadium compound (C), a phosphorus compound (D), a cobalt compound (E) and water and has a pH of 8 to 11 is used as the aqueous surface treating agent.

(Acrylic Resin (B))

When the aqueous surface treating agent is applied and dried, the acrylic resin (B) becomes the acrylic resin 31 included in the above-mentioned coating 3 or 3a.

The content of the acrylic resin (B) in the aqueous surface treating agent is preferably 20 to 60% by mass with respect to the total solid content of the aqueous surface treating agent. The content of the acrylic resin (B) in the aqueous surface treating agent is more preferably 20 to 40% by mass. The content of the acrylic resin (B) in the aqueous surface treating agent is preferably equal to or more than 20% by mass since the coating 3 or 3a in which the concentration of the acrylic resin 31 in the entirety of the coating 3 or 3a is 20 to 60% by mass can be formed.

The method for polymerizing the acrylic resin (B) used in the aqueous surface treating agent is not specifically limited. For example, a suspension polymerization process, an emulsification polymerization process and a solution polymerization process can be used. Furthermore, a solvent and/or a polymerization initiator may be used in polymerizing the acrylic resin (B). The polymerization initiator is not specifically limited, and for example, radical polymerization initiators such as azo-based compounds and peroxide-based compounds can be used. It is preferable that the polymerization initiator be used by 0.1 to 10% by mass with respect to the total solid content of the resin. The reaction temperature is generally room temperature to 200° C., preferably 40 to 150° C. The reaction time is 30 minutes to 8 hours, preferably 2 to 4 hours.

(Zirconium Carbonate Compound (A))

When the aqueous surface treating agent is applied and dried, the zirconium carbonate compound (A) in the aqueous surface treating agent reacts to crosslink with the acrylic resin (B) to form the coating 3 or 3a having a crosslinking structure of the zirconium and the acrylic resin 31. Furthermore, the carbonate ion is vaporized when the aqueous surface treating agent is applied and dried, and the residual zirconium atoms are bonded via an oxygen atom, whereby the molecular weight of the zirconium carbonate compound (A) increases. In this process, the Zr—OH group forms a Zr—O-M bond (M: a metal element in the plated layer) with the surface of the plated layer 2.

The kind of the zirconium carbonate compound (A) is not specifically limited, and examples include zirconium carbonate, ammonium zirconium carbonate, potassium zirconium carbonate and sodium zirconium carbonate, and one or more of these can be used. Among these, zirconium carbonate and/or ammonium zirconium carbonate is/are preferably used since the coating 3 or 3a having excellent corrosion resistance can be obtained.

(Vanadium Compound (C))

Examples of the vanadium compound (C) contained in the aqueous surface treating agent include vanadium compounds obtained by reducing a pentavalent vanadium compound to a di- to tetravalent vanadium compound by a reducing agent such as vanadium pentoxide ($V_2O_5$), metavanadic acid ($HVO_3$), ammonium metavanadate, sodium metavanadate and vanadium oxytrichloride ($VOCl_3$), vanadium compounds having an oxidation number of tetravalent to bivalent such as vanadium trioxide ($V_2O_3$), vanadium dioxide ($VO_2$), vanadium oxysulfate ($VOSO_4$), vanadium oxyoxalate $[VO(COO)_2]$, (vanadium oxyacetylacetonate $[VO(OC(CH_3)=CHCOCH_3))_2]$, vanadium acetyl acetonate $[V(OC(CH_3)=CHCOCH_3))_3]$, vanadium trichloride ($VCl_3$), phosphorus vanadomolybdenate $\{H_{15-x}[PV_{12-x}Mo_xO_{40}].nH_2O$ ($6<x<12$, $n<30$)$\}$, vanadium sulfate ($VSO_4.8H_2O$), vanadium dichloride ($VCl_2$) and vanadium oxide (VO), and the like.

(Phosphorus Compound (D))

Examples of the phosphorus compound (D) contained in the aqueous surface treating agent include an inorganic acid anion having a phosphorus-containing acid group, an organic acid anion having a phosphorus-containing acid group, and the like.

Examples of the inorganic acid anion having a phosphorus-containing acid group include inorganic acid anions formed by releasing at least one hydrogen from inorganic acids such as orthophosphoric acid, metaphosphoric acid, condensed phosphoric acid, pyrophosphoric acid, tripolyphosphoric acid, tetraphosphoric acid and hexametaphosphoric acid, and salts of the inorganic acid anions.

Examples of the organic acid anion having a phosphorus-containing acid group include organic acid anions formed by releasing at least one hydrogen from organic phosphonic acids, organic phosphoric acids, and the like such as 1-hydroxymethane-1,1-diphosphonic acid, 1-hydroxyethane-1,1-diphosphonic acid, 1-hydroxypropane-1,1-diphosphonic acid, 1-hydroxyethylene-1,1-diphosphonic acid, 2-hydroxyphosphonoacetic acid, aminotri(methylenephosphonic acid), ethylenediamine-N,N,N',N'-tetra(methylenephosphonic acid), hexamethylenediamine-N,N,N',N'-tetra(methylenephosphonic acid), diethylenetriamine-N,N,N',N'',N''-penta(methylenephosphonic acid), 2-phosphonic acidbutane-1,2,4-tricarboxylic acid, inositol hexaphosphonic acid and phytic acid, and salts of the organic acid anions.

(Cobalt Compound (E))

Examples of the cobalt compound (E) contained in the aqueous surface treating agent include cobalt sulfate, cobalt nitrate and cobalt carbonate.

(Lubricant)

The aqueous surface treating agent may contain a lubricant so as to improve the scratch resistance of the surface-treated steel sheet. Examples of the lubricant include a polyethylene wax, a polyethylene oxide wax, a polypropylene oxide wax and the like.

The content of the lubricant is preferably 1 to 8% by mass with respect to the total solid content of the aqueous surface treating agent. When the content of the lubricant is equal to or more than 1% by mass, an effect to improve scratch resistance can be sufficiently obtained. Furthermore, when the content of the lubricant is less than or equal to 8% by mass, worsening of the coating tightness of adhesion of the coating 3 due to the incorporation of the lubricant can be prevented.

The lubricant is preferably a lubricant having a mass average particle size of 0.1 to 5.0 μm. When the mass average particle size is equal to or more than 0.1 an aqueous surface treating agent in which the lubricant is hard to aggregate and which has excellent stability is formed. Furthermore, when the mass average particle size of the lubricant is equal to or less than 5.0 μm, the dispersion stability is fine.

The method for measuring the mass average particle diameter of the lubricant is not limited, and the mass average particle diameter can be measured by, for example, (a laser diffraction diffusion particle size distribution measurement apparatus MICROTRAC HRA-X100) manufactured by Nikkiso Co., Ltd.

(pH)

The pH of the aqueous surface treating agent is preferably 8 to 11, more preferably 8.5 to 10. When the pH in the aqueous surface treating agent is equal to or more than 8, the zirconium carbonate compound (A) can be stably dissolved in the aqueous surface treating agent. On the other hand, when the pH of the aqueous surface treating agent is equal to or less than 11, excessive dissolution of the plated layer 2 upon application of the aqueous surface treating agent to the plated layer 2 can be suppressed. Furthermore, when the pH is within the range, the aqueous surface treating agent is stabilized.

The method for measuring the pH of the aqueous surface treating material is not limited, and the pH can be measured, for example, by using (HM-30R) manufactured by DKK-Toa Corporation at a measurement temperature of 25° C.

The adjusting agent for adjusting the pH of the aqueous surface treating material is not specifically limited, and examples include ammonia, guanidine carbonate, carbonic acid, acetic acid, hydrofluoric acid and the like.

(Component Containing Fluoride Ion)

The aqueous surface treating agent may contain a component containing fluoride ion as necessary. The component containing fluoride ion is used so as to improve the tightness of adhesion and adhesiveness of the coatings 3 and 3a.

Examples of the component containing the fluoride ion to be contained in the aqueous surface treating agent include ammonium zirconium fluoride, ammonium fluorosilicate, ammonium titanium fluoride, sodium fluoride, potassium fluoride, calcium fluoride, lithium fluoride, titanium hydrofluoric acid, zirconium hydrofluoric acid, and the like.

When a coating formed of the aqueous surface treating agent is formed on the plated layer 2, and the coating is then dried, a part of or whole component containing fluoride ion in the aqueous surface treating agent disappears.

The aqueous surface treating agent has a mass ratio of the mass of the fluorine to the mass of the zirconium (F/Zr) of preferably 0.01 to 2.0. The above-mentioned mass ratio (F/Zr) is preferably equal to or more than 0.01 since the content of the fluoride ion in the coating 3 can be ensured and thus the tightness of adhesion and adhesiveness of the coating 3 are improved. The above-mentioned mass ratio (F/Zr) is preferably equal to or less than 2.0 since a zirconium content can be ensured. The above-mentioned mass ratio (F/Zr) is more preferably 0.1 to 0.2.

The aqueous surface treating agent can be obtained by mixing the above-mentioned components in water such as deionized water or distilled water.

Where necessary, alcohols, ketones, cellosolve-based water-soluble solvents, surfactants, defoaming agents, leveling agents, antibacterial and antimold agents, thickening agents, electroconductive substances for improving welding property, coloring pigments for improving designing property, matting materials and the like may be added to the aqueous surface treating agent. It is important that these are added to the extent that the quality obtained by the present invention is not deteriorated, and the addition amount is at most less than 5% by mass with respect to the total solid content of the aqueous surface treatment liquid.

The viscosity of the aqueous surface treating agent is not specifically limited, and the value measured at 25° C. is, for example, equal to or more than 1 mPa·s and equal to or less than 4 mPa·s, preferably equal to or more than 1.2 mPa·s and equal to or less than 3 mPa·s, more preferably equal to or more than 1.5 mPa·s and equal to or less than 2 mPa·s. When the viscosity of the aqueous surface treating agent is equal to or less than 4 mPa·s, the transfer speed of the acrylic resin becomes sufficiently fast during the formation of a coating, and thus the ranges of the area ratios of the acrylic resin in the upper area A and the central area C can be achieved more surely by the principle mentioned below. Furthermore, when the viscosity of the aqueous surface treating agent is equal to or more than 1 mPa·s, application using a roll coater can be conducted with excellent producibility, and the coatings 3 and 3a can be formed. The viscosity can be measured by using, for example, the method described in JIS Z 8803: 2011.

Subsequently, in this embodiment, the aqueous surface treating agent obtained by this way is applied onto the plated layer 2 to form a coating.

As the method for applying the aqueous surface treating agent onto the plated layer 2, a roll coater is used. Since the application is conducted by using a roll coater in this embodiment, the film thickness can be easily controlled and excellent producibility can be obtained by adjusting the peripheral speed.

Furthermore, during the application of the aqueous surface treating agent onto the plated layer 2, the temperature of the steel sheet 1 when the steel sheet 1 enters into the roll coater (hereinafter may be referred to as "steel sheet entering temperature") is preferably equal to or more than 5° C. and equal to or less than 80° C. The structure of the above-mentioned coating 3 is formed when the aqueous surface treating agent containing the acrylic resin is applied onto the surface of the steel sheet 1, a part of the acrylic resin transfers to the upper and lower parts in the coating as mentioned below, and the acrylic resin is adsorbed on the surface and the interface. In a case where the steel sheet entering temperature is equal to or more than 5° C., which is the above-mentioned lower limit value, the speed of the surface adsorption can be sufficiently increased. Consequently, the acrylic resin transfers by a sufficient distance within the time from the formation of the coating to the initiation of drying mentioned below, whereby the above-mentioned ranges of the area ratios of the acrylic resin in the upper area A and the central area C can be achieved, and the acrylic resin aggregates and is present in the valley part between the adjacent projections 35 and 35 also in the surface structure, whereby the cracks are suppressed. On the other hand, when the steel sheet entering temperature goes beyond the above-mentioned upper limit value of 80° C., the evaporation of the water content in the aqueous surface treating agent is too rapid, and thus a phenomenon in which bubble-like small bulging and pores generate, a so-called foaming phenomenon occurs depending on the composition of the aqueous surface treating agent. The steel sheet entering temperature is more preferably equal to or more than 10° C. and equal to or less than 60° C., further preferably equal to or more than 15° C. and equal to or less than 40° C.

Furthermore, the temperature of the aqueous surface treating agent during the application of the aqueous surface treating agent onto the plated layer 2 is not specifically limited, and can be, for example, equal to or more than 5° C. and equal to or less than 60° C., preferably equal to or more than 10° C. and equal to or less than 50° C., further preferably equal to or more than 15° C. and equal to or less than 40° C. By setting the temperature of the aqueous surface treating agent during the application to be within the above-mentioned range, application using a roll coater can be conducted with excellent producibility, and the coatings 3 and 3a can be formed.

The adhesion amount of the aqueous surface treating agent during the application of the aqueous surface treating agent onto the plated layer 2 is not specifically limited, and is, for example, equal to or more than 0.03 g/m$^2$ and equal to or less than 3 g/m$^2$, preferably equal to or more than 0.3 g/m$^2$ and equal to or less than 2 g/m$^2$. The adhesion amount of the aqueous surface treating agent affects the transfer distance of the acrylic resin in the coating. Accordingly, when the adhesion amount is within the above-mentioned range, the effect to improve tightness of adhesion by the bonding of the zirconium and the surface of the plated layer 2, and the effect to improve the barrier property by the crosslinking structure between the zirconium and the acrylic resin are further improved. Consequently, further excellent corrosion resistance can be obtained. Generation of cracks due to the incorporation of the zirconium in the coatings 3 and 3a can be prevented, and more excellent corrosion resistance can be obtained.

In this embodiment, the steel sheet 1 on which the coating has been formed is retained without being dried, from the formation of the coating by applying the aqueous surface treating agent onto the plated layer 2 to the initiation of the drying, for equal to or more than 0.5 seconds, preferably 0.5 to 8 seconds, more preferably 0.5 to 4 seconds. In a case where the aqueous surface treating agent containing the zirconium carbonate compound (A) and the acrylic resin (B) is applied onto the plated layer 2 containing zinc, the distribution of the acrylic resin in the coating obtained after the drying can be controlled by adjusting the time from the application onto the plated layer 2 and formation of the coating to the initiation of the drying to be described below.

When the coating is formed by applying the aqueous surface treating agent containing the acrylic resin, zirconium, vanadium, phosphorus and cobalt onto the plated layer 2 containing zinc by using a roll coater, the acrylic resin (B) contained in the coating initiates transfer to a position where the acrylic resin (B) can be stably present in a self-alignment manner by the balance of surface energy. Specifically, the acrylic resin (B) in the coating transfers toward the uppermost surface or the lowermost surface where the acrylic resin (B) can be stably present. The surface where the acrylic resin (B) in the coating can be present in the most stable manner is the uppermost surface. Therefore, the transfer speed toward the uppermost surface of the acrylic resin (B) in the coating is faster than the transfer speed toward the lowermost surface of the acrylic resin (B) in the coating.

The relationship between the time from the formation of the coating to the initiation of the drying and the disposition of the acrylic resin (B) that transfers in the coating changes depending on the composition of the aqueous surface treating agent, the concentration of the acrylic resin (B) in the aqueous surface treating agent, and the like. However, when the time from the formation of the coating to the initiation of the drying is equal to or more than 0.5 seconds, a sufficient amount of the acrylic resin (B) in the coating can transfer toward the uppermost surface in a self-alignment manner. Therefore, the acrylic resin (B) is concentrated on the uppermost surface in the coating, and as shown in FIGS. 1 and 3, the coatings 3 and 3a obtained after the drying has an area ratio of the acrylic resin in the upper area A on the cross-section of the coating 3 of 80 to 100 area %, and has an area ratio of the acrylic resin in the central area C of 5 to 50 area %.

When the time from the formation of the coating to the initiation of the drying is equal to or more than 3 seconds, a sufficient amount of the acrylic resin (B) in the coating can transfer toward the uppermost surface and the lowermost surface in a self-alignment manner. Accordingly, the acrylic resin (B) is concentrated in the uppermost surface and the lowermost surface in the coating, and in the coating 3 obtained after the drying, the area ratio of the acrylic resin is 80 to 100 area % not only in the upper area A but also in the lower area B in the cross-section of the coating 3, and the area ratio of the acrylic resin is 5 to 50 area % in the central area C as shown in FIG. 1.

When the time from the formation of the coating to the initiation of the drying is set to preferably equal to or less than 8 seconds, more preferably equal to or less than 4 seconds, excellent producibility can be obtained.

The transfer of the acrylic resin (B) in the above-mentioned coating is caused when a coating is formed by applying the aqueous surface treating agent containing the acrylic resin, zirconium, vanadium, phosphorus and cobalt onto the plated layer 2 containing zinc by using a roll coater and is characteristic of the above-mentioned coating.

For example, in a case where an aqueous surface treating agent containing other resin such as a urethane resin or the like instead of the acrylic resin is applied onto a plated layer containing zinc, the resin is not concentrated in the uppermost surface or the lowermost surface of the coating even if the time until drying is initiated is set to be within the above-mentioned range.

Subsequently, the coating that has been retained for a predetermined time after the formation of the coating is dried.

By applying the above-mentioned aqueous surface treating agent by using a roll coater and drying the agent, a plurality of island projections is densely formed on the surface in a planar view by the action shown below.

That is, in the coating that has been retained for a predetermined time, the acrylic resin is floating in the vicinity of the uppermost surface. It is presumed that a plurality of predetermined island projections is densely formed since the coating is heated and the surface is cured in this state.

As the temperature when drying the coating, the peak metal temperature (PMT) when drying the coating is preferably 60 to 200° C., more preferably 80 to 180° C. The peak metal temperature is preferably equal to or more than 60° C. since the water content, which is a main solvent, is difficult to remain in the coatings 3 and 3a. Furthermore, when the peak metal temperature is equal to or less than 200° C., the decomposition of the acrylic resin 31 does not occur, and thus problems such as lowering of corrosion resistance do not occur.

In a case where a steel sheet on which the coating has been formed is heated by, for example, a method for passing the steel sheet through a heating furnace, the heating time during the drying of the coating can be appropriately determined depending on the length of a heating furnace, and the line speed of the steel sheet on which the coating has been formed.

Examples of the drying method in drying the coating include induction heating, hot air drying or furnace drying.

By the above-mentioned steps, the surface-treated steel sheet 10 of the first embodiment or the surface-treated steel sheet 20 of the second embodiment can be obtained.

Examples of the adhesive and the overcoating layer that can provide fine adhesiveness with the coatings 3 and 3a of the surface-treated steel sheets 10 and 20 include silicon-based (including acryl-modified and epoxy-modified), epoxy-based, acrylic resin-based, phenol-based, urethane-based, vinyl acetate-based, cyanoacrylate-based, styrene-butadiene rubber-based adhesives and overcoating layers, and the like.

Furthermore, the material that is attached via an adhesive onto the coatings 3 and 3a of the surface-treated steel sheets 10 and 20 is not specifically limited, and examples include steel sheets, mortal, float glass, ceramic tiles, and middle density fiber plates (MDFs) and the like.

EXAMPLES

Subsequently, Examples of the present invention will be explained. However, the present invention is not limited to the Examples mentioned below.

1. Production of Surface-Treated Steel Sheet

A surface-treated steel sheet was produced as follows on the premise that a cross-section of a coating of a surface-treated steel sheet is mainly observed.

Firstly, a steel sheet having plated layers on the both surfaces to be described below was prepared. Furthermore, an aqueous surface treating agent containing the respective components shown below at the compounding ratio shown in Table 3 was prepared.

The aqueous surface treating agent was prepared by sequentially adding the respective components to a predetermined amount of deionized water under stirring by using a propeller stirrer so as to have a solid content concentration of 15% by mass. As an agent for adjusting the pH of the aqueous surface treating agent, carbonic acid and/or ammonia were/was used. In a case where the aqueous surface treating agent contained D1 and D2 as the phosphorus compound (P), the aqueous surface treating agent was prepared such that the mass converted to P in the aqueous surface treating agent became D1:D2=85:15.

(Steel Sheet Having Plated Layers on Both Surfaces)

M1: Molten Zn plating (plating adhesion amount: 90 g/m$^2$)

M2: Molten 11% Al-3% Mg-0.2% Si—Zn plating (plating adhesion amount: 90 g/m$^2$)

M3: Electric Zn plating (plating adhesion amount: 20 g/m$^2$)

M4: Electric 11% Ni—Zn plating (plating adhesion amount: 20 g/m$^2$)

M5: Molten 55% Al-1.6% Si—Zn plating (plating adhesion amount: 90 g/m$^2$)

(Components of Aqueous Surface Treating Agent)

"Zirconium Compound (Zr)"

A1: Potassium zirconium carbonate

A2: Ammonium zirconium carbonate

A3: Ammonium zirconium fluoride

"Acrylic Resin"

Styrene (b1), (meth)acrylic acid (b2), a (meth)acrylic acid alkyl ester (b3) and acrylonitrile (b4), for which abbreviations are shown in Table 1, were used at the ratios shown in Table 2 to give the copolymers (acrylic resins) of B1 to B17 shown in Table 2. The Tg shown in the right end of Table 1 shows the glass transition temperatures of polymers of the respective monomers. The Tg shown in the right end of Table 2 shows the glass transition temperatures of the acrylic resins of B1 to B17.

The content of the acrylic resin in the aqueous surface treating agent in Table 3 is a mass with respect to the total solid content of the aqueous surface treating agent (% by mass).

TABLE 1

| Used Monomer | Abbreviation | Name | Monomer Tg (° C.) |
|---|---|---|---|
| (b1) | St | Styrene | 100 |
| (b2) | AA | Acrylic acid | 106 |
|  | MAA | Methacrylic acid | 130 |
| (b3) | BA | Butyl acrylate | −54 |
|  | BMA | Butyl methacrylate | 20 |
|  | EA | Ethyl acrylate | −20 |
| (b4) | AN | Acrylonitrile | 100 |

TABLE 2

| Acrylic Resin No. | Monomer (b1) Kind | mass % | (b2) Kind | mass % | (b3) Kind | mass % | (b4) Kind | mass % | Tg (° C.) |
|---|---|---|---|---|---|---|---|---|---|
| B1 | St | 20 | AA | 3 | BA | 49 | AN | 25 | 2 |
| B2 | St | 0 | AA | 3 | BA | 49 | AN | 25 | 6 |
| B3 | St | 10 | AA | 3 | BA | 49 | AN | 25 | 2 |
| B4 | St | 30 | AA | 3 | BA | 40 | AN | 20 | 6 |
| B5 | St | 20 | AA | 0 | BA | 49 | AN | 25 | 4 |
| B6 | St | 17 | AA | 15 | BA | 40 | AN | 20 | 6 |
| B7 | St | 20 | AA | 3 | BA | 0 | AN | 25 | 5 |
| B8 | St | 20 | AA | 3 | BA | 25 | AN | 25 | 6 |
| B9 | St | 17 | AA | 2 | BA | 60 | AN | 20 | −10 |
| B10 | St | 20 | AA | 3 | BA | 49 | AN | 0 | 6 |
| B11 | St | 20 | AA | 3 | BA | 49 | AN | 10 | 6 |
| B12 | St | 17 | AA | 2 | BA | 40 | AN | 40 | 18 |
| B13 | St | 17 | MAA | 2 | BA | 40 | AN | 20 | 5 |
| B14 | St | 17 | AA | 2 | EA | 40 | AN | 20 | 5 |
| B15 | St | 17 | AA | 2 | BMA | 40 | AN | 20 | 5 |
| B16 | St | 17 | AA | 2 | BA | 40 | AN | 20 | −14 |
| B17 | St | 17 | AA | 2 | BA | 40 | AN | 20 | 25 |

"Vanadium compound (V)"
C1: Vanadium acetylacetonate
C2: Vanadium oxyoxalate
"Phosphorus Compound (P)"
D1: Phosphoric acid
D2: 1-Hydroxyethane-1,1-diphosphonic acid
"Cobalt Compound (Co)"
E1: Cobalt carbonate
E2: Cobalt nitrate
"Fluorine Compound (F)"
F1: Ammonium titanium fluoride: $(NH_4)_2TiF_6$
F2: Ammonium fluorosilicate: $(NH_4)_2SiF_6$

TABLE 3

| Aqueous surface treating agent | Zr | Acrylic resin Kind | Content (mass %) | V | P | Co | F | Compounding ratio (weight ratio) V/Zr | P/Zr | Co/Zr | F/Zr |
|---|---|---|---|---|---|---|---|---|---|---|---|
| No. 1 | — | B1 | 30 | C2 | D1 + D2 | E2 | — | — | — | — | — |
| No. 2 | A1 | B1 | 30 | C2 | D1 + D2 | E2 | — | 0.28 | 0.15 | 0.020 | — |
| No. 3 | A2 | B1 | 30 | C2 | D1 + D2 | E2 | — | 0.28 | 0.15 | 0.020 | — |
| No. 4 | A2 | B1 | 30 | C2 | D1 + D2 | E2 | F1 | 0.28 | 0.15 | 0.020 | 0.01 |
| No. 5 | A2 | B1 | 30 | C2 | D1 + D2 | E2 | F1 | 0.28 | 0.15 | 0.020 | 0.13 |
| No. 6 | A2 | B1 | 30 | C2 | D1 + D2 | E2 | F2 | 0.28 | 0.15 | 0.020 | 0.13 |
| No. 7 | A3 | B1 | 30 | C2 | D1 + D2 | E2 | A3 | 0.28 | 0.15 | 0.020 | 1.25 |
| No. 8 | A2 | — | — | C2 | D1 + D2 | E2 | — | 0.28 | 0.15 | 0.020 | — |
| No. 9 | A2 | B1 | 10 | C2 | D1 + D2 | E2 | — | 0.28 | 0.15 | 0.020 | — |
| No. 10 | A2 | B1 | 20 | C2 | D1 + D2 | E2 | — | 0.28 | 0.15 | 0.020 | — |
| No. 11 | A2 | B1 | 40 | C2 | D1 + D2 | E2 | — | 0.28 | 0.15 | 0.020 | — |

TABLE 3-continued

| Aqueous surface treating agent | Compounded components | | | | | | | Compounding ratio (weight ratio) | | | |
|---|---|---|---|---|---|---|---|---|---|---|---|
| | | Acrylic resin | | | | | | | | | |
| | Zr | Kind | Content (mass %) | V | P | Co | F | V/Zr | P/Zr | Co/Zr | F/Zr |
| No. 12 | A2 | B1 | 60 | C2 | D1 + D2 | E2 | — | 0.28 | 0.15 | 0.020 | — |
| No. 13 | A2 | B1 | 70 | C2 | D1 + D2 | E2 | — | 0.28 | 0.15 | 0.020 | — |
| No. 14 | A2 | B2 | 30 | C2 | D1 + D2 | E2 | — | 0.28 | 0.15 | 0.020 | — |
| No. 15 | A2 | B3 | 30 | C2 | D1 + D2 | E2 | — | 0.28 | 0.15 | 0.020 | — |
| No. 16 | A2 | B4 | 30 | C2 | D1 + D2 | E2 | — | 0.28 | 0.15 | 0.020 | — |
| No. 17 | A2 | B5 | 30 | C2 | D1 + D2 | E2 | — | 0.28 | 0.15 | 0.020 | — |
| No. 18 | A2 | B6 | 30 | C2 | D1 + D2 | E2 | — | 0.28 | 0.15 | 0.020 | — |
| No. 19 | A2 | B7 | 30 | C2 | D1 + D2 | E2 | — | 0.28 | 0.15 | 0.020 | — |
| No. 20 | A2 | B8 | 30 | C2 | D1 + D2 | E2 | — | 0.28 | 0.15 | 0.020 | — |
| No. 21 | A2 | B9 | 30 | C2 | D1 + D2 | E2 | — | 0.28 | 0.15 | 0.020 | — |
| No. 22 | A2 | B10 | 30 | C2 | D1 + D2 | E2 | — | 0.28 | 0.15 | 0.020 | — |
| No. 23 | A2 | B11 | 30 | C2 | D1 + D2 | E2 | — | 0.28 | 0.15 | 0.020 | — |
| No. 24 | A2 | B12 | 30 | C2 | D1 + D2 | E2 | — | 0.28 | 0.15 | 0.020 | — |
| No. 25 | A2 | B13 | 30 | C2 | D1 + D2 | E2 | — | 0.28 | 0.15 | 0.020 | — |
| No. 26 | A2 | B14 | 30 | C2 | D1 + D2 | E2 | — | 0.28 | 0.15 | 0.020 | — |
| No. 27 | A2 | B15 | 30 | C2 | D1 + D2 | E2 | — | 0.28 | 0.15 | 0.020 | — |
| No. 28 | A2 | B16 | 30 | C2 | D1 + D2 | E2 | — | 0.28 | 0.15 | 0.020 | — |
| No. 29 | A2 | B17 | 30 | C2 | D1 + D2 | E2 | — | 0.28 | 0.15 | 0.020 | — |
| No. 30 | A2 | B1 | 30 | — | D1 + D2 | E2 | — | — | 0.15 | 0.020 | — |
| No. 31 | A2 | B1 | 30 | C1 | D1 + D2 | E2 | — | 0.28 | 0.15 | 0.020 | — |
| No. 32 | A2 | B1 | 30 | C2 | D1 + D2 | E2 | — | 0.03 | 0.15 | 0.020 | — |
| No. 33 | A2 | B1 | 30 | C2 | D1 + D2 | E2 | — | 0.83 | 0.15 | 0.020 | — |
| No. 34 | A2 | B1 | 30 | C2 | — | E2 | — | 0.28 | — | 0.020 | — |
| No. 35 | A2 | B1 | 30 | C2 | D1 | E2 | — | 0.28 | 0.15 | 0.020 | — |
| No. 36 | A2 | B1 | 30 | C2 | D1 + D2 | E2 | — | 0.28 | 0.02 | 0.020 | — |
| No. 37 | A2 | B1 | 30 | C2 | D1 + D2 | E2 | — | 0.28 | 1.02 | 0.020 | — |
| No. 38 | A2 | B1 | 30 | C2 | D1 + D2 | — | — | 0.28 | 0.15 | — | — |
| No. 39 | A2 | B1 | 30 | C2 | D1 + D2 | E1 | — | 0.28 | 0.15 | 0.020 | — |
| No. 40 | A2 | B1 | 30 | C2 | D1 + D2 | E2 | — | 0.28 | 0.15 | 0.002 | — |
| No. 41 | A2 | B1 | 30 | C2 | D1 + D2 | E2 | — | 0.28 | 0.15 | 0.151 | — |
| No. 42 | A2 | B1 | 30 | C2 | D1 + D2 | E2 | — | 0.07 | 0.15 | 0.020 | — |
| No. 43 | A2 | B1 | 30 | C2 | D1 + D2 | E2 | — | 0.69 | 0.15 | 0.020 | — |
| No. 44 | A2 | B1 | 30 | C2 | D1 + D2 | E2 | — | 0.28 | 0.04 | 0.020 | — |
| No. 45 | A2 | B1 | 30 | C2 | D1 + D2 | E2 | — | 0.28 | 0.58 | 0.020 | — |
| No. 46 | A2 | B1 | 30 | C2 | D1 + D2 | E2 | — | 0.28 | 0.15 | 0.005 | — |
| No. 47 | A2 | B1 | 30 | C2 | D1 + D2 | E2 | — | 0.28 | 0.15 | 0.080 | — |
| No. 48 | A2 | B1 | 30 | C2 | D2 | E2 | — | 0.28 | 0.15 | 0.020 | — |

The above-mentioned steel sheet having plated layers on the both surfaces was degreased by the method shown in the following (1). Subsequently, the above-mentioned aqueous surface treating agent was applied onto the both surfaces of the degreased steel sheet having plated layers on the both surfaces by the method shown in the following (2) to form coatings, and the coatings were dried by the method shown in the following (3) to give the surface-treated steel sheets of Examples and Comparative Examples.

(1) Degreasing

Using a degreasing agent (an alkali degreasing agent manufactured by Nihon Parkerizing Co., Ltd., trade name: Fine Cleaner E6406), the above-mentioned steel sheet having plated layers on the both surfaces was degreased (initial make-up of electrolytic bath of 20 g/L at 60° C., spraying for 10 seconds with spray pressure of 50 kPa). Thereafter the steel sheet was washed with water by using a spray for 10 seconds.

(2) Application of Aqueous Surface Treating Agent

The aqueous surface treating agent shown in Table 3 was applied onto the both surfaces of the degreased steel sheet having plated layers on the both surfaces by using the application method shown in Tables 4 and 5, and retained for the coating retention time shown in Tables 4 and 5 (the time from the application of the aqueous surface treating agent on the steel sheet having plated layers on the both surfaces to the initiation of the heating of the steel sheet in a heating furnace) to form a coating.

The steel sheet was heated so that the temperature of the steel sheet when the steel sheet enters into a roll coater (steel sheet entering temperature) became the temperature shown in Tables 4 and 5. The coating retention time was adjusted by controlling the transport speed of the steel sheet from the roll coater to the heating furnace. Furthermore, the aqueous surface treating agent was applied with adjustment of the concentration and application amount of the aqueous surface treating agent such that the Zr adhesion amount shown in Tables 4 and 5 is achieved. Furthermore, at this time, the viscosity of the aqueous surface treating agent at 25° C. in each example was within the range of 1.5 to 2 mPa·s. Furthermore, the temperature of the aqueous surface treating agent itself during the application was adjusted as shown in Tables 4 and 5. Furthermore, in each example, the application amount of the aqueous surface treating agent itself was 0.3 to 2 g/m².

In a case where the steel sheet entering temperature was 100° C., the evaporation of the water content in the aqueous surface treating agent No. 3 rapidly occurred. Consequently, a phenomenon in which bubble-like small bulging or pores occur (a so-called foaming phenomenon) occurred, and appearance failure occurred. Therefore, a surface-treated steel sheet having a high quality coating layer was not able to be appropriately produced. Accordingly, it can be said that the steel sheet entering temperature is preferably equal to or less than 80° C.

(3) Drying of Coating

The steel sheet on which the coating had been formed on the plated layer was heated at a peak metal temperature (PMT) of 150° C. while feeding hot air onto the coating by using a hot air circulation type oven (heating furnace), whereby the coating that had been formed on the plated layer was dried.

TABLE 4

|  | Aqueous surface treating agent | Steel sheet | Application method | Temperature of aqueous surface treating agent (° C.) | Temperature of entering of steel sheet into coater (° C.) | Coating retention time (sec) | Zr adhesion amount (mg/m$^2$) |
|---|---|---|---|---|---|---|---|
| Comparative Example 1 | No. 1 | M2 | roll coater | 30 | 30 | 2 | 120 |
| Example 1 | No. 2 | M2 | roll coater | 30 | 30 | 2 | 120 |
| Example 2 | No. 3 | M2 | roll coater | 30 | 30 | 2 | 120 |
| Example 3 | No. 4 | M2 | roll coater | 30 | 30 | 2 | 120 |
| Example 4 | No. 5 | M2 | roll coater | 30 | 30 | 2 | 120 |
| Example 5 | No. 6 | M2 | roll coater | 30 | 30 | 2 | 120 |
| Example 6 | No. 7 | M2 | roll coater | 30 | 30 | 2 | 120 |
| Comparative Example 2 | No. 8 | M2 | roll coater | 30 | 30 | 2 | 120 |
| Example 7 | No. 9 | M2 | roll coater | 30 | 30 | 2 | 120 |
| Example 8 | No. 10 | M2 | roll coater | 30 | 30 | 2 | 120 |
| Example 9 | No. 11 | M2 | roll coater | 30 | 30 | 2 | 120 |
| Example 10 | No. 12 | M2 | roll coater | 30 | 30 | 2 | 120 |
| Example 11 | No. 13 | M2 | roll coater | 30 | 30 | 2 | 120 |
| Example 12 | No. 14 | M2 | roll coater | 30 | 30 | 2 | 120 |
| Example 13 | No. 15 | M2 | roll coater | 30 | 30 | 2 | 120 |
| Example 14 | No. 16 | M2 | roll coater | 30 | 30 | 2 | 120 |
| Example 15 | No. 17 | M2 | roll coater | 30 | 30 | 2 | 120 |
| Example 16 | No. 18 | M2 | roll coater | 30 | 30 | 2 | 120 |
| Example 17 | No. 19 | M2 | roll coater | 30 | 30 | 2 | 120 |
| Example 18 | No. 20 | M2 | roll coater | 30 | 30 | 2 | 120 |
| Example 19 | No. 21 | M2 | roll coater | 30 | 30 | 2 | 120 |
| Example 20 | No. 22 | M2 | roll coater | 30 | 30 | 2 | 120 |
| Example 21 | No. 23 | M2 | roll coater | 30 | 30 | 2 | 120 |
| Example 22 | No. 24 | M2 | roll coater | 30 | 30 | 2 | 120 |
| Example 23 | No. 25 | M2 | roll coater | 30 | 30 | 2 | 120 |
| Example 24 | No. 26 | M2 | roll coater | 30 | 30 | 2 | 120 |
| Example 25 | No. 27 | M2 | roll coater | 30 | 30 | 2 | 120 |
| Example 26 | No. 28 | M2 | roll coater | 30 | 30 | 2 | 120 |
| Example 27 | No. 29 | M2 | roll coater | 30 | 30 | 2 | 120 |
| Comparative Example 3 | No. 30 | M2 | roll coater | 30 | 30 | 2 | 120 |
| Example 28 | No. 31 | M2 | roll coater | 30 | 30 | 2 | 120 |
| Example 29 | No. 32 | M2 | roll coater | 30 | 30 | 2 | 120 |
| Example 30 | No. 33 | M2 | roll coater | 30 | 30 | 2 | 120 |
| Comparative Example 4 | No. 34 | M2 | roll coater | 30 | 30 | 2 | 120 |
| Example 31 | No. 35 | M2 | roll coater | 30 | 30 | 2 | 120 |
| Example 32 | No. 36 | M2 | roll coater | 30 | 30 | 2 | 120 |
| Example 33 | No. 37 | M2 | roll coater | 30 | 30 | 2 | 120 |
| Comparative Example 5 | No. 38 | M2 | roll coater | 30 | 30 | 2 | 120 |
| Example 34 | No. 39 | M2 | roll coater | 30 | 30 | 2 | 120 |
| Example 35 | No. 40 | M2 | roll coater | 30 | 30 | 2 | 120 |
| Example 36 | No. 41 | M2 | roll coater | 30 | 30 | 2 | 120 |
| Example 37 | No. 3 | M1 | roll coater | 30 | 30 | 2 | 120 |
| Example 38 | No. 3 | M3 | roll coater | 30 | 30 | 2 | 120 |
| Example 39 | No. 3 | M4 | roll coater | 30 | 30 | 2 | 120 |
| Example 40 | No. 3 | M5 | roll coater | 30 | 30 | 2 | 120 |

TABLE 5

|  | Aqueous surface treating agent | Steel sheet | Application method | Temperature of aqueous surface treating agent (° C.) | Temperature of entering of steel sheet into coater (° C.) | Coating retention time (sec) | Zr adhesion amount (mg/m$^2$) |
|---|---|---|---|---|---|---|---|
| Example 41 | No. 3 | M2 | roll coater | 30 | 30 | 0.5 | 120 |
| Example 42 | No. 3 | M2 | roll coater | 30 | 30 | 8 | 120 |
| Example 43 | No. 3 | M2 | roll coater | 30 | 30 | 2 | 3 |
| Example 44 | No. 3 | M2 | roll coater | 30 | 30 | 2 | 30 |
| Example 45 | No. 3 | M2 | roll coater | 30 | 30 | 2 | 60 |
| Example 46 | No. 3 | M2 | roll coater | 30 | 30 | 2 | 150 |
| Example 47 | No. 3 | M2 | roll coater | 30 | 30 | 2 | 300 |

TABLE 5-continued

|  | Aqueous surface treating agent | Steel sheet | Application method | Temperature of aqueous surface treating agent (° C.) | Temperature of entering of steel sheet into coater (° C.) | Coating retention time (sec) | Zr adhesion amount (mg/m$^2$) |
| --- | --- | --- | --- | --- | --- | --- | --- |
| Example 48 | No. 3 | M2 | roll coater | 30 | 30 | 2 | 600 |
| Example 49 | No. 42 | M2 | roll coater | 30 | 30 | 2 | 120 |
| Example 50 | No. 43 | M2 | roll coater | 30 | 30 | 2 | 120 |
| Example 51 | No. 44 | M2 | roll coater | 30 | 30 | 2 | 120 |
| Example 52 | No. 45 | M2 | roll coater | 30 | 30 | 2 | 120 |
| Example 53 | No. 46 | M2 | roll coater | 30 | 30 | 2 | 120 |
| Example 54 | No. 47 | M2 | roll coater | 30 | 30 | 2 | 120 |
| Example 55 | No. 48 | M2 | roll coater | 30 | 30 | 2 | 120 |
| Comparative Example 6 | No. 3 | M2 | roll coater | 30 | 30 | 0.3 | 120 |
| Example 56 | No. 3 | M2 | roll coater | 30 | 30 | 10 | 120 |
| Comparative Example 7 | No. 3 | M2 | roll coater | 30 | 3 | 2 | 120 |
| Example 57 | No. 3 | M2 | roll coater | 30 | 5 | 2 | 120 |
| Example 58 | No. 3 | M2 | roll coater | 30 | 10 | 2 | 120 |
| Example 59 | No. 3 | M2 | roll coater | 30 | 15 | 2 | 120 |
| Example 60 | No. 3 | M2 | roll coater | 30 | 40 | 2 | 120 |
| Example 61 | No. 3 | M2 | roll coater | 30 | 60 | 2 | 120 |
| Example 62 | No. 3 | M2 | roll coater | 30 | 80 | 2 | 120 |
| Example 63 | No. 3 | M2 | roll coater | 5 | 30 | 2 | 120 |
| Example 64 | No. 3 | M2 | roll coater | 10 | 30 | 2 | 120 |
| Example 65 | No. 3 | M2 | roll coater | 15 | 30 | 2 | 120 |
| Example 66 | No. 3 | M2 | roll coater | 40 | 30 | 2 | 120 |
| Example 67 | No. 3 | M2 | roll coater | 50 | 30 | 2 | 120 |
| Example 68 | No. 3 | M2 | roll coater | 60 | 30 | 2 | 120 |

2. Evaluation

For the Surface-Treated Steel Sheets of Examples and Comparative Examples obtained in such way, the following respective items were checked. The results are shown in Tables 6 to 9.

"Contents of V, P, Co and Zr in Coating"

The contents (% by mass) of V, P (in terms of phosphoric acid), Co and Zr in the coating are assumed to be mass ratios with respect to the total solid content of the aqueous surface treating agent shown in Table 3 by percentages.

"Zr Adhesion Amount"

Measured by a Fluorescence X-ray analyzer (trade name: ZSX-PrimusII (manufactured by Rigaku Corporation)).

"Content of Fluoride Ion in Coating"

Twenty samples of 100 mm×200 mm cut out of each surface-treated steel sheet were prepared. Subsequently, each sample was immersed in 100 mL of water at 60° C. for 10 minutes. Subsequently, 2,000 mL of the water in which the sample had been immersed was collected, concentrated in an evaporator, and analyzed by ion chromatography. Using the result, the content (% by mass) of fluoride ion (converted as F) in the coating was calculated.

As a result of the calculation in such way, the content of the fluoride ion in coating was less than or equal to 3% by mass in all of Examples and Comparative Examples.

"Area Ratio of Acrylic Resin"

A carbon film as a protective film was deposited on the surface of each surface-treated steel sheet, and a carbon film of several micrometers was formed by further using an focused ion beam processing apparatus (FIB, SMI3050SE: manufactured by Hitachi High-Tech Science Corporation). Subsequently, microsampling was conducted by using the FIB at an acceleration voltage of 30 kV (at 5 kV for finishing processing), and formed into a thin film and used as a coating cross-section sample.

Each coating cross-section sample was observed by using a TEM or SEM having an energy dispersive X-ray spectrometry (EDS), and EDS analysis was conducted on three portions per sample (element mapping) to give a detection element map. The obtained detection element map was divided into 100 grids (10×10) and binarized for the C component and other elements by using the contrast of the image, and the area ratio of the C component in each area in the coating cross-section sample was calculated as the area ratio of the acrylic resin.

Furthermore, the coating peeled from each surface-treated steel sheet by an acid treatment was subjected to an infrared ray spectroscopy and a thermal decomposition gas chromatograph-mass analyzer (GC-MS) analysis. Furthermore, it was confirmed that the C component in the coating was the acrylic resin from the result obtained by analyzing the attribution of the observed absorption derived from the resin component in the infrared absorption spectrum of the coating obtained by the infrared ray spectroscopy and the result of the analysis by the thermal decomposition GC-MS.

The calculated area ratio of the acrylic resin was evaluated as follows.

<Area from Surface to Thickness of One-Fifth of Film Thickness (Upper Area A)>

1: Equal to or more than 0 area % and less than 80 area %
2: Equal to or more than 80 area % and equal to or less than 90 area %
3: Equal to or more than 90 area % and equal to or less than 100 area %

<Area from Film Thickness Center to Thickness of One-Tenth of Film Thickness Toward Side of Surface and Area from Film Thickness Center to Thickness of One-Tenth of Film Thickness Toward Side of Plated Layer (Central Area C)>

1: Equal to or more than 0 area % and less than 5 area %
2: Equal to or more than 5 area % and equal to or less than 50 area % (except for equal to or more than 10 area % and equal to or less than 40 area %)
3: Equal to or more than 10 area % and equal to or less than 40 area %

4: More than 50 area % and equal to or less than 100 area %
<Area from Interface with Plated Layer to Thickness of One-Fifth of Film Thickness (Lower Area B)>
1: Equal to or more than 0 area % to less than 80 area %
2: Equal to or more than 80 area % and equal to or less than 90 area %
3: Equal to or more than 90 area % and equal to or less than 100 area %
<Entirety of Coating Cross-Section>
1: Equal to or more than 0 area % and less than 20 area %
2: Equal to or more than 20 area % and equal to or less than 60 area % (except for equal to or more than 30 area % and equal to or less than 50 area %)
3: Equal to or more than 30 area % and equal to or less than 50 area %
4: More than 60 area % and equal to or less than 100 area %

"Corrosion Resistance"

A flat plate test piece and an Erichsen-processed test piece having a height of 7 mm subjected to an Erichsen processing were prepared. A salt water spraying test compliant with JIS Z 2371 was conducted on each test piece up to a predetermined time. The criteria for the evaluation of the corrosion resistance are shown below.

Flat Plate Test Piece (240 Hours after Salt Water Spraying Test)
4: Equal to or less than 5%
3: Greater than 5% and equal to or less than 15% of white rust
2: Greater than 15% and equal to or less than 30% of white rust
1: Greater than 30% of white rust Erichsen-Processed Test Piece (72 Hours after Salt Water Spraying Test)
4: Equal to or less than 15%
3: Greater than 15% and equal to or less than 30% of white rust
2: Greater than 30% and equal to or less than 50% of white rust
1: Greater than 50% of white rust "Blacking Resistance"

The test piece was allowed to stand still for 144 hours under an atmosphere of 70° C.×RH 85% by using a thermohygrostat tester, and the appearance after the still standing was visually observed. The criteria for the evaluation of the blacking resistance are shown below.
5: Not changed at all
4: Little change is observed
3: Slight discoloration is observed at the ends
2: Slight discoloration is observed
1: Obvious discoloration is observed "Adhesiveness with Adhesive"

Using various adhesives, evaluation of the adhesiveness between the surface-treated steel sheets was conducted by the following (Evaluation Method 1) and (Evaluation Method 2). The adhesives are shown below.

A: An epoxy-based adhesive (E2300J manufactured by Konishi Co., Ltd.)
B: An acrylic-based adhesive (Hard Lock 8 manufactured by Denka Company Limited)
C: A silicon-based adhesive (PV8303 manufactured by Dow Corning Toray Co., Ltd.)
D: A silicon-based adhesive (PM210 manufactured by Cemedine Co., Ltd.)
E: A silicon-based adhesive (Super X No. 8008 manufactured by Cemedine Co., Ltd.)
F: A phenol-based adhesive (110 manufactured by Cemedine Co., Ltd.)
G: A urethane-based adhesive (UM700 manufactured by Cemedine Co., Ltd.)
H: A vinyl acetate-based adhesive (CH18 manufactured by Konishi Co., Ltd.)
I: A chloroprene rubber-based adhesive (575F manufactured by Cemedine Co., Ltd.)

Evaluation Method 1

The adhesive was applied between the two test pieces formed of surface-treated steel sheets (25±0.5 mm×100±0.5 mm×1.6 mm thickness) to prepare a wrap shear test body with an adhered part having an area of 25±0.5 mm×12.5±0.5 mm. The wrap shear test body to which the adhesive had been applied and which had been cured for a predetermined time was evaluated based on the criteria for the evaluation of a tensile shear load and an aggregation breaking rate shown below.

Evaluation Method 2

The same test body as the test body for which the primary adhesiveness was evaluated in (Evaluation Method 1) was evaluated after a predetermined time has passed at a temperature of 85° C. and a humidity of 85% based on the criteria for the evaluation of a tensile shear load and an aggregation breaking rate shown below.

(Criteria for Evaluation of Tensile Shear Load (Criteria X))

Each wrap shear test body was subjected to a tensile shear test at a tensile speed of 100 mm/min and room temperature of 25° C. Furthermore, a ratio of the tensile shear load of each wrap shear test body to the tensile shear load of an untreated material (a test body obtained by using a steel sheet having plated layers on the both surfaces before formation of coatings instead of a surface-treated steel sheet) (tensile shear load of test body/tensile shear load of untreated material) was calculated and evaluated. The criteria for the evaluation of the tensile shear load ratio are shown below.
4: Equal to or more than 1.1
3: More than 1.0 to less than 1.1
2: 1.0 (equivalent to untreated material)
1: Lower than 1.0

(Criteria for Evaluation of Aggregation Breaking Rate (Criteria Y))

The aggregation breaking rate was evaluated by comparing the residual area (aggregation breaking rate) of the adhesive in each wrap shear test body after the tensile shear test with the aggregation breaking rate in the untreated material after the tensile shear test. The criteria for the evaluation of the aggregation breaking rate are shown below.
4: The residual area of the adhesive obviously increased as compared to that of the untreated material
3: The residual area of the adhesive increased as compared to that of the untreated material
2: The residual area of the adhesive was equivalent to that of the untreated material
1: The residual area of the adhesive was lowered as compared to that of the untreated material "Tightness of Adhesion with Overcoating Layer"

The test plate was coated under the following conditions, and a coating tightness of adhesion test was conducted. The results are shown in Tables 6 and 7.

(Coating Condition)

Coating condition coating material: manufactured by Kansai Paint Co., Ltd. Amilac #1000 (registered trademark) (white coating material)
Coating process: bar coat process
Baking drying condition: 140° C., 20 minutes
Coating thickness: 25 μm The method for the evaluation is as follows.
(Coating Tightness of Adhesion Test)

The test plate was immersed in boiled water for 2 hours and allowed to stand overnight. One hundred grids of 1 mm square were formed on the test plate by cutting with an NT cutter, a peel test by using an adhesive tape was conducted, and the coating tightness of adhesion was evaluated by the number of the peeled coatings. The criteria for the evaluation are shown below.

4: The number of the peeled coatings is less than 1
3: The number of the peeled coatings is equal to or more than 1 and less than 10
2: The number of the peeled coatings is equal to or more than 10 and less than 50
1: The number of the peeled coatings is equal to or more than 50

TABLE 6

| | Coating structure Aria ratio of acrylic resin (area %) | | | Entirety of cross-section of coating | Corrosion resistance | | Blacking resistance | Tight adhesiveness |
|---|---|---|---|---|---|---|---|---|
| | A | C | B | | Flat plate | Processed portion | | |
| Example 1 | 2 | 2 | 1 | 3 | 4 | 4 | 5 | 4 |
| Example 2 | 2 | 2 | 1 | 3 | 4 | 4 | 5 | 4 |
| Example 3 | 2 | 2 | 1 | 3 | 4 | 4 | 5 | 4 |
| Example 4 | 2 | 2 | 1 | 3 | 4 | 4 | 5 | 4 |
| Example 5 | 2 | 2 | 1 | 3 | 4 | 4 | 5 | 4 |
| Example 6 | 2 | 2 | 1 | 3 | 4 | 4 | 5 | 4 |
| Example 7 | 2 | 2 | 1 | 1 | 4 | 4 | 5 | 3 |
| Example 8 | 2 | 2 | 1 | 2 | 4 | 4 | 5 | 4 |
| Example 9 | 2 | 2 | 1 | 3 | 4 | 4 | 5 | 4 |
| Example 10 | 2 | 2 | 1 | 4 | 4 | 4 | 5 | 4 |
| Example 11 | 2 | 2 | 1 | 4 | 2 | 2 | 5 | 4 |
| Example 12 | 2 | 2 | 1 | 3 | 4 | 4 | 5 | 4 |
| Example 13 | 2 | 2 | 1 | 3 | 4 | 4 | 5 | 4 |
| Example 14 | 2 | 2 | 1 | 3 | 4 | 4 | 5 | 4 |
| Example 15 | 2 | 2 | 1 | 3 | 4 | 4 | 5 | 4 |
| Example 16 | 2 | 2 | 1 | 3 | 4 | 4 | 5 | 4 |
| Example 17 | 2 | 2 | 1 | 3 | 4 | 4 | 5 | 4 |
| Example 18 | 2 | 2 | 1 | 3 | 4 | 4 | 5 | 4 |
| Example 19 | 2 | 2 | 1 | 3 | 4 | 4 | 5 | 4 |
| Example 20 | 2 | 2 | 1 | 3 | 4 | 4 | 5 | 4 |
| Example 21 | 2 | 2 | 1 | 3 | 4 | 4 | 5 | 4 |
| Example 22 | 2 | 2 | 1 | 3 | 4 | 4 | 5 | 4 |
| Example 23 | 2 | 2 | 1 | 3 | 4 | 4 | 5 | 4 |
| Example 24 | 2 | 2 | 1 | 3 | 4 | 4 | 5 | 4 |
| Example 25 | 2 | 2 | 1 | 3 | 4 | 4 | 5 | 4 |
| Example 26 | 2 | 2 | 1 | 3 | 4 | 4 | 5 | 4 |
| Example 27 | 2 | 2 | 1 | 3 | 4 | 4 | 5 | 4 |
| Example 28 | 2 | 2 | 1 | 3 | 4 | 4 | 5 | 4 |
| Example 29 | 2 | 2 | 1 | 3 | 4 | 4 | 5 | 4 |
| Example 30 | 2 | 2 | 1 | 3 | 4 | 4 | 5 | 4 |
| Example 31 | 2 | 2 | 1 | 3 | 4 | 4 | 5 | 4 |
| Example 32 | 2 | 2 | 1 | 3 | 4 | 4 | 5 | 4 |
| Example 33 | 2 | 2 | 1 | 3 | 4 | 4 | 5 | 4 |
| Example 34 | 2 | 2 | 1 | 3 | 4 | 4 | 5 | 4 |
| Example 35 | 2 | 2 | 1 | 3 | 4 | 4 | 2 | 4 |
| Example 36 | 2 | 2 | 1 | 3 | 4 | 4 | 5 | 4 |
| Example 37 | 2 | 2 | 1 | 3 | 4 | 4 | 5 | 4 |
| Example 38 | 2 | 2 | 1 | 3 | 4 | 4 | 5 | 4 |
| Example 39 | 2 | 2 | 1 | 3 | 4 | 4 | 5 | 4 |
| Example 40 | 2 | 2 | 1 | 3 | 4 | 4 | 5 | 4 |

TABLE 7

| | Coating structure Aria ratio of acrylic resin (area %) | | | Entirety of cross-section of coating | Corrosion resistance | | Blacking resistance | Tight adhesiveness |
|---|---|---|---|---|---|---|---|---|
| | A | C | B | | Flat plate | Processed portion | | |
| Example 41 | 2 | 2 | 1 | 3 | 4 | 4 | 5 | 4 |
| Example 42 | 2 | 2 | 3 | 3 | 4 | 4 | 5 | 4 |
| Example 43 | 2 | 2 | 1 | 3 | 2 | 2 | 2 | 2 |
| Example 44 | 2 | 2 | 1 | 3 | 3 | 3 | 3 | 4 |
| Example 45 | 2 | 2 | 1 | 3 | 4 | 4 | 4 | 4 |
| Example 46 | 2 | 2 | 1 | 3 | 4 | 4 | 5 | 4 |
| Example 47 | 2 | 2 | 2 | 3 | 4 | 4 | 5 | 4 |
| Example 48 | 2 | 2 | 1 | 3 | 4 | 4 | 5 | 4 |
| Example 49 | 2 | 2 | 1 | 3 | 4 | 4 | 5 | 4 |
| Example 50 | 2 | 2 | 1 | 3 | 4 | 4 | 5 | 4 |
| Example 51 | 2 | 2 | 1 | 3 | 4 | 4 | 5 | 4 |
| Example 52 | 2 | 2 | 1 | 3 | 4 | 4 | 5 | 4 |
| Example 53 | 2 | 2 | 1 | 3 | 4 | 4 | 3 | 4 |
| Example 54 | 2 | 2 | 1 | 3 | 4 | 4 | 5 | 4 |
| Example 55 | 2 | 2 | 1 | 3 | 4 | 4 | 5 | 4 |
| Example 56 | 3 | 2 | 3 | 3 | 4 | 4 | 5 | 4 |
| Example 57 | 2 | 2 | 1 | 3 | 4 | 4 | 5 | 4 |
| Example 58 | 2 | 2 | 1 | 3 | 4 | 4 | 5 | 4 |
| Example 59 | 2 | 2 | 1 | 3 | 4 | 4 | 5 | 4 |
| Example 60 | 2 | 2 | 1 | 3 | 4 | 4 | 5 | 4 |
| Example 61 | 2 | 2 | 1 | 3 | 4 | 4 | 5 | 4 |
| Example 62 | 2 | 2 | 1 | 3 | 4 | 4 | 5 | 4 |
| Example 63 | 2 | 2 | 1 | 3 | 4 | 4 | 5 | 4 |
| Example 64 | 2 | 2 | 1 | 3 | 4 | 4 | 5 | 4 |
| Example 65 | 2 | 2 | 1 | 3 | 4 | 4 | 5 | 4 |
| Example 66 | 2 | 2 | 1 | 3 | 4 | 4 | 5 | 4 |
| Example 67 | 2 | 2 | 1 | 3 | 4 | 4 | 5 | 4 |
| Example 68 | 2 | 2 | 1 | 3 | 4 | 4 | 5 | 4 |
| Comparative Example 1 | 1 | 3 | 1 | 3 | 2 | 2 | 5 | 3 |
| Comparative Example 2 | 1 | 1 | 1 | 1 | 4 | 4 | 5 | 1 |
| Comparative Example 3 | 1 | 3 | 1 | 3 | 2 | 2 | 5 | 3 |
| Comparative Example 4 | 1 | 3 | 1 | 3 | 2 | 2 | 5 | 3 |
| Comparative Example 5 | 1 | 3 | 1 | 3 | 4 | 4 | 1 | 3 |
| Comparative Example 6 | 1 | 2 | 1 | 3 | 4 | 4 | 5 | 2 |
| Comparative Example 7 | 1 | 2 | 1 | 3 | 4 | 4 | 5 | 2 |

TABLE 8

| | Adhesiveness Adhesive | | | | | | | | | |
|---|---|---|---|---|---|---|---|---|---|---|
| | A | | B | | C | | D | | E | |
| | Evaluation method | | | | | | | | | |
| | 1 | | 2 | | 1 | | 2 | | 1 | | 2 | | 1 | | 2 | | 1 | | 2 |
| | Evaluation criteria | | | | | | | | | | | | | | | | | | |
| | X | Y | X | Y | X | Y | X | Y | X | Y | X | Y | X | Y | X | Y | X | Y | X | Y |
| Example 1 | 4 | 4 | 4 | 4 | 4 | 4 | 4 | 4 | 4 | 4 | 4 | 4 | 4 | 4 | 4 | 4 | 3 | 3 | 3 | 3 |
| Example 2 | 4 | 4 | 4 | 4 | 4 | 4 | 4 | 4 | 4 | 4 | 4 | 4 | 4 | 4 | 4 | 4 | 3 | 3 | 3 | 3 |
| Example 3 | 4 | 4 | 4 | 4 | 4 | 4 | 4 | 4 | 4 | 4 | 4 | 4 | 4 | 4 | 4 | 4 | 4 | 4 | 4 | 4 |
| Example 4 | 4 | 4 | 4 | 4 | 4 | 4 | 4 | 4 | 4 | 4 | 4 | 4 | 4 | 4 | 4 | 4 | 4 | 4 | 4 | 4 |
| Example 5 | 4 | 4 | 4 | 4 | 4 | 4 | 4 | 4 | 4 | 4 | 4 | 4 | 4 | 4 | 4 | 4 | 4 | 4 | 4 | 4 |
| Example 6 | 4 | 4 | 4 | 4 | 4 | 4 | 4 | 4 | 4 | 4 | 4 | 4 | 4 | 4 | 4 | 4 | 4 | 4 | 4 | 4 |
| Example 7 | 3 | 3 | 3 | 3 | 3 | 3 | 3 | 3 | 3 | 3 | 3 | 3 | 3 | 3 | 3 | 3 | 3 | 3 | 3 | 3 |
| Example 8 | 4 | 4 | 4 | 4 | 4 | 4 | 4 | 4 | 4 | 4 | 4 | 4 | 4 | 4 | 4 | 4 | 3 | 3 | 3 | 3 |
| Example 9 | 4 | 4 | 4 | 4 | 4 | 4 | 4 | 4 | 4 | 4 | 4 | 4 | 4 | 4 | 4 | 4 | 3 | 3 | 3 | 3 |

TABLE 8-continued

| | | | | | | | | | | | | | | | | | | | |
|---|---|---|---|---|---|---|---|---|---|---|---|---|---|---|---|---|---|---|---|
| Example 10 | 4 | 4 | 4 | 4 | 4 | 4 | 4 | 4 | 4 | 4 | 4 | 4 | 4 | 4 | 4 | 3 | 3 | 3 | 3 |
| Example 11 | 4 | 4 | 4 | 4 | 4 | 4 | 4 | 4 | 4 | 4 | 4 | 4 | 4 | 4 | 4 | 3 | 3 | 3 | 3 |
| Example 12 | 4 | 4 | 4 | 4 | 4 | 4 | 4 | 4 | 4 | 4 | 4 | 4 | 4 | 4 | 4 | 3 | 3 | 3 | 3 |
| Example 13 | 4 | 4 | 4 | 4 | 4 | 4 | 4 | 4 | 4 | 4 | 4 | 4 | 4 | 4 | 4 | 3 | 3 | 3 | 3 |
| Example 14 | 4 | 4 | 4 | 4 | 4 | 4 | 4 | 4 | 4 | 4 | 4 | 4 | 4 | 4 | 4 | 3 | 3 | 3 | 3 |
| Example 15 | 4 | 4 | 4 | 4 | 4 | 4 | 4 | 4 | 4 | 4 | 4 | 4 | 4 | 4 | 4 | 3 | 3 | 3 | 3 |
| Example 16 | 4 | 4 | 4 | 4 | 4 | 4 | 4 | 4 | 4 | 4 | 4 | 4 | 4 | 4 | 4 | 3 | 3 | 3 | 3 |
| Example 17 | 4 | 4 | 4 | 4 | 4 | 4 | 4 | 4 | 4 | 4 | 4 | 4 | 4 | 4 | 4 | 3 | 3 | 3 | 3 |
| Example 18 | 4 | 4 | 4 | 4 | 4 | 4 | 4 | 4 | 4 | 4 | 4 | 4 | 4 | 4 | 4 | 3 | 3 | 3 | 3 |
| Example 19 | 4 | 4 | 4 | 4 | 4 | 4 | 4 | 4 | 4 | 4 | 4 | 4 | 4 | 4 | 4 | 3 | 3 | 3 | 3 |
| Example 20 | 4 | 4 | 4 | 4 | 4 | 4 | 4 | 4 | 4 | 4 | 4 | 4 | 4 | 4 | 4 | 3 | 3 | 3 | 3 |
| Example 21 | 4 | 4 | 4 | 4 | 4 | 4 | 4 | 4 | 4 | 4 | 4 | 4 | 4 | 4 | 4 | 3 | 3 | 3 | 3 |
| Example 22 | 4 | 4 | 4 | 4 | 4 | 4 | 4 | 4 | 4 | 4 | 4 | 4 | 4 | 4 | 4 | 3 | 3 | 3 | 3 |
| Example 23 | 4 | 4 | 4 | 4 | 4 | 4 | 4 | 4 | 4 | 4 | 4 | 4 | 4 | 4 | 4 | 3 | 3 | 3 | 3 |
| Example 24 | 4 | 4 | 4 | 4 | 4 | 4 | 4 | 4 | 4 | 4 | 4 | 4 | 4 | 4 | 4 | 3 | 3 | 3 | 3 |
| Example 25 | 4 | 4 | 4 | 4 | 4 | 4 | 4 | 4 | 4 | 4 | 4 | 4 | 4 | 4 | 4 | 3 | 3 | 3 | 3 |
| Example 26 | 4 | 4 | 4 | 4 | 4 | 4 | 4 | 4 | 4 | 4 | 4 | 4 | 4 | 4 | 4 | 3 | 3 | 3 | 3 |
| Example 27 | 4 | 4 | 4 | 4 | 4 | 4 | 4 | 4 | 4 | 4 | 4 | 4 | 4 | 4 | 4 | 3 | 3 | 3 | 3 |

| | Adhesiveness Adhesive | | | | | | | |
|---|---|---|---|---|---|---|---|---|
| | F | | G | | H | | I | |
| | Evaluation method | | | | | | | |
| | 1 | 2 | 1 | 2 | 1 | 2 | 1 | 2 |
| | Evaluation criteria | | | | | | | |
| | X Y | X Y | X Y | X Y | X Y | X Y | X Y | X Y |
| Example 1 | 4 4 | 4 4 | 4 4 | 4 4 | 3 3 | 3 3 | 4 4 | 4 4 |
| Example 2 | 4 4 | 4 4 | 4 4 | 4 4 | 3 3 | 3 3 | 4 4 | 4 4 |
| Example 3 | 4 4 | 4 4 | 4 4 | 4 4 | 4 4 | 4 4 | 4 4 | 4 4 |
| Example 4 | 4 4 | 4 4 | 4 4 | 4 4 | 3 3 | 3 3 | 4 4 | 4 4 |
| Example 5 | 4 4 | 4 4 | 4 4 | 4 4 | 3 3 | 3 3 | 4 4 | 4 4 |
| Example 6 | 4 4 | 4 4 | 4 4 | 4 4 | 3 3 | 3 3 | 4 4 | 4 4 |
| Example 7 | 3 3 | 3 3 | 3 3 | 3 3 | 3 3 | 3 3 | 3 3 | 3 3 |
| Example 8 | 4 4 | 4 4 | 4 4 | 4 4 | 3 3 | 3 3 | 4 4 | 4 4 |
| Example 9 | 4 4 | 4 4 | 4 4 | 4 4 | 3 3 | 3 3 | 4 4 | 4 4 |
| Example 10 | 4 4 | 4 4 | 4 4 | 4 4 | 3 3 | 3 3 | 4 4 | 4 4 |
| Example 11 | 4 4 | 4 4 | 4 4 | 4 4 | 3 3 | 3 3 | 4 4 | 4 4 |
| Example 12 | 4 4 | 4 4 | 4 4 | 4 4 | 3 3 | 3 3 | 4 4 | 4 4 |
| Example 13 | 4 4 | 4 4 | 4 4 | 4 4 | 3 3 | 3 3 | 4 4 | 4 4 |
| Example 14 | 4 4 | 4 4 | 4 4 | 4 4 | 3 3 | 3 3 | 4 4 | 4 4 |
| Example 15 | 4 4 | 4 4 | 4 4 | 4 4 | 3 3 | 3 3 | 4 4 | 4 4 |
| Example 16 | 4 4 | 4 4 | 4 4 | 4 4 | 3 3 | 3 3 | 4 4 | 4 4 |
| Example 17 | 4 4 | 4 4 | 4 4 | 4 4 | 3 3 | 3 3 | 4 4 | 4 4 |
| Example 18 | 4 4 | 4 4 | 4 4 | 4 4 | 3 3 | 3 3 | 4 4 | 4 4 |
| Example 19 | 4 4 | 4 4 | 4 4 | 4 4 | 3 3 | 3 3 | 4 4 | 4 4 |
| Example 20 | 4 4 | 4 4 | 4 4 | 4 4 | 3 3 | 3 3 | 4 4 | 4 4 |
| Example 21 | 4 4 | 4 4 | 4 4 | 4 4 | 3 3 | 3 3 | 4 4 | 4 4 |
| Example 22 | 4 4 | 4 4 | 4 4 | 4 4 | 3 3 | 3 3 | 4 4 | 4 4 |
| Example 23 | 4 4 | 4 4 | 4 4 | 4 4 | 3 3 | 3 3 | 4 4 | 4 4 |
| Example 24 | 4 4 | 4 4 | 4 4 | 4 4 | 3 3 | 3 3 | 4 4 | 4 4 |
| Example 25 | 4 4 | 4 4 | 4 4 | 4 4 | 3 3 | 3 3 | 4 4 | 4 4 |
| Example 26 | 4 4 | 4 4 | 4 4 | 4 4 | 3 3 | 3 3 | 4 4 | 4 4 |
| Example 27 | 4 4 | 4 4 | 4 4 | 4 4 | 3 3 | 3 3 | 4 4 | 4 4 |

TABLE 9

| | Adhesiveness Adhesive | | | | | | | | | |
|---|---|---|---|---|---|---|---|---|---|---|
| | A | | B | | C | | D | | E | |
| | Evaluation method | | | | | | | | | |
| | 1 | 2 | 1 | 2 | 1 | 2 | 1 | 2 | 1 | 2 |
| | Evaluation criteria | | | | | | | | | |
| | X Y | X Y | X Y | X Y | X Y | X Y | X Y | X Y | X Y | X Y |
| Example 28 | 4 4 | 4 4 | 4 4 | 4 4 | 4 4 | 4 4 | 4 4 | 4 4 | 3 3 | 3 3 |
| Example 29 | 4 4 | 4 4 | 4 4 | 4 4 | 4 4 | 4 4 | 4 4 | 4 4 | 3 3 | 3 3 |

TABLE 9-continued

| | | | | | | | | | | | | | | | | | | | |
|---|---|---|---|---|---|---|---|---|---|---|---|---|---|---|---|---|---|---|---|
| Example 30 | 3 | 3 | 3 | 3 | 3 | 3 | 3 | 3 | 3 | 3 | 3 | 3 | 3 | 3 | 3 | 3 | 3 | 3 | 3 |
| Example 31 | 4 | 4 | 4 | 4 | 4 | 4 | 4 | 4 | 4 | 4 | 4 | 4 | 4 | 4 | 4 | 3 | 3 | 3 | 3 |
| Example 32 | 4 | 4 | 4 | 4 | 4 | 4 | 4 | 4 | 4 | 4 | 4 | 4 | 4 | 4 | 4 | 3 | 3 | 3 | 3 |
| Example 33 | 3 | 3 | 3 | 3 | 3 | 3 | 3 | 3 | 3 | 3 | 3 | 3 | 3 | 3 | 3 | 3 | 3 | 3 | 3 |
| Example 34 | 4 | 4 | 4 | 4 | 4 | 4 | 4 | 4 | 4 | 4 | 4 | 4 | 4 | 4 | 4 | 3 | 3 | 3 | 3 |
| Example 35 | 4 | 4 | 4 | 4 | 4 | 4 | 4 | 4 | 4 | 4 | 4 | 4 | 4 | 4 | 4 | 3 | 3 | 3 | 3 |
| Example 36 | 4 | 4 | 4 | 4 | 4 | 4 | 4 | 4 | 4 | 4 | 4 | 4 | 4 | 4 | 4 | 3 | 3 | 3 | 3 |
| Example 37 | 4 | 4 | 4 | 4 | 4 | 4 | 4 | 4 | 4 | 4 | 4 | 4 | 4 | 4 | 4 | 3 | 3 | 3 | 3 |
| Example 38 | 4 | 4 | 4 | 4 | 4 | 4 | 4 | 4 | 4 | 4 | 4 | 4 | 4 | 4 | 4 | 3 | 3 | 3 | 3 |
| Example 39 | 4 | 4 | 4 | 4 | 4 | 4 | 4 | 4 | 4 | 4 | 4 | 4 | 4 | 4 | 4 | 3 | 3 | 3 | 3 |
| Example 40 | 4 | 4 | 4 | 4 | 4 | 4 | 4 | 4 | 4 | 4 | 4 | 4 | 4 | 4 | 4 | 3 | 3 | 3 | 3 |
| Example 41 | 4 | 4 | 4 | 4 | 4 | 4 | 4 | 4 | 4 | 4 | 4 | 4 | 4 | 4 | 4 | 3 | 3 | 3 | 3 |
| Example 42 | 4 | 4 | 4 | 4 | 4 | 4 | 4 | 4 | 4 | 4 | 4 | 4 | 4 | 4 | 4 | 4 | 4 | 4 | 4 |
| Example 43 | 3 | 3 | 3 | 3 | 3 | 3 | 3 | 3 | 3 | 3 | 3 | 3 | 3 | 3 | 3 | 2 | 2 | 2 | 2 |
| Example 44 | 3 | 3 | 3 | 3 | 3 | 3 | 3 | 3 | 3 | 3 | 3 | 3 | 3 | 3 | 3 | 3 | 3 | 3 | 3 |
| Example 45 | 4 | 4 | 4 | 4 | 4 | 4 | 4 | 4 | 4 | 4 | 4 | 4 | 4 | 4 | 4 | 3 | 3 | 3 | 3 |
| Example 46 | 4 | 4 | 4 | 4 | 4 | 4 | 4 | 4 | 4 | 4 | 4 | 4 | 4 | 4 | 4 | 3 | 3 | 3 | 3 |
| Example 47 | 4 | 4 | 4 | 4 | 4 | 4 | 4 | 4 | 4 | 4 | 4 | 4 | 4 | 4 | 4 | 4 | 4 | 4 | 4 |
| Example 48 | 3 | 3 | 3 | 3 | 3 | 3 | 3 | 3 | 3 | 3 | 3 | 3 | 3 | 3 | 3 | 3 | 3 | 3 | 3 |

| | Adhesiveness Adhesive | | | | | | | | | | | | | | | |
|---|---|---|---|---|---|---|---|---|---|---|---|---|---|---|---|---|
| | F | | | | G | | | | H | | | | I | | | |
| | Evaluation method | | | | | | | | | | | | | | | |
| | 1 | | 2 | | 1 | | 2 | | 1 | | 2 | | 1 | | 2 | |
| | Evaluation criteria | | | | | | | | | | | | | | | |
| | X | Y | X | Y | X | Y | X | Y | X | Y | X | Y | X | Y | X | Y |
| Example 28 | 4 | 4 | 4 | 4 | 4 | 4 | 4 | 4 | 3 | 3 | 3 | 3 | 4 | 4 | 4 | 4 |
| Example 29 | 4 | 4 | 4 | 4 | 4 | 4 | 4 | 4 | 3 | 3 | 3 | 3 | 4 | 4 | 4 | 4 |
| Example 30 | 3 | 3 | 3 | 3 | 3 | 3 | 3 | 3 | 3 | 3 | 3 | 3 | 3 | 3 | 3 | 3 |
| Example 31 | 4 | 4 | 4 | 4 | 4 | 4 | 4 | 4 | 3 | 3 | 3 | 3 | 4 | 4 | 4 | 4 |
| Example 32 | 4 | 4 | 4 | 4 | 4 | 4 | 4 | 4 | 3 | 3 | 3 | 3 | 4 | 4 | 4 | 4 |
| Example 33 | 3 | 3 | 3 | 3 | 3 | 3 | 3 | 3 | 3 | 3 | 3 | 3 | 3 | 3 | 3 | 3 |
| Example 34 | 4 | 4 | 4 | 4 | 4 | 4 | 4 | 4 | 3 | 3 | 3 | 3 | 4 | 4 | 4 | 4 |
| Example 35 | 4 | 4 | 4 | 4 | 4 | 4 | 4 | 4 | 3 | 3 | 3 | 3 | 4 | 4 | 4 | 4 |
| Example 36 | 4 | 4 | 4 | 4 | 4 | 4 | 4 | 4 | 3 | 3 | 3 | 3 | 4 | 4 | 4 | 4 |
| Example 37 | 4 | 4 | 4 | 4 | 4 | 4 | 4 | 4 | 3 | 3 | 3 | 3 | 4 | 4 | 4 | 4 |
| Example 38 | 4 | 4 | 4 | 4 | 4 | 4 | 4 | 4 | 3 | 3 | 3 | 3 | 4 | 4 | 4 | 4 |
| Example 39 | 4 | 4 | 4 | 4 | 4 | 4 | 4 | 4 | 3 | 3 | 3 | 3 | 4 | 4 | 4 | 4 |
| Example 40 | 4 | 4 | 4 | 4 | 4 | 4 | 4 | 4 | 3 | 3 | 3 | 3 | 4 | 4 | 4 | 4 |
| Example 41 | 4 | 4 | 4 | 4 | 4 | 4 | 4 | 4 | 3 | 3 | 3 | 3 | 4 | 4 | 4 | 4 |
| Example 42 | 4 | 4 | 4 | 4 | 4 | 4 | 4 | 4 | 4 | 4 | 4 | 4 | 4 | 4 | 4 | 4 |
| Example 43 | 3 | 3 | 3 | 3 | 3 | 3 | 3 | 3 | 2 | 2 | 2 | 2 | 3 | 3 | 3 | 3 |
| Example 44 | 3 | 3 | 3 | 3 | 3 | 3 | 3 | 3 | 3 | 3 | 3 | 3 | 3 | 3 | 3 | 3 |
| Example 45 | 4 | 4 | 4 | 4 | 4 | 4 | 4 | 4 | 3 | 3 | 3 | 3 | 4 | 4 | 4 | 4 |
| Example 46 | 4 | 4 | 4 | 4 | 4 | 4 | 4 | 4 | 3 | 3 | 3 | 3 | 4 | 4 | 4 | 4 |
| Example 47 | 4 | 4 | 4 | 4 | 4 | 4 | 4 | 4 | 4 | 4 | 4 | 4 | 4 | 4 | 4 | 4 |
| Example 48 | 3 | 3 | 3 | 3 | 3 | 3 | 3 | 3 | 3 | 3 | 3 | 3 | 3 | 3 | 3 | 3 |

TABLE 10

| | Adhesiveness Adhesive | | | | | | | | | | | | | | | |
|---|---|---|---|---|---|---|---|---|---|---|---|---|---|---|---|---|
| | A | | | | B | | | | C | | | | D | | E | |
| | Evaluation method | | | | | | | | | | | | | | | |
| | 1 | | 2 | | 1 | | 2 | | 1 | | 2 | | 1 | | 2 | |
| | Evaluation criteria | | | | | | | | | | | | | | | |
| | X | Y | X | Y | X | Y | X | Y | X | Y | X | Y | X | Y | X | Y |
| Example 49 | 4 | 4 | 4 | 4 | 4 | 4 | 4 | 4 | 4 | 4 | 4 | 4 | 4 | 4 | 3 | 3 |
| Example 50 | 4 | 4 | 4 | 4 | 4 | 4 | 4 | 4 | 4 | 4 | 4 | 4 | 4 | 4 | 3 | 3 |
| Example 51 | 4 | 4 | 4 | 4 | 4 | 4 | 4 | 4 | 4 | 4 | 4 | 4 | 4 | 4 | 3 | 3 |
| Example 52 | 4 | 4 | 4 | 4 | 4 | 4 | 4 | 4 | 4 | 4 | 4 | 4 | 4 | 4 | 3 | 3 |
| Example 53 | 4 | 4 | 4 | 4 | 4 | 4 | 4 | 4 | 4 | 4 | 4 | 4 | 4 | 4 | 3 | 3 |
| Example 54 | 4 | 4 | 4 | 4 | 4 | 4 | 4 | 4 | 4 | 4 | 4 | 4 | 4 | 4 | 3 | 3 |
| Example 55 | 4 | 4 | 4 | 4 | 4 | 4 | 4 | 4 | 4 | 4 | 4 | 4 | 4 | 4 | 3 | 3 |

TABLE 10-continued

| | | | | | | | | | | | | | | | | | | |
|---|---|---|---|---|---|---|---|---|---|---|---|---|---|---|---|---|---|---|
| Example 56 | 4 | 4 | 4 | 4 | 4 | 4 | 4 | 4 | 4 | 4 | 4 | 4 | 4 | 4 | 4 | 3 | 3 | 3 | 3 |
| Example 57 | 4 | 4 | 4 | 4 | 4 | 4 | 4 | 4 | 4 | 4 | 4 | 4 | 4 | 4 | 4 | 3 | 3 | 3 | 3 |
| Example 58 | 4 | 4 | 4 | 4 | 4 | 4 | 4 | 4 | 4 | 4 | 4 | 4 | 4 | 4 | 4 | 4 | 4 | 4 | 4 |
| Example 59 | 4 | 4 | 4 | 4 | 4 | 4 | 4 | 4 | 4 | 4 | 4 | 4 | 4 | 4 | 4 | 4 | 4 | 4 | 4 |
| Example 60 | 4 | 4 | 4 | 4 | 4 | 4 | 4 | 4 | 4 | 4 | 4 | 4 | 4 | 4 | 4 | 4 | 4 | 4 | 4 |
| Example 61 | 4 | 4 | 4 | 4 | 4 | 4 | 4 | 4 | 4 | 4 | 4 | 4 | 4 | 4 | 4 | 4 | 4 | 4 | 4 |
| Example 62 | 4 | 4 | 4 | 4 | 4 | 4 | 4 | 4 | 4 | 4 | 4 | 4 | 4 | 4 | 4 | 3 | 3 | 3 | 3 |
| Example 63 | 4 | 4 | 4 | 4 | 4 | 4 | 4 | 4 | 4 | 4 | 4 | 4 | 4 | 4 | 4 | 3 | 3 | 3 | 3 |
| Example 64 | 4 | 4 | 4 | 4 | 4 | 4 | 4 | 4 | 4 | 4 | 4 | 4 | 4 | 4 | 4 | 4 | 4 | 4 | 4 |
| Example 65 | 4 | 4 | 4 | 4 | 4 | 4 | 4 | 4 | 4 | 4 | 4 | 4 | 4 | 4 | 4 | 4 | 4 | 4 | 4 |
| Example 66 | 4 | 4 | 4 | 4 | 4 | 4 | 4 | 4 | 4 | 4 | 4 | 4 | 4 | 4 | 4 | 4 | 4 | 4 | 4 |
| Example 67 | 4 | 4 | 4 | 4 | 4 | 4 | 4 | 4 | 4 | 4 | 4 | 4 | 4 | 4 | 4 | 4 | 4 | 4 | 4 |
| Example 68 | 4 | 4 | 4 | 4 | 4 | 4 | 4 | 4 | 4 | 4 | 4 | 4 | 4 | 4 | 4 | 3 | 3 | 3 | 3 |
| Comparative Example 1 | 1 | 1 | 1 | 1 | 1 | 1 | 1 | 1 | 1 | 1 | 1 | 1 | 1 | 1 | 1 | 1 | 1 | 1 | 1 |
| Comparative Example 2 | 1 | 1 | 1 | 1 | 1 | 1 | 1 | 1 | 1 | 1 | 1 | 1 | 1 | 1 | 1 | 1 | 1 | 1 | 1 |
| Comparative Example 3 | 1 | 1 | 1 | 1 | 1 | 1 | 1 | 1 | 1 | 1 | 1 | 1 | 1 | 1 | 1 | 1 | 1 | 1 | 1 |
| Comparative Example 4 | 1 | 1 | 1 | 1 | 1 | 1 | 1 | 1 | 1 | 1 | 1 | 1 | 1 | 1 | 1 | 1 | 1 | 1 | 1 |
| Comparative Example 5 | 1 | 1 | 1 | 1 | 1 | 1 | 1 | 1 | 1 | 1 | 1 | 1 | 1 | 1 | 1 | 1 | 1 | 1 | 1 |
| Comparative Example 6 | 1 | 1 | 1 | 1 | 1 | 1 | 1 | 1 | 1 | 1 | 1 | 1 | 1 | 1 | 1 | 1 | 1 | 1 | 1 |
| Comparative Example 7 | 1 | 1 | 1 | 1 | 1 | 1 | 1 | 1 | 1 | 1 | 1 | 1 | 1 | 1 | 1 | 1 | 1 | 1 | 1 |

| | Adhesiveness Adhesive | | | | | | | | | | | | | | | |
|---|---|---|---|---|---|---|---|---|---|---|---|---|---|---|---|---|
| | F | | | | G | | | | H | | | | I | | | |
| | Evaluation method | | | | | | | | | | | | | | | |
| | 1 | | 2 | | 1 | | 2 | | 1 | | 2 | | 1 | | 2 | |
| | Evaluation criteria | | | | | | | | | | | | | | | |
| | X | Y | X | Y | X | Y | X | Y | X | Y | X | Y | X | Y | X | Y |
| Example 49 | 4 | 4 | 4 | 4 | 4 | 4 | 4 | 4 | 3 | 3 | 3 | 3 | 4 | 4 | 4 | 4 |
| Example 50 | 4 | 4 | 4 | 4 | 4 | 4 | 4 | 4 | 3 | 3 | 3 | 3 | 4 | 4 | 4 | 4 |
| Example 51 | 4 | 4 | 4 | 4 | 4 | 4 | 4 | 4 | 3 | 3 | 3 | 3 | 4 | 4 | 4 | 4 |
| Example 52 | 4 | 4 | 4 | 4 | 4 | 4 | 4 | 4 | 3 | 3 | 3 | 3 | 4 | 4 | 4 | 4 |
| Example 53 | 4 | 4 | 4 | 4 | 4 | 4 | 4 | 4 | 3 | 3 | 3 | 3 | 4 | 4 | 4 | 4 |
| Example 54 | 4 | 4 | 4 | 4 | 4 | 4 | 4 | 4 | 3 | 3 | 3 | 3 | 4 | 4 | 4 | 4 |
| Example 55 | 4 | 4 | 4 | 4 | 4 | 4 | 4 | 4 | 3 | 3 | 3 | 3 | 4 | 4 | 4 | 4 |
| Example 56 | 4 | 4 | 4 | 4 | 4 | 4 | 4 | 4 | 3 | 3 | 3 | 3 | 4 | 4 | 4 | 4 |
| Example 57 | 4 | 4 | 4 | 4 | 4 | 4 | 4 | 4 | 3 | 3 | 3 | 3 | 4 | 4 | 4 | 4 |
| Example 58 | 4 | 4 | 4 | 4 | 4 | 4 | 4 | 4 | 3 | 3 | 3 | 3 | 4 | 4 | 4 | 4 |
| Example 59 | 4 | 4 | 4 | 4 | 4 | 4 | 4 | 4 | 4 | 4 | 4 | 4 | 4 | 4 | 4 | 4 |
| Example 60 | 4 | 4 | 4 | 4 | 4 | 4 | 4 | 4 | 4 | 4 | 4 | 4 | 4 | 4 | 4 | 4 |
| Example 61 | 4 | 4 | 4 | 4 | 4 | 4 | 4 | 4 | 3 | 3 | 3 | 3 | 4 | 4 | 4 | 4 |
| Example 62 | 4 | 4 | 4 | 4 | 4 | 4 | 4 | 4 | 3 | 3 | 3 | 3 | 4 | 4 | 4 | 4 |
| Example 63 | 4 | 4 | 4 | 4 | 4 | 4 | 4 | 4 | 3 | 3 | 3 | 3 | 4 | 4 | 4 | 4 |
| Example 64 | 4 | 4 | 4 | 4 | 4 | 4 | 4 | 4 | 3 | 3 | 3 | 3 | 4 | 4 | 4 | 4 |
| Example 65 | 4 | 4 | 4 | 4 | 4 | 4 | 4 | 4 | 4 | 4 | 4 | 4 | 4 | 4 | 4 | 4 |
| Example 66 | 4 | 4 | 4 | 4 | 4 | 4 | 4 | 4 | 4 | 4 | 4 | 4 | 4 | 4 | 4 | 4 |
| Example 67 | 4 | 4 | 4 | 4 | 4 | 4 | 4 | 4 | 3 | 3 | 3 | 3 | 4 | 4 | 4 | 4 |
| Example 68 | 4 | 4 | 4 | 4 | 4 | 4 | 4 | 4 | 3 | 3 | 3 | 3 | 4 | 4 | 4 | 4 |
| Comparative Example 1 | 1 | 1 | 1 | 1 | 1 | 1 | 1 | 1 | 1 | 1 | 1 | 1 | 1 | 1 | 1 | 1 |
| Comparative Example 2 | 1 | 1 | 1 | 1 | 1 | 1 | 1 | 1 | 1 | 1 | 1 | 1 | 1 | 1 | 1 | 1 |
| Comparative Example 3 | 1 | 1 | 1 | 1 | 1 | 1 | 1 | 1 | 1 | 1 | 1 | 1 | 1 | 1 | 1 | 1 |
| Comparative Example 4 | 1 | 1 | 1 | 1 | 1 | 1 | 1 | 1 | 1 | 1 | 1 | 1 | 1 | 1 | 1 | 1 |
| Comparative Example 5 | 1 | 1 | 1 | 1 | 1 | 1 | 1 | 1 | 1 | 1 | 1 | 1 | 1 | 1 | 1 | 1 |
| Comparative Example 6 | 1 | 1 | 1 | 1 | 1 | 1 | 1 | 1 | 1 | 1 | 1 | 1 | 1 | 1 | 1 | 1 |
| Comparative Example 7 | 1 | 1 | 1 | 1 | 1 | 1 | 1 | 1 | 1 | 1 | 1 | 1 | 1 | 1 | 1 | 1 |

As shown in Tables 6 to 10, all of the surface-treated steel sheets of Examples 1 to 42, 44 to 47, and 49 to 68, which are the examples of the present invention, had sufficient corrosion resistance and blacking resistance, and had fine adhesiveness with an adhesive.

On the other hand, as shown in Tables 6 to 10, in the surface-treated steel sheets of Comparative Examples 1 to 5, each having a coating being free from any of an acrylic resin, zirconium, vanadium, phosphorus and cobalt, the area ratio of the acrylic resin in the upper area A was less than 80 area %. Therefore, the adhesiveness with an adhesive was insufficient in Comparative Examples 1 to 7. Specifically, since the coating was free from an acrylic resin component in Comparative Example 2, cracking in the surface structure significantly occurred and the tightness of adhesion was poor.

Furthermore, the blacking resistance was insufficient in Comparative Example 5 having a coating being free from cobalt.

Furthermore, in the surface-treated steel sheet of Comparative Example 6 in which the surface treating agent was applied, retained for less than 0.5 seconds and then heated, the area ratio of the acrylic resin in the upper area A was less than 80 area %, and the crack suppression in the surface structure was insufficient, and thus the tightness of adhesion with an overcoating layer and the adhesiveness with an adhesive were insufficient. Furthermore, also in the surface-treated steel sheet of Comparative Example 6 in which the steel sheet entering temperature was less than 5° C., the area ratio of the acrylic resin in the upper area A was less than 80 area % and the crack suppression in the surface structure was insufficient, and thus the tightness of adhesion with an overcoating layer and the adhesiveness with an adhesive were insufficient.

The cross-section of the surface-treated steel sheet of each of Examples and Comparative Examples was observed by using a field-emission transmission electron microscope (FE-TEM) (manufactured by JEOL Ltd.).

FIG. 4 is a TEM image of the cross-section of the surface-treated steel sheet of Example 42.

In the TEM image of the cross-section of the surface-treated steel sheet of Example 42 shown in FIG. 4, a coating formed of a plurality of particulate white parts (acrylic resin) and gray inhibitor phases is observed on the surface, and the concentrations at the uppermost surface and the lowermost surface of the acrylic resin are more than the concentration of the acrylic resin of the entirety of the coating.

In the surface-treated steel sheet of Example 42, the area ratio of the acrylic resin in the upper area A was equal to or more than 80 area %, the area ratio of the acrylic resin in the lower area B was equal to or more than 90 area %, and the area ratio of the acrylic resin in the central area C was equal to or more than 5 area % and equal to or less than 50 area %.

Furthermore, an enlarged TEM image of the cross-section of the surface-treated steel sheet of Example 42 is shown in FIG. 17, and an SEM image of the surface of the surface-treated steel sheet of Example 42 is shown in FIG. 18. As shown in FIG. 17, in the range in the thickness direction from the upper area A to the lower area B including the central area C, bridge parts of the acrylic resin formed by acrylic resin connected into a columnar shape are observed (see the arrows in the drawing). Such bridge parts correspond to the valley parts between the projections indicated by the arrows in FIG. 18. It was considered that suppression of generation of cracks, adhesiveness with an adhesive, and tightness of adhesion with an overcoating layer are improved by such bridge parts, in which the acrylic resin aggregates like columns in the coating 3 to support the valley parts between the projection 35 and the projection 35 on the surface.

Figure 5:
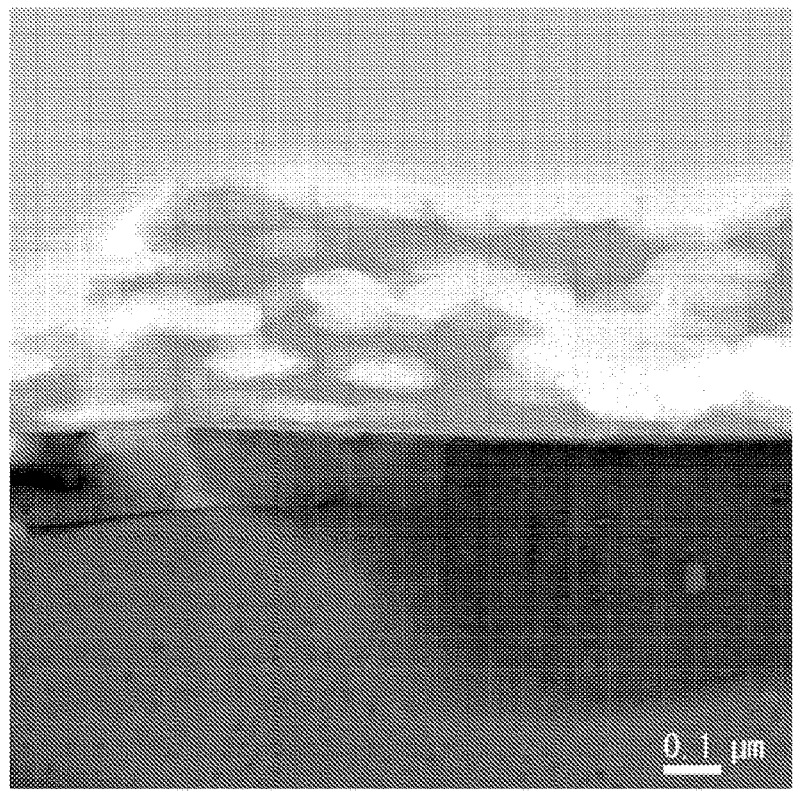
FIG. 5 is a TEM image of the cross-section of a surface-treated steel sheet of Example 41.

FIG. 5 is a TEM image of the cross-section of the surface-treated steel sheet of Example 41.

In the TEM image of the cross-section of the surface-treated steel sheet of Example 41 shown in FIG. 5, a coating formed of a plurality of particulate white parts (acrylic resin) and gray inhibitor phases is observed on the surface, and the concentration of the acrylic resin at the uppermost surface is more than the concentration of the acrylic resin of the entirety of the coating.

In the surface-treated steel sheet of Example 41, the area ratio of the acrylic resin in the upper area A was equal to or more than 80 area %, the area ratio of the acrylic resin in the lower area B was less than 80 area %, and the area ratio of the acrylic resin in the central area C was equal to or more than 5 area % and equal to or less than 50 area %.

Figure 6:
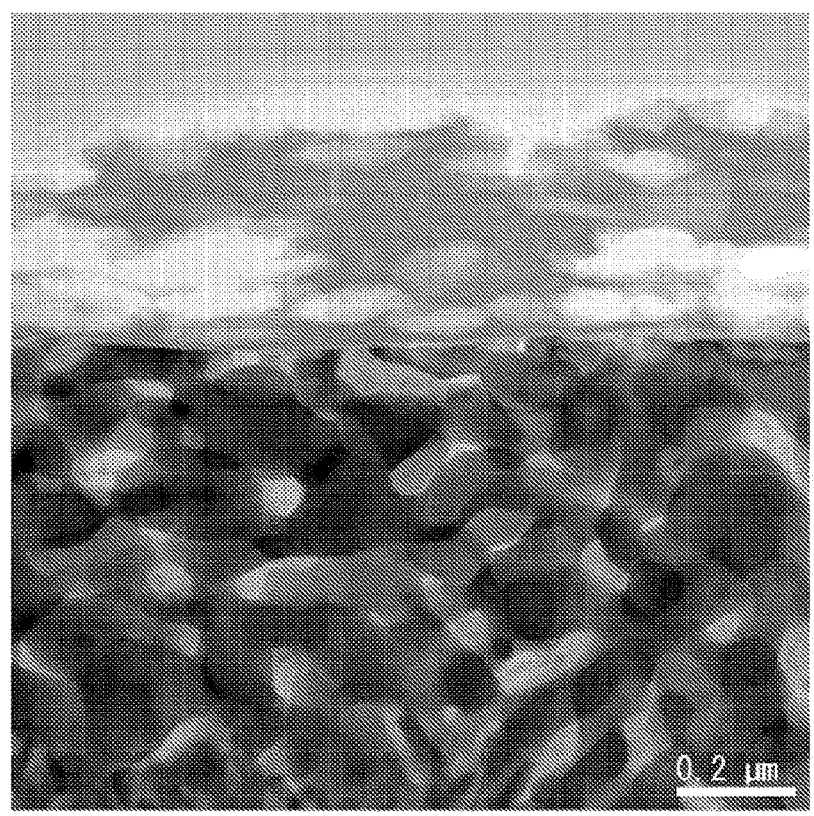
FIG. 6 is a TEM image of the cross-section of a surface-treated steel sheet of Example 3.

FIG. 6 is a TEM image of the cross-section of the surface-treated steel sheet of Example 3.

In the TEM image of the cross-section of the surface-treated steel sheet of Example 3 shown in FIG. 6, a coating formed of a plurality of particulate white parts (acrylic resin) and gray inhibitor phases is observed on the surface, and the concentration of the acrylic resin at the uppermost surface is more than the concentration of the acrylic resin of the entirety of the coating.

In the surface-treated steel sheet of Example 3, the area ratio of the acrylic resin in the upper area A was equal to or more than 80 area %, the area ratio of the acrylic resin in the lower area B was less than 80 area %, and the area ratio of the acrylic resin in the central area C was equal to or more than 5 area % and equal to or less than 50 area %.

3. Production of Surface-Treated Steel Sheet

Subsequently, in order to observe the surface state of the surface-treated steel sheet, a surface-treated steel sheet was produced as follows and evaluated. Firstly, the above-mentioned steel sheet having plated layers on the both surfaces was degreased according to the method described in the following (4). Subsequently, the above-mentioned aqueous surface treating agent was applied onto the both surfaces of the degreased steel sheet having plated layers on the both surfaces by the method described in the following (5) to form coatings, the coatings were then dried by the method described in the following (6) to give each of the surface-treated steel sheets of Examples and Comparative Examples.

(4) Degreasing

Using a degreasing agent (an alkali degreasing agent manufactured by Nihon Parkerizing Co., Ltd., trade name: Fine Cleaner E6406), the above-mentioned steel sheet having plated layers on the both surfaces was degreased (initial make-up of electrolytic bath of 20 g/L, at 60° C., spraying for 10 seconds with spray pressure of 50 kPa). Thereafter the steel sheet was washed with water by using a spray for 10 seconds.

(5) Application of Aqueous Surface Treating Agent

The aqueous surface treating agent shown in Table 3 was applied onto the both surfaces of the degreased steel sheet having plated layers on the both surfaces by using a roll coater to form a coating. The aqueous surface treating agent was applied with adjusting the concentration of the aqueous surface treating agent and the application amount so as to give the Zr adhesion amount shown in Tables 11 and 12. Furthermore, the temperature of the aqueous surface treating agent itself during the application was adjusted as shown in Tables 11 and 12. Furthermore, the application amount of the aqueous surface treating agent itself was 0.3 to 2 g/m² in each example.

In addition, in a case where the steel sheet entering temperature was 100° C., the evaporation of the water content in the aqueous surface treating agent rapidly occurred, and thus a phenomenon in which bubble-like small bulging and pores generate, a so-called foaming phenomenon occurred, and thus appearance failure occurred. Therefore, a surface-treated steel sheet having a high quality coating layer was not able to be appropriately produced. Accordingly, it can be said that the steel sheet entering temperature is preferably equal to or less than 80° C.

In addition, at this time, the steel sheet was heated so that the temperature of the steel sheet when the steel sheet entered into the roll coater (steel sheet entering temperature) became the temperature shown in Tables 11 and 12. The coating retention time was adjusted by controlling the transport speed of the steel sheet from the roll coater to the heating furnace. Furthermore, at this time, the viscosity of the aqueous surface treating agent at 25° C. in each example was within a range of 1.5 to 2 mPa·s.

(6) Drying of Coating

The steel sheet in which the coating had been formed on the plated layer was heated by using an induction heating (IH) apparatus at a peak metal temperature (PMT) of 150° C. to dry the coating formed on the plated layer.

TABLE 11

|  | Aqueous surface treating agent | Steel sheet | Application method | Temperature of aqueous surface treating agent (° C.) | Temperature of entering of steel sheet into coater (° C.) | Coating retention time (sec) | Zr adhesion amount (mg/m²) |
|---|---|---|---|---|---|---|---|
| Comparative Example 8 | No. 1 | M2 | roll coater | 15 | 15 | 4 | 120 |
| Example 69 | No. 2 | M2 | roll coater | 15 | 15 | 4 | 120 |
| Example 70 | No. 3 | M2 | roll coater | 15 | 15 | 4 | 120 |
| Example 71 | No. 4 | M2 | roll coater | 15 | 15 | 4 | 120 |
| Example 72 | No. 5 | M2 | roll coater | 15 | 15 | 4 | 120 |
| Example 73 | No. 6 | M2 | roll coater | 15 | 15 | 4 | 120 |
| Example 74 | No. 7 | M2 | roll coater | 15 | 15 | 4 | 120 |
| Comparative Example 9 | No. 8 | M2 | roll coater | 15 | 15 | 4 | 120 |
| Example 75 | No. 9 | M2 | roll coater | 15 | 15 | 4 | 120 |
| Example 76 | No. 10 | M2 | roll coater | 15 | 15 | 4 | 120 |
| Example 77 | No. 11 | M2 | roll coater | 15 | 15 | 4 | 120 |
| Example 78 | No. 12 | M2 | roll coater | 15 | 15 | 4 | 120 |
| Example 79 | No. 13 | M2 | roll coater | 15 | 15 | 4 | 120 |
| Example 80 | No. 14 | M2 | roll coater | 15 | 15 | 4 | 120 |
| Example 81 | No. 15 | M2 | roll coater | 15 | 15 | 4 | 120 |
| Example 82 | No. 16 | M2 | roll coater | 15 | 15 | 4 | 120 |
| Example 83 | No. 17 | M2 | roll coater | 15 | 15 | 4 | 120 |
| Example 84 | No. 18 | M2 | roll coater | 15 | 15 | 4 | 120 |
| Example 85 | No. 19 | M2 | roll coater | 15 | 15 | 4 | 120 |
| Example 86 | No. 20 | M2 | roll coater | 15 | 15 | 4 | 120 |
| Example 87 | No. 21 | M2 | roll coater | 15 | 15 | 4 | 120 |
| Example 88 | No. 22 | M2 | roll coater | 15 | 15 | 4 | 120 |
| Example 89 | No. 23 | M2 | roll coater | 15 | 15 | 4 | 120 |
| Example 90 | No. 24 | M2 | roll coater | 15 | 15 | 4 | 120 |
| Example 91 | No. 25 | M2 | roll coater | 15 | 15 | 4 | 120 |
| Example 92 | No. 26 | M2 | roll coater | 15 | 15 | 4 | 120 |
| Example 93 | No. 27 | M2 | roll coater | 15 | 15 | 4 | 120 |
| Example 94 | No. 28 | M2 | roll coater | 15 | 15 | 4 | 120 |
| Example 95 | No. 29 | M2 | roll coater | 15 | 15 | 4 | 120 |
| Comparative Example 10 | No. 30 | M2 | roll coater | 15 | 15 | 4 | 120 |
| Example 96 | No. 31 | M2 | roll coater | 15 | 15 | 4 | 120 |
| Example 97 | No. 32 | M2 | roll coater | 15 | 15 | 4 | 120 |
| Example 98 | No. 33 | M2 | roll coater | 15 | 15 | 4 | 120 |
| Comparative Example 11 | No. 34 | M2 | roll coater | 15 | 15 | 4 | 120 |
| Example 99 | No. 35 | M2 | roll coater | 15 | 15 | 4 | 120 |
| Example 100 | No. 36 | M2 | roll coater | 15 | 15 | 4 | 120 |
| Example 101 | No. 37 | M2 | roll coater | 15 | 15 | 4 | 120 |
| Comparative Example 12 | No. 38 | M2 | roll coater | 15 | 15 | 4 | 120 |
| Example 102 | No. 39 | M2 | roll coater | 15 | 15 | 4 | 120 |
| Example 103 | No. 40 | M2 | roll coater | 15 | 15 | 4 | 120 |
| Example 104 | No. 41 | M2 | roll coater | 15 | 15 | 4 | 120 |

TABLE 12

|  | Aqueous surface treating agent | Steel sheet | Application method | Temperature of aqueous surface treating agent (° C.) | Temperature of entering of steel sheet into coater (° C.) | Coating retention time (sec) | Zr adhesion amount (mg/m$^2$) |
|---|---|---|---|---|---|---|---|
| Example 105 | No. 3 | M1 | roll coater | 15 | 15 | 4 | 120 |
| Example 106 | No. 3 | M3 | roll coater | 15 | 15 | 4 | 120 |
| Example 107 | No. 3 | M4 | roll coater | 15 | 15 | 4 | 120 |
| Example 108 | No. 3 | M5 | roll coater | 15 | 15 | 4 | 120 |
| Example 109 | No. 3 | M2 | roll coater | 15 | 15 | 4 | 3 |
| Example 110 | No. 3 | M2 | roll coater | 15 | 15 | 4 | 30 |
| Example 111 | No. 3 | M2 | roll coater | 15 | 15 | 4 | 60 |
| Example 112 | No. 3 | M2 | roll coater | 15 | 15 | 4 | 150 |
| Example 113 | No. 3 | M2 | roll coater | 15 | 15 | 4 | 300 |
| Example 114 | No. 3 | M2 | roll coater | 15 | 15 | 4 | 600 |
| Example 115 | No. 42 | M2 | roll coater | 15 | 15 | 4 | 120 |
| Example 116 | No. 43 | M2 | roll coater | 15 | 15 | 4 | 120 |
| Example 117 | No. 44 | M2 | roll coater | 15 | 15 | 4 | 120 |
| Example 118 | No. 45 | M2 | roll coater | 15 | 15 | 4 | 120 |
| Example 119 | No. 46 | M2 | roll coater | 15 | 15 | 4 | 120 |
| Example 120 | No. 47 | M2 | roll coater | 15 | 15 | 4 | 120 |
| Example 121 | No. 48 | M2 | roll coater | 15 | 15 | 4 | 120 |
| Comparative Example 13 | No. 3 | M2 | roll coater | 30 | 3 | 2 | 120 |
| Example 122 | No. 3 | M2 | roll coater | 30 | 5 | 2 | 120 |
| Example 123 | No. 3 | M2 | roll coater | 30 | 10 | 2 | 120 |
| Example 124 | No. 3 | M2 | roll coater | 30 | 15 | 2 | 120 |
| Example 125 | No. 3 | M2 | roll coater | 30 | 40 | 2 | 120 |
| Example 126 | No. 3 | M2 | roll coater | 30 | 60 | 2 | 120 |
| Example 127 | No. 3 | M2 | roll coater | 30 | 80 | 2 | 120 |
| Example 128 | No. 3 | M2 | roll coater | 5 | 30 | 2 | 120 |
| Example 129 | No. 3 | M2 | roll coater | 10 | 30 | 2 | 120 |
| Example 130 | No. 3 | M2 | roll coater | 15 | 30 | 2 | 120 |
| Example 131 | No. 3 | M2 | roll coater | 40 | 30 | 2 | 120 |
| Example 132 | No. 3 | M2 | roll coater | 50 | 30 | 2 | 120 |
| Example 133 | No. 3 | M2 | roll coater | 60 | 30 | 2 | 120 |

4. Evaluation

For the surface-treated steel sheets of Examples and Comparative Examples obtained by this way, the respective items in the above-mentioned "2. Evaluation" were checked. Furthermore, the following respective items were evaluated. The results are shown in Tables 13 to 15. In addition, for the evaluation of "Adhesiveness with an adhesive", the adhesive shown in the above-mentioned A was typically evaluated.

"Length of Projection of Coating Surface"

Figure 7:
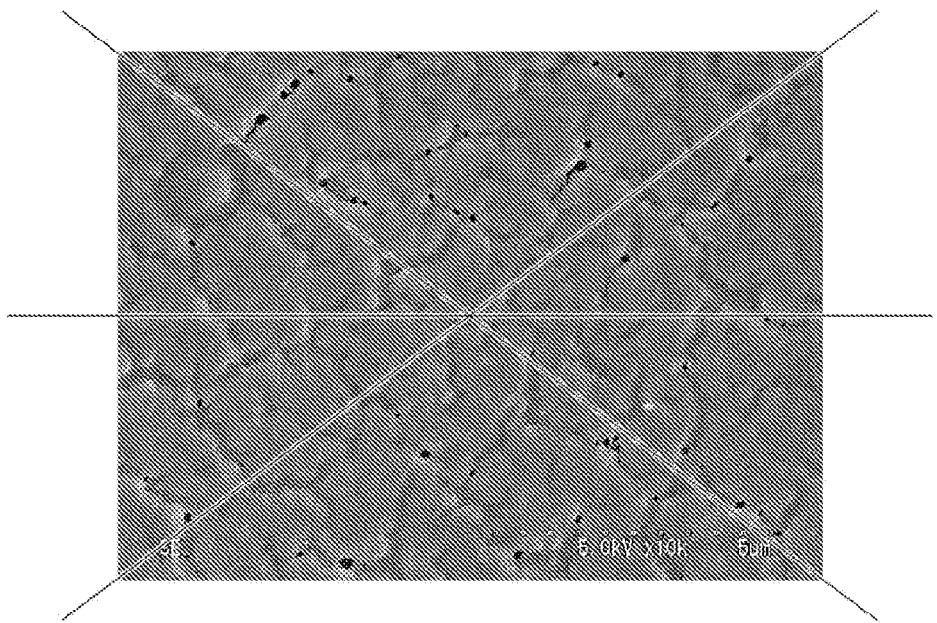
FIG. 7 is a photograph showing an image obtained by observing the surface of a surface-treated steel sheet of Example 112 by an SEM and three virtual straight lines drawn on the image.

Using a field-emission transmission electron microscope (FE-SEM) (manufactured by Hitachi, Ltd.), the surface of the surface-treated steel sheet of Example 112 was observed by a magnification of 5,000-times to give the image shown in FIG. 7. Three virtual straight lines including diagonal lines of the image and a straight line extending through the cross point of the diagonal lines and being in parallel to the long side were drawn on the obtained rectangular (long side is about 13 μm, short side is about 9.5 μm) image. Furthermore, for all of the projections through which the virtual straight lines passed, the lengths of the respective virtual straight lines that passed through the projections were measured, and an average value of the lengths was calculated and assumed as the length of the projection. Furthermore, the minimum value and the maximum value among the lengths of all of the projections measured for calculating the length of the projection were checked.

Consequently, the length of the projection of Example 112 was 0.87 μm, the above-mentioned minimum value was 0.15 μm, and the above-mentioned maximum value was 1.62 μm.

Figure 8:
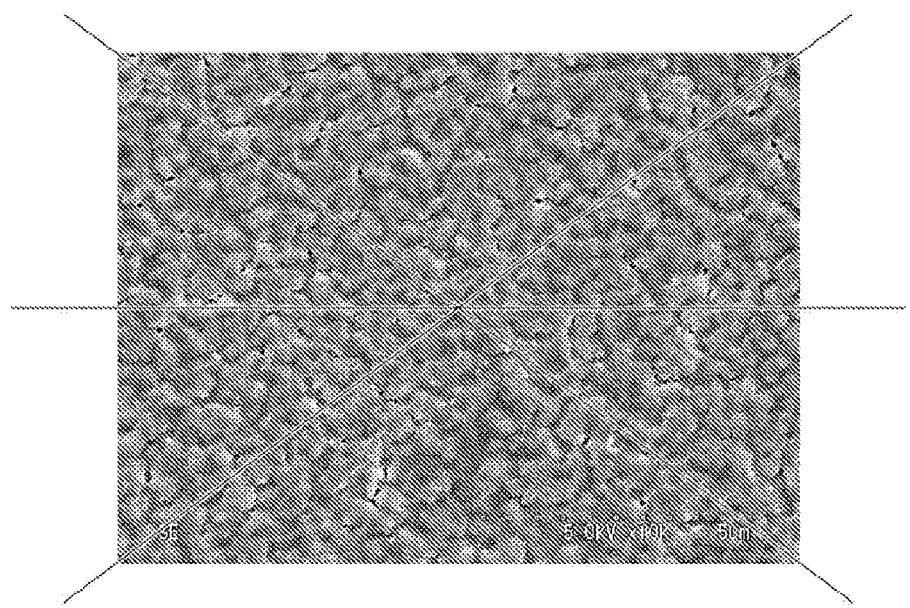
FIG. 8 is a photograph showing an image obtained by observing the surface of a surface-treated steel sheet of Comparative Example 109 by an SEM and three virtual straight lines drawn on the image.

Furthermore, the surface of the surface-treated steel sheet of Comparative Example 109 was observed in a similar manner to that in the surface-treated steel sheet of Example 112 to give the image shown in FIG. 8. Using the obtained image, the length of the projection, and the minimum value and the maximum value among the lengths of all of the projections measured for calculating the length of the projection were checked in a similar manner to that in Example 112.

Consequently, the length of the projection of Comparative Example 109 was 0.35 μm, the above-mentioned minimum value was 0.15 μm, and the above-mentioned maximum value was 0.92 μm.

Also for all of Examples and Comparative Examples except for Comparative Example 109 and Example 112, the surface of the surface-treated steel sheet was observed in a similar manner to that for the surface-treated steel sheet of Example 112, and using the obtained image, the length of the projection, and the minimum value and the maximum value among the lengths of all of the projections measured for calculating the length of the projection were checked in a similar manner to that for Example 112. The results are shown in Tables 13 to 15.

"Roughness of Projections on Coating Surface"

The arithmetic mean roughness (Ra) of the surface, the maximum cross-sectional height (Rt) of a roughness curve and the root mean square roughness (Rq) in a rectangular area in which one side was 1 μm were respectively measured by an atomic force microscope (AFM) (manufactured by Digital Inst.). The results are shown in Tables 13 to 15.

"Zirconium Distribution in Coating"

Using an electron probe micro analyzer (EPMA), the concentrations of the zirconium in "an area between adjacent projections" and "an area on which a projection is formed" in the coating were obtained by a method for analyzing the coating from the surface and evaluated according to the following criteria. The results are shown in Tables 13 to 15.

Y: The concentration of the zirconium in the area between the adjacent projections is less than the concentration of the zirconium in the area on which the projection is formed.
N: The concentration of the zirconium in the area between the adjacent projections is equal to or more than the concentration of the zirconium in the area on which the projection is formed.

"Component Between Adjacent Projections"

The surface of the coating was analyzed by using an electron probe micro analyzer (EPMA), and the distribution of the carbon component detected by the above-mentioned analysis was assumed as the distribution of the acrylic resin and evaluated by the following criteria. The results are shown in Tables 13 to 15.

Y: The concentration of the carbon component in the area between the adjacent projections is more than the concentration of the carbon component in the area on which a projection is formed.
N: The concentration of the carbon component in the area between the adjacent projections is equal to or less than the concentration of the carbon component in the area on which a projection is formed.

In addition, a coating peeled from each surface-treated steel sheet by an acid treatment was subjected to an infrared ray spectroscopy and a thermal decomposition gas chromatograph-mass analyzer (GC-MS) analysis, and it was confirmed that the carbon component in each coating was derived from the acrylic resin, from a result analyzed from the attribution of the observed absorptions derived from the resin components in an infrared absorption spectrum of the coating obtained by an infrared ray spectroscopy, and from an analysis result of the thermal decomposition GC-MS.

TABLE 13

| | Coating structure | | | | | | | | | | | Adhesiveness (Adhesive A) | | | |
|---|---|---|---|---|---|---|---|---|---|---|---|---|---|---|---|
| | Projections | | | Roughness of projections | | | Zirconium distribution in coating | Component in adjacent projections | Corrosion resistance | | Blacking resistance | Tight adhesiveness | Evaluation method 1 | | Evaluation method 2 | |
| | Minimum value | Maximum value | | | | | | | Flat plate | Processed portion | | | Evaluation criteria | | | |
| | Length (μm) | (μm) | (μm) | Ra (nm) | Rt (nm) | Rq (nm) | | | | | | | X | Y | X | Y |
| Example 69 | 1.2 | 0.9 | 1.3 | 21 | 313 | 38 | Y | Y | 4 | 4 | 5 | 4 | 4 | 4 | 4 | 4 |
| Example 70 | 1.9 | 0.7 | 4.5 | 22 | 324 | 30 | Y | Y | 4 | 4 | 5 | 4 | 4 | 4 | 4 | 4 |
| Example 71 | 1.0 | 0.3 | 4.6 | 9 | 256 | 13 | Y | Y | 4 | 4 | 5 | 4 | 4 | 4 | 4 | 4 |
| Example 72 | 1.3 | 0.7 | 3.8 | 27 | 270 | 49 | Y | Y | 4 | 4 | 5 | 4 | 4 | 4 | 4 | 4 |
| Example 73 | 1.6 | 0.6 | 4.4 | 26 | 254 | 24 | Y | Y | 4 | 4 | 5 | 4 | 4 | 4 | 4 | 4 |
| Example 74 | 1.0 | 0.6 | 3.3 | 27 | 250 | 30 | Y | Y | 4 | 4 | 5 | 4 | 4 | 4 | 4 | 4 |
| Example 75 | 0.7 | 0.4 | 1.2 | 14 | 368 | 27 | Y | Y | 4 | 4 | 5 | 3 | 3 | 3 | 3 | 3 |
| Example 76 | 0.4 | 0.1 | 4.4 | 21 | 222 | 26 | Y | Y | 4 | 4 | 5 | 4 | 4 | 4 | 4 | 4 |
| Example 77 | 0.8 | 0.2 | 4.7 | 10 | 373 | 13 | Y | Y | 4 | 4 | 5 | 4 | 4 | 4 | 4 | 4 |
| Example 78 | 1.0 | 0.6 | 1.7 | 10 | 354 | 47 | Y | Y | 4 | 4 | 5 | 4 | 4 | 4 | 4 | 4 |
| Example 79 | 1.4 | 1.0 | 1.6 | 13 | 291 | 48 | Y | Y | 3 | 3 | 5 | 4 | 4 | 4 | 4 | 4 |
| Example 80 | 1.4 | 0.6 | 3.4 | 29 | 269 | 50 | Y | Y | 3 | 3 | 5 | 4 | 4 | 4 | 4 | 4 |
| Example 81 | 1.6 | 0.7 | 2.8 | 28 | 231 | 20 | Y | Y | 4 | 4 | 5 | 4 | 4 | 4 | 4 | 4 |
| Example 82 | 1.6 | 0.2 | 1.7 | 29 | 237 | 28 | Y | Y | 4 | 4 | 5 | 4 | 4 | 4 | 4 | 4 |
| Example 83 | 2.2 | 0.5 | 3.6 | 28 | 369 | 33 | Y | Y | 4 | 4 | 5 | 4 | 4 | 4 | 4 | 4 |
| Example 84 | 0.5 | 0.3 | 4.1 | 27 | 282 | 53 | Y | Y | 4 | 4 | 5 | 4 | 4 | 4 | 4 | 4 |
| Example 85 | 1.6 | 0.5 | 1.7 | 22 | 235 | 55 | Y | Y | 4 | 4 | 5 | 4 | 4 | 4 | 4 | 4 |
| Example 86 | 0.7 | 0.5 | 1.2 | 24 | 244 | 48 | Y | Y | 4 | 4 | 5 | 4 | 4 | 4 | 4 | 4 |
| Example 87 | 0.7 | 0.5 | 1.7 | 30 | 340 | 19 | Y | Y | 4 | 4 | 5 | 4 | 4 | 4 | 4 | 4 |
| Example 88 | 0.9 | 0.5 | 4.9 | 23 | 390 | 34 | Y | Y | 4 | 4 | 5 | 4 | 4 | 4 | 4 | 4 |
| Example 89 | 1.3 | 0.7 | 3.7 | 25 | 386 | 47 | Y | Y | 4 | 4 | 5 | 4 | 4 | 4 | 4 | 4 |
| Example 90 | 1.3 | 0.6 | 1.8 | 28 | 375 | 14 | Y | Y | 4 | 4 | 5 | 4 | 4 | 4 | 4 | 4 |
| Example 91 | 0.4 | 0.3 | 1.1 | 23 | 238 | 37 | Y | Y | 4 | 4 | 5 | 4 | 4 | 4 | 4 | 4 |
| Example 92 | 1.9 | 0.8 | 4.0 | 30 | 339 | 32 | Y | Y | 4 | 4 | 5 | 4 | 4 | 4 | 4 | 4 |
| Example 93 | 1.5 | 0.7 | 1.6 | 22 | 341 | 13 | Y | Y | 4 | 4 | 5 | 4 | 4 | 4 | 4 | 4 |
| Example 94 | 1.7 | 0.6 | 2.2 | 28 | 226 | 43 | Y | Y | 4 | 4 | 5 | 4 | 4 | 4 | 4 | 4 |
| Example 95 | 1.3 | 0.9 | 1.7 | 23 | 242 | 21 | Y | Y | 4 | 4 | 5 | 4 | 4 | 4 | 4 | 4 |

TABLE 14

| | Coating structure | | | | | | | | Corrosion resistance | | | | Adhesiveness (Adhesive A) | | | |
|---|---|---|---|---|---|---|---|---|---|---|---|---|---|---|---|---|
| | Projections | | | Roughness of projections | | | Zirconium distribution in coating | Component in adjacent projections | | | Blacking resistance | Tight adhesiveness | Evaluation method 1 | | Evaluation method 2 | |
| | | Minimum value | Maximum value | | | | | | | | | | Evaluation criteria | | | |
| | Length (μm) | (μm) | (μm) | Ra (nm) | Rt (nm) | Rq (nm) | | | Flat plate | Processed portion | | | X | Y | X | Y |
| Example 96  | 1.3 | 0.9 | 2.2 | 21 | 234 | 22 | Y | Y | 4 | 4 | 5 | 4 | 4 | 4 | 4 | 4 |
| Example 97  | 0.8 | 0.5 | 1.1 | 30 | 355 | 43 | Y | Y | 4 | 4 | 5 | 4 | 4 | 4 | 4 | 4 |
| Example 98  | 1.4 | 0.5 | 4.2 | 29 | 334 | 43 | Y | Y | 4 | 4 | 5 | 4 | 3 | 3 | 3 | 3 |
| Example 99  | 0.6 | 0.5 | 4.3 | 22 | 371 | 22 | Y | Y | 4 | 4 | 5 | 4 | 4 | 4 | 4 | 4 |
| Example 100 | 1.6 | 0.6 | 3.7 | 20 | 331 | 24 | Y | Y | 4 | 4 | 5 | 4 | 4 | 4 | 4 | 4 |
| Example 101 | 4.0 | 0.6 | 4.4 | 28 | 363 | 29 | Y | Y | 4 | 4 | 5 | 4 | 3 | 3 | 3 | 3 |
| Example 102 | 1.0 | 0.4 | 1.6 | 26 | 227 | 37 | Y | Y | 4 | 4 | 5 | 4 | 4 | 4 | 4 | 4 |
| Example 103 | 1.8 | 0.7 | 4.2 | 21 | 362 | 42 | Y | Y | 4 | 4 | 5 | 4 | 4 | 4 | 4 | 4 |
| Example 104 | 0.4 | 0.2 | 1.4 | 24 | 255 | 15 | Y | Y | 4 | 4 | 5 | 4 | 4 | 4 | 4 | 4 |
| Example 105 | 1.6 | 0.2 | 3.4 | 28 | 259 | 39 | Y | Y | 4 | 4 | 5 | 4 | 4 | 4 | 4 | 4 |
| Example 106 | 0.8 | 0.2 | 3.8 | 28 | 327 | 35 | Y | Y | 4 | 4 | 5 | 4 | 4 | 4 | 4 | 4 |
| Example 107 | 1.6 | 0.3 | 2.6 | 29 | 216 | 21 | Y | Y | 4 | 4 | 5 | 4 | 4 | 4 | 4 | 4 |
| Example 108 | 1.4 | 0.3 | 2.4 | 27 | 282 | 56 | Y | Y | 4 | 4 | 5 | 4 | 4 | 4 | 4 | 4 |
| Example 109 | 0.4 | 0.2 | 0.9 | 11 | 109 | 13 | Y | Y | 3 | 3 | 2 | 4 | 4 | 4 | 4 | 4 |
| Example 110 | 0.4 | 0.2 | 0.6 | 14 | 152 | 17 | Y | Y | 3 | 4 | 3 | 4 | 3 | 3 | 3 | 3 |
| Example 111 | 0.4 | 0.2 | 0.7 | 29 | 338 | 38 | Y | Y | 4 | 3 | 4 | 4 | 4 | 4 | 4 | 4 |
| Example 112 | 0.9 | 0.2 | 1.6 | 26 | 279 | 34 | Y | Y | 4 | 4 | 5 | 4 | 4 | 4 | 4 | 4 |
| Example 113 | 0.9 | 0.4 | 2.5 | 38 | 402 | 49 | Y | Y | 4 | 4 | 5 | 4 | 4 | 4 | 4 | 4 |
| Example 114 | 0.9 | 0.4 | 2.6 | 41 | 335 | 52 | Y | Y | 4 | 4 | 5 | 4 | 3 | 3 | 3 | 3 |

TABLE 15

| | Coating structure | | | | | | | | Corrosion resistance | | | | Adhesiveness (Adhesive A) | | | |
|---|---|---|---|---|---|---|---|---|---|---|---|---|---|---|---|---|
| | Projections | | | Roughness of projections | | | Zirconium distribution in coating | Component in adjacent projections | | | Blacking resistance | Tight adhesiveness | Evaluation method 1 | | Evaluation method 2 | |
| | | Minimum value | Maximum value | | | | | | | | | | Evaluation criteria | | | |
| | Length (μm) | (μm) | (μm) | Ra (nm) | Rt (nm) | Rq (nm) | | | Flat plate | Processed portion | | | X | Y | X | Y |
| Example 115 | 0.9 | 0.6 | 1.2 | 30 | 311 | 40 | Y | Y | 4 | 4 | 5 | 4 | 4 | 4 | 4 | 4 |
| Example 116 | 1.3 | 0.4 | 4.1 | 28 | 327 | 41 | Y | Y | 4 | 4 | 5 | 4 | 4 | 4 | 4 | 4 |
| Example 117 | 1.7 | 0.7 | 3.8 | 20 | 316 | 29 | Y | Y | 4 | 4 | 5 | 4 | 4 | 4 | 4 | 4 |
| Example 118 | 3.9 | 0.5 | 4.3 | 27 | 322 | 21 | Y | Y | 4 | 4 | 5 | 4 | 4 | 4 | 4 | 4 |
| Example 119 | 1.7 | 0.6 | 4.3 | 22 | 339 | 28 | Y | Y | 4 | 4 | 3 | 4 | 4 | 4 | 4 | 4 |
| Example 120 | 0.5 | 0.3 | 1.5 | 22 | 298 | 34 | Y | Y | 4 | 4 | 5 | 4 | 4 | 4 | 4 | 4 |
| Example 121 | 0.7 | 0.7 | 4.0 | 24 | 349 | 25 | Y | Y | 4 | 4 | 5 | 4 | 4 | 4 | 4 | 4 |
| Example 122 | 0.9 | 0.3 | 2.8 | 38 | 122 | 35 | Y | Y | 4 | 4 | 5 | 4 | 4 | 4 | 4 | 4 |
| Example 123 | 4.6 | 0.6 | 4.8 | 20 | 290 | 24 | Y | Y | 4 | 4 | 5 | 4 | 4 | 4 | 4 | 4 |
| Example 124 | 4.8 | 2   | 4.9 | 17 | 437 | 23 | Y | Y | 4 | 4 | 5 | 4 | 4 | 4 | 4 | 4 |
| Example 125 | 4   | 1.2 | 4.5 | 36 | 108 | 57 | Y | Y | 4 | 4 | 5 | 4 | 4 | 4 | 4 | 4 |
| Example 126 | 2.9 | 1.2 | 3.3 | 37 | 123 | 61 | Y | Y | 4 | 4 | 5 | 4 | 4 | 4 | 4 | 4 |
| Example 127 | 4   | 1.7 | 4.6 | 25 | 325 | 76 | Y | Y | 4 | 4 | 5 | 4 | 4 | 4 | 4 | 4 |
| Example 128 | 0.9 | 0.6 | 4.1 | 25 | 142 | 67 | Y | Y | 4 | 4 | 5 | 4 | 4 | 4 | 4 | 4 |
| Example 129 | 2.6 | 2.1 | 4.7 | 20 | 197 | 80 | Y | Y | 4 | 4 | 5 | 4 | 4 | 4 | 4 | 4 |
| Example 130 | 2.2 | 0.2 | 5   | 39 | 107 | 30 | Y | Y | 4 | 4 | 5 | 4 | 4 | 4 | 4 | 4 |
| Example 131 | 2.4 | 1.2 | 3.6 | 47 | 271 | 97 | Y | Y | 4 | 4 | 5 | 4 | 4 | 4 | 4 | 4 |
| Example 132 | 4.7 | 2.1 | 4.8 | 25 | 388 | 24 | Y | Y | 4 | 4 | 5 | 4 | 4 | 4 | 4 | 4 |
| Example 133 | 2.1 | 0.1 | 3.8 | 49 | 113 | 31 | Y | Y | 4 | 4 | 5 | 4 | 4 | 4 | 4 | 4 |
| Comparative Example 8  | — | — | — | 4 | 47 | 5 | N | Y | 1 | 1 | 5 | 3 | 1 | 1 | 1 | 1 |
| Comparative Example 9  | — | — | — | 1 | 13 | 1 | Y | N | 4 | 4 | 5 | 1 | 1 | 1 | 1 | 1 |
| Comparative Example 10 | 0.3 | 0.2 | 3.0 | 25 | 274 | 50 | Y | Y | 2 | 1 | 5 | 3 | 1 | 1 | 1 | 1 |
| Comparative Example 11 | 1.4 | 0.9 | 2.8 | 28 | 389 | 59 | Y | Y | 2 | 1 | 5 | 3 | 1 | 1 | 1 | 1 |
| Comparative Example 12 | 0.4 | 0.3 | 3.2 | 32 | 237 | 53 | Y | Y | 3 | 3 | 1 | 3 | 1 | 1 | 1 | 1 |

TABLE 15-continued

| | Projections | | | Roughness of projections | | | Zirconium distribution in coating | Component in adjacent projections | Corrosion resistance | | Blacking resistance | Tight adhesiveness | Adhesiveness (Adhesive A) | | | |
| | | | | | | | | | | | | | Evaluation method 1 | | Evaluation method 2 | |
| | | | | | | | | | | | | | Evaluation criteria | | | |
| | Length (μm) | Minimum value (μm) | Maximum value (μm) | Ra (nm) | Rt (nm) | Rq (nm) | | | Flat plate | Processed portion | | | X | Y | X | Y |
|---|---|---|---|---|---|---|---|---|---|---|---|---|---|---|---|---|
| Comparative Example 13 | — | — | — | 4 | 38 | 7 | Y | N | 4 | 4 | 5 | 1 | 1 | 1 | 1 | 1 |

As shown in Tables 13 to 15, all of the surface-treated steel sheets of Examples 68 to 108 110 to 113, and 115 to 133, which are the examples of the present invention, had fine corrosion resistance, fine adhesiveness with an adhesive and fine tightness of adhesion with an overcoating layer.

On the other hand, as shown in Tables 13 to 15, in the surface-treated steel sheets of Comparative Examples 8 to 13, each having a coating being free from any of an acrylic resin, zirconium, vanadium, phosphorus and cobalt, the corrosion resistance or adhesiveness with an adhesive was insufficient.

For Examples 69 to 108, 110 to 113, and 115 to 133, it was confirmed that the area ratio of the acrylic resin was 80 to 100 area % in the area from the surface on the cross-section to a thickness of one-fifth of the film thickness of the coating (upper area A), and the area ratio of the acrylic resin was 5 to 50 area % in the area (central area C) including the area from the film thickness center to a thickness of one-tenth of the film thickness toward the side of the above-mentioned surface (upper side central area C1) and the area from the above-mentioned film thickness center to a thickness of one-tenth of the film thickness toward the side of the above-mentioned plated layer (lower side central area C2). Furthermore, a plurality of amorphous island projections had been densely formed on the surface of the coating in a planar view, and cracks were suppressed.

In the surface-treated steel sheets of Comparative Examples 8 to 12, each having a coating being free from any of an acrylic resin, zirconium, vanadium, phosphorus and cobalt, the area ratio of the acrylic resin in the upper area A was less than 80 area %. Therefore, the adhesiveness with an adhesive was insufficient in Comparative Examples 8 to 12. Specifically, since Comparative Example 9 was free from an acrylic resin component, cracks on the surface structure were significantly generated, and the tightness of adhesion was poor. Furthermore, in Comparative Example 12, which had a coating being free from cobalt, the blacking resistance was insufficient.

In addition, the surface-treated steel sheet of Comparative Example 13 in which the steel sheet entering temperature was less than 5° C., the area ratio of the acrylic resin in the upper area A was less than 80 area % and the crack suppression in the surface structure was insufficient. Therefore, the tightness of adhesion with an overcoating layer and the adhesiveness with an adhesive were insufficient.

Figure 9:
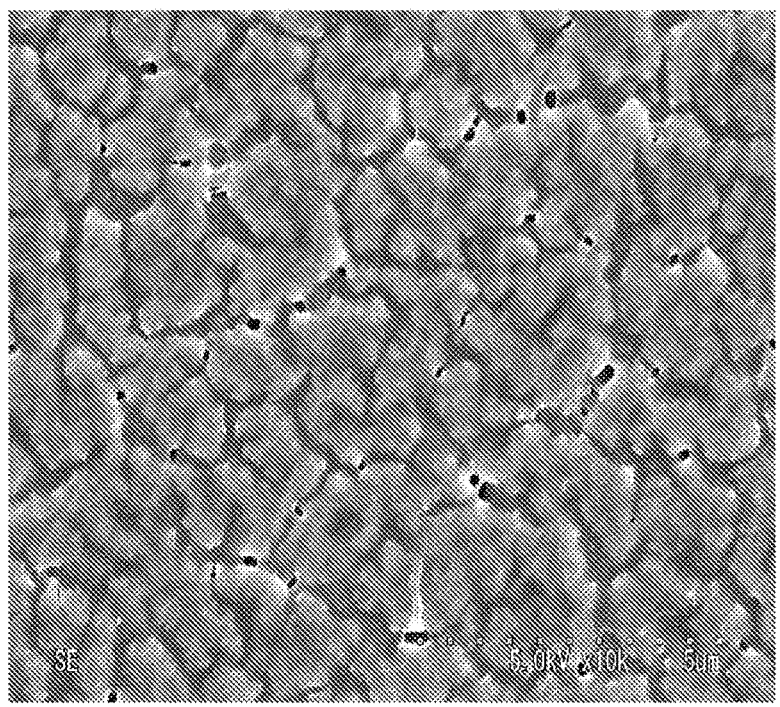
FIG. 9 is an SEM image of the surface of a surface-treated steel sheet of Example 70.
Figure 10:
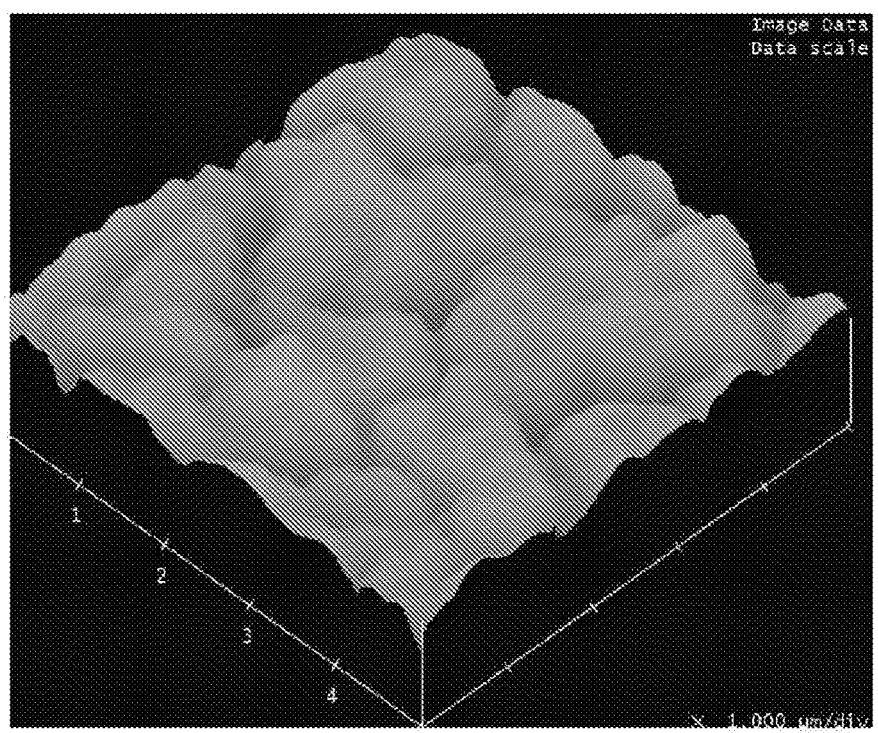
FIG. 10 is an AFM image of the surface of the surface-treated steel sheet of Example 70.
Figure 11:
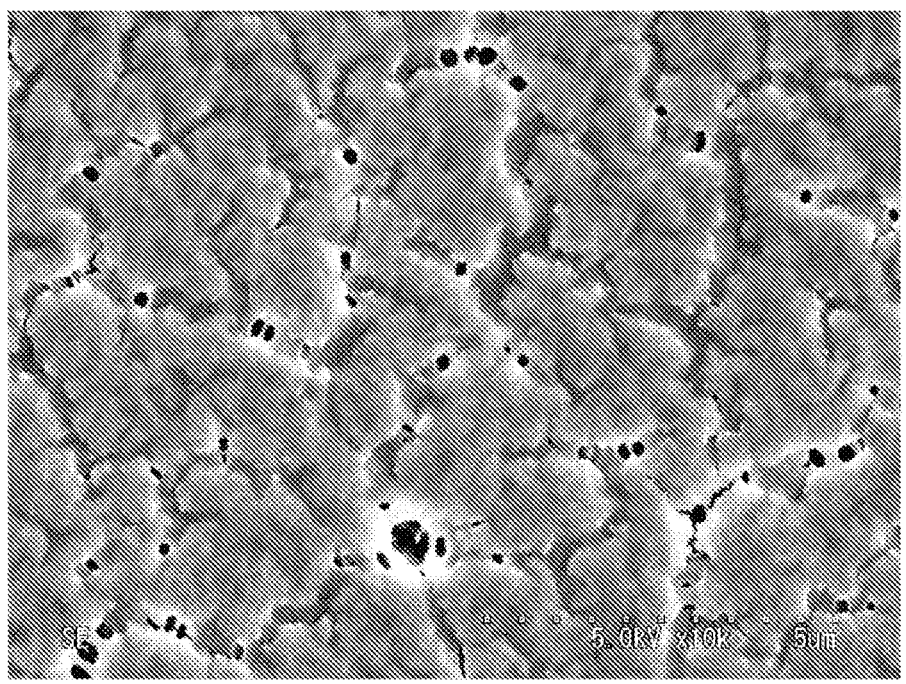
FIG. 11 is an SEM image of the surface of a surface-treated steel sheet of Example 111.
Figure 12:
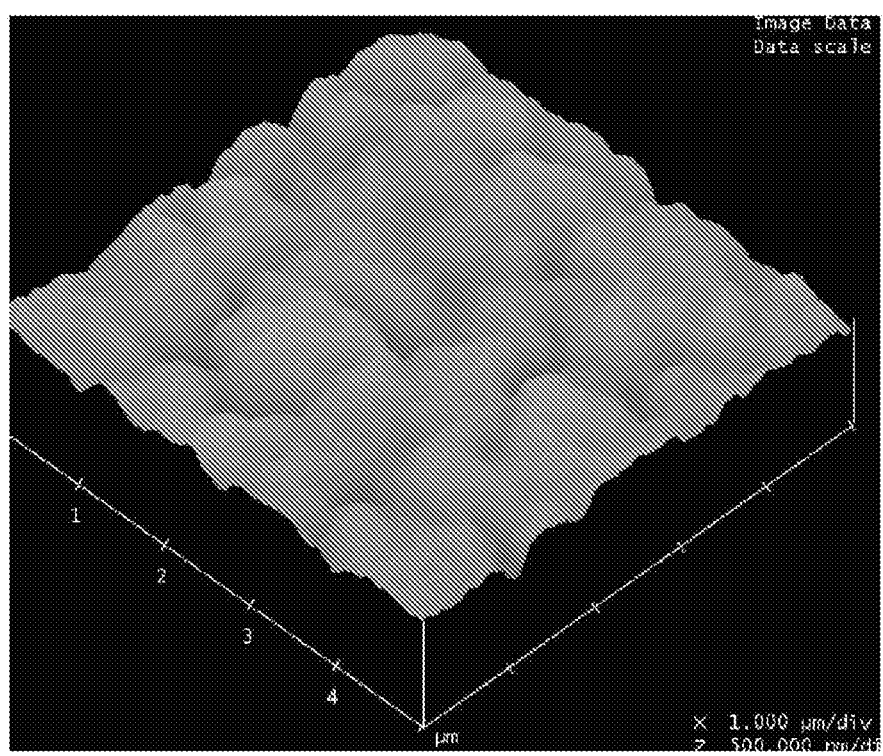
FIG. 12 is an AFM image of the surface of the surface-treated steel sheet of Example 111.

FIG. 9 is an SEM image of the surface of the surface-treated steel sheet of Example 70, and FIG. 10 is an AFM image. FIG. 11 is an SEM image of the surface of the surface-treated steel sheet of Example 111, and FIG. 12 is an AFM image.

As shown in FIGS. 9 to 12, a plurality of amorphous island projections had been densely formed on the surface of the coating in a planar view of the surface-treated steel sheets of Examples 70 and 111.

Figure 14:
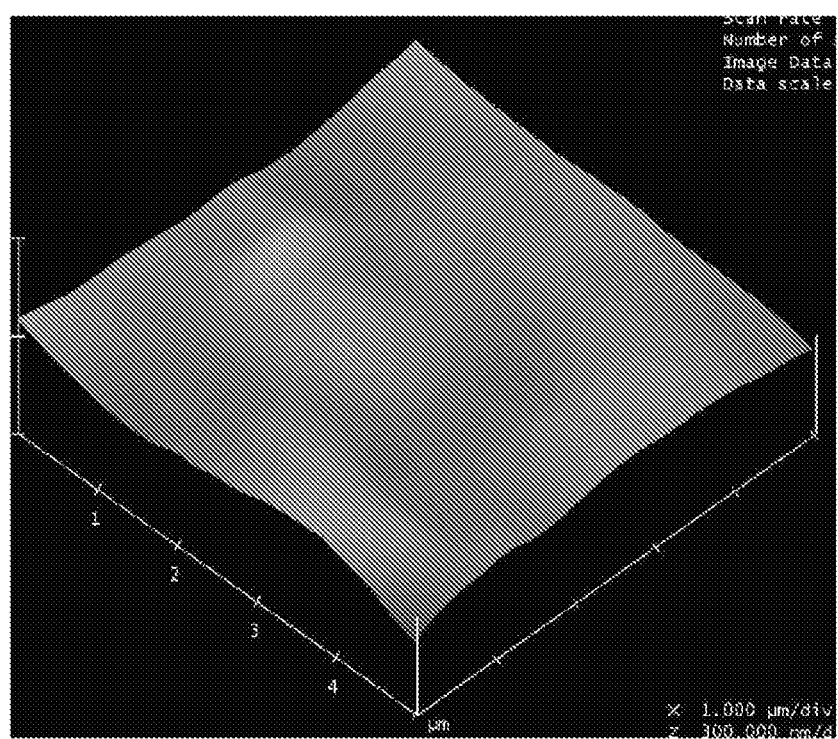
FIG. 14 is an AFM image of the surface of the surface-treated steel sheet of Comparative Example 9.

FIG. 13 is an SEM image of Comparative Example 9, and FIG. 14 is an AFM image. The coating in Comparative Example 9 was free from an acrylic resin.

Therefore, as shown in FIGS. 13 and 14, amorphous island projections had not been formed in a planar view on the surface of the coating of the surface-treated steel sheet of Comparative Example 9. As shown in FIG. 13, cracks reaching the plated layer were present on the surface of the coating of the surface-treated steel sheet of Comparative Example 9.

Figure 15:
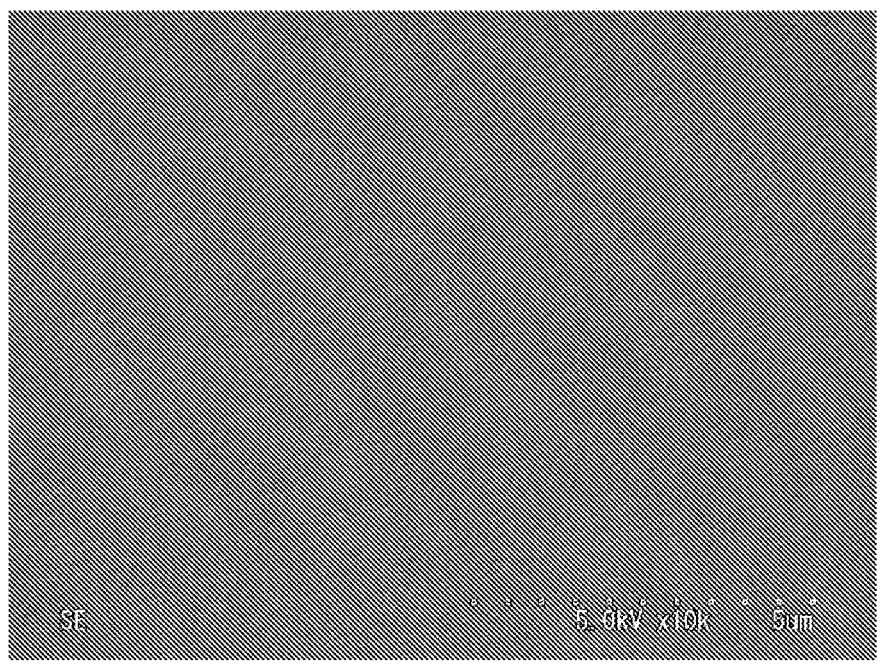
FIG. 15 is an SEM image of the surface of a surface-treated steel sheet of Comparative Example 8.
Figure 16:
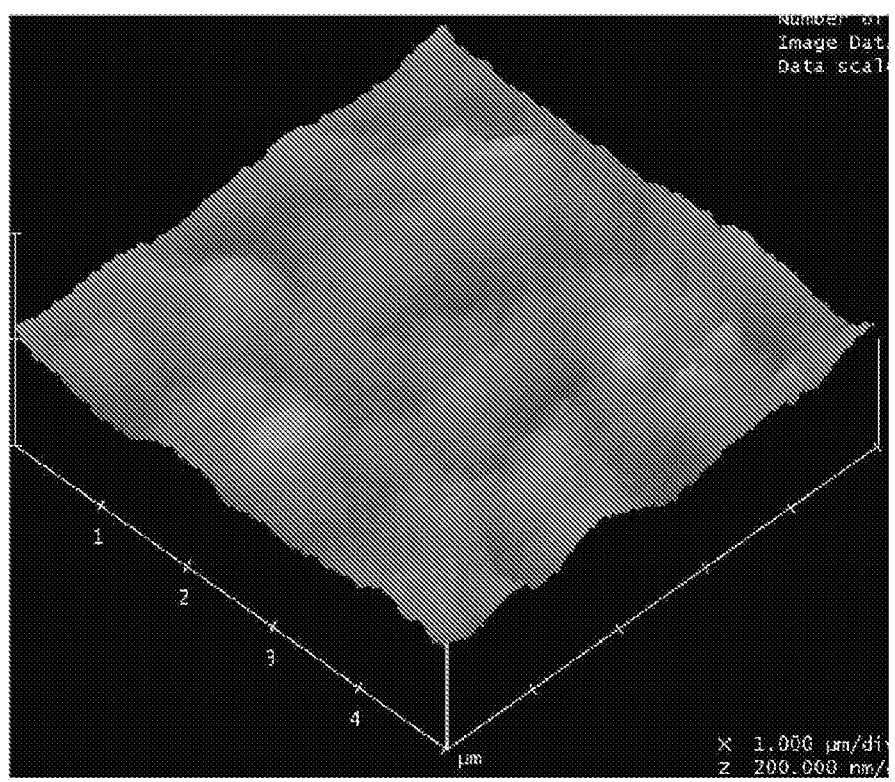
FIG. 16 is an AFM image of the surface of the surface-treated steel sheet of Comparative Example 8.

FIG. 15 is an SEM image of the surface-treated steel sheet of Comparative Example 8, and FIG. 16 is an AFM image. The coating of the surface-treated steel sheet of Comparative Example 8 was free from zirconium. Therefore, as shown in FIGS. 15 and 16, amorphous island projections had not been formed in a planar view on the surface of the coating of the surface-treated steel sheet of Comparative Example 8.

The preferable embodiments of the present invention have been explained above, but the present invention is not limited to the above-mentioned embodiments. That is, it is understood that other forms or various modified examples which can be conceived by a person skilled in the art within the scope of the invention described in the claims also belong to the technical scope of the present invention.

REFERENCE SIGNS LIST

1 steel sheet
2 plated layer
3, 3a coating
10, 20 surface-treated steel sheet
31 acrylic resin
32 inhibitor phase
33 surface
34 interface
35 projection
L virtual straight line

The invention claimed is:
1. A surface-treated steel sheet comprising:
a steel sheet;
a plated layer that contains zinc and is formed on the steel sheet; and
a coating formed on the plated layer,
wherein the coating contains an acrylic resin, zirconium, vanadium, phosphorus and cobalt, the acrylic resin has an area ratio of 80 to 100 area % in an area from a surface of the coating to a thickness of one-fifth of a film thickness of the coating on a cross-section of the coating, and the acrylic resin has an area ratio of 5 to 50 area % in an area including an area from the film thickness center of the coating to a thickness of one-tenth of the film thickness toward the surface side and an area from the film thickness center to a thickness of one-tenth of the film thickness toward the plated layer side, wherein the zirconium is contained in the coating by 4 to 400 mg/m$^2$ in terms of metal.

2. The surface-treated steel sheet according to claim 1, wherein
a plurality of island projections is present on the surface of the coating in a planar view, and
when three or more virtual straight lines each having a length of equal to or more than 10 μm and extending in any direction are drawn on any positions on the surface of the coating in a planar view, a length of each island projection is 0.1 to 5.0 μm, where the length of each island projection is defined as an average value of lengths of a plurality of line segments, which are portions of the virtual straight lines passing through the projections.

3. The surface-treated steel sheet according to claim 2, wherein the surface of the coating in an area of 1 μm by 1 μm has an arithmetic mean roughness Ra of 5 to 50 nm, a maximum cross-sectional height Rt of a roughness curve of 50 to 500 nm, and a root mean square roughness Rq of 10 to 100 nm.

4. The surface-treated steel sheet according to claim 2, wherein a concentration of the zirconium in an area between adjacent island projections on the surface of the coating is less than a concentration of the zirconium in an area on which the island projections are formed.

5. The surface-treated steel sheet according to claim 2, wherein a concentration of the acrylic resin in an area between adjacent island projections on the surface of the coating is more than a concentration of the acrylic resin in an area on which the island projections are formed.

6. The surface-treated steel sheet according to claim 1, wherein
the coating has a mass ratio of a mass of the vanadium to a mass of the zirconium of 0.07 to 0.69,
a mass ratio of a mass of the phosphorus to the mass of the zirconium of 0.04 to 0.58, and
a mass ratio of a mass of the cobalt to the mass of the zirconium of 0.005 to 0.08.

7. The surface-treated steel sheet according to claim 1, wherein the acrylic resin has an area ratio of 20 to 60 area % on a cross-section of the coating.

8. The surface-treated steel sheet according to claim 1, wherein the plated layer consists of, in mass %, one or more of Al: less than or equal to 60%, Mg: less than or equal to 10%, and Si: less than or equal to 2%; zinc; and impurities.

9. The surface-treated steel sheet according to claim 1, wherein the acrylic resin is a copolymer of, in mass %, styrene: 15 to 25%, (meth)acrylic acid: 1 to 10%, (meth) acrylic acid alkyl ester: 40 to 58% and acrylonitrile: 20 to 38%, and the acrylic resin has a glass transition temperature of −12 to 24° C.

10. The surface-treated steel sheet according to claim 1, wherein the coating contains less than or equal to 5% by mass of a fluoride ion.

11. A method for producing the surface-treated steel sheet according to claim 1, comprising:
a step of forming a plated layer containing zinc on a steel sheet;
a step of forming a coating by applying an aqueous surface treating agent containing an acrylic resin, zirconium, vanadium, phosphorus and cobalt on the plated layer by using a roll coater;
a step of retaining the coating for equal to or more than 0.5 seconds from the formation of the coating to initiation of heating of the coating; and
a step of heating the coating to dry the coating,
wherein, in the step of applying the aqueous surface treating agent, a viscosity of the aqueous surface treating agent measured at 25° C. is equal to or more than 1 mPa·s and equal to or less than 4 mPa·s.

12. The method for producing the surface-treated steel sheet according to claim 11, wherein, in the step of applying the aqueous surface treating agent, a temperature of the steel sheet when the steel sheet enters into the roll coater is equal to or more than 5° C. and equal to or less than 80° C.

* * * * *